US012302901B2

(12) United States Patent
Montag et al.

(10) Patent No.: US 12,302,901 B2
(45) Date of Patent: May 20, 2025

(54) PESTICIDAL MIXTURES

(71) Applicant: BASF SE, Ludwigshafen (DE)

(72) Inventors: Jurith Montag, Mannheim (DE); Markus Gewehr, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 1030 days.

(21) Appl. No.: 17/027,231

(22) Filed: Sep. 21, 2020

(65) Prior Publication Data

US 2021/0000116 A1    Jan. 7, 2021

Related U.S. Application Data

(63) Continuation of application No. 15/524,064, filed as application No. PCT/EP2015/074922 on Oct. 28, 2015, now Pat. No. 10,779,536.

(30) Foreign Application Priority Data

Nov. 7, 2014  (EP) .................................... 14192252
Dec. 17, 2014 (EP) .................................... 14198463

(51) Int. Cl.
| | |
|---|---|
| *A01N 43/713* | (2006.01) |
| *A01N 25/00* | (2006.01) |
| *A01N 35/04* | (2006.01) |
| *A01N 37/18* | (2006.01) |
| *A01N 37/34* | (2006.01) |
| *A01N 37/50* | (2006.01) |
| *A01N 43/30* | (2006.01) |
| *A01N 43/40* | (2006.01) |
| *A01N 43/54* | (2006.01) |
| *A01N 43/56* | (2006.01) |
| *A01N 43/653* | (2006.01) |
| *A01N 43/78* | (2006.01) |
| *A01N 43/84* | (2006.01) |

(52) U.S. Cl.
CPC .......... *A01N 43/713* (2013.01); *A01N 25/00* (2013.01); *A01N 35/04* (2013.01); *A01N 37/18* (2013.01); *A01N 37/34* (2013.01); *A01N 37/50* (2013.01); *A01N 43/30* (2013.01); *A01N 43/40* (2013.01); *A01N 43/54* (2013.01); *A01N 43/56* (2013.01); *A01N 43/653* (2013.01); *A01N 43/78* (2013.01); *A01N 43/84* (2013.01)

(58) Field of Classification Search
CPC ...... A01N 43/713; A01N 25/00; A01N 35/04; A01N 37/18; A01N 37/34; A01N 37/50; A01N 43/30; A01N 43/40; A01N 43/54; A01N 43/56; A01N 43/653; A01N 43/78; A01N 43/84

See application file for complete search history.

(56) References Cited

U.S. PATENT DOCUMENTS

| | | |
|---|---|---|
| 2,526,660 A | 10/1950 | Hester et al. |
| 4,242,121 A | 12/1980 | Hawkins et al. |
| 4,599,362 A | 7/1986 | Nakatani et al. |
| 4,940,720 A | 7/1990 | Nevill et al. |
| 4,940,721 A | 7/1990 | Nevill et al. |
| 4,945,100 A | 7/1990 | Nyfeler et al. |
| 4,992,458 A | 2/1991 | Riebli et al. |
| 5,143,932 A | 9/1992 | Jautelat et al. |
| 5,162,358 A | 11/1992 | Jautelat et al. |
| 5,215,747 A | 6/1993 | Hairston et al. |
| 5,378,460 A | 1/1995 | Zuckerman et al. |
| 5,501,852 A | 3/1996 | Meadows et al. |
| 5,631,276 A | 5/1997 | Kern |

(Continued)

FOREIGN PATENT DOCUMENTS

| | | |
|---|---|---|
| AU | 311315 B2 | 6/1991 |
| AU | 2013326645 A1 | 4/2015 |

(Continued)

OTHER PUBLICATIONS

Afon'Kin, A.A. et al. "Synthesis of Some Electron-Rich Aryl(hetaryl)oxarines under Phase-Transfer and Homogenous Conditions", Russian Journal of Organic Chemistry, 2008, p. 1776-1779, vol. 44, No. 12.

(Continued)

*Primary Examiner* — Monica A Shin
(74) *Attorney, Agent, or Firm* — MARSHALL, GERSTEIN & BORUN LLP

(57) ABSTRACT

The present invention relates to pesticidal mixtures comprising one fungicidal compound I selected from the group consisting of 1-[3-chloro-2-[[1-(4-chlorophenyl)pyrazol-3-yl]oxymethyl]phenyl]-4-methyl-tetrazol-5-one (I-1), 1-[3-bromo-2-[[1-(4-chlorophenyl)pyrazol-3-yl]oxymethyl]phenyl]-4- methyl-tetrazol-5-one (I-2), 1-[2-[[-1(4-chlorophenyl)pyrazol-3-yl]oxymethyl]-3-methyl-phenyl]-4-methyl-tetrazol-5-one (I-3), 1-[2-[[1(4-chlorophenyl)pyrazol-3-yl]oxymethyl]-3-fluoro-phenyl]-4-methyl-tetrazol-5-one (I-4), 1-[2-[[1-(2,4-dichlorophenyl)pyrazol-3-yl]oxymethyl]-3-fluoro-phenyl]-4-methyl-tetrazol-5-one (I-5), 1-[2-[[4-(4-chlorophenyl)thiazol-2-yl]oxymethyl]3-methyl-phenyl]-4-methyl-tetrazol-5-one (I-6), 1-[3-chloro-2-[[4-(p-tolyl)thiazol-2-yl]oxymethyl]phenyl]-4-methyl-tetrazol-5-one (I-7), 1-[3- cyclopropyl-2-[[2-methyl-4-(1-methylpyrazol-3-yl)phenoxy]methyl]phenyl]-4-methyl-tetrazol-5-one (I-8), 1-[3-(difluoromethoxy)-2-[[2-methyl-4-(1-methylpyrazol-3-yl)phenoxy]methyl]phenyl]-4-methyl-tetrazol-5-one (I-9), 1-methyl-4-[3-methyl-2-[[2-methyl-4-(1- methylpyrazol-3-yl)phenoxy]methyl]phenyl]tetrazol-5-one (I-10) and 1-methyl-4-[3-methyl-2-[[1-[3-(trifluoromethyl)phenyl]ethylidene-amino]oxymethyl]phenyl]tetrazol-5-one (I-11) and) and 1-[3-chloro-2-[[1-(4-chlorophenyl)pyrazol-3-yl]oxymethyl]phenyl]-4-methyl-tetrazol-5-one (I-12) and one or more fungicides.

17 Claims, No Drawings

(56) References Cited

U.S. PATENT DOCUMENTS

| | | |
|---|---|---|
| 5,747,025 A | 5/1998 | Meadows et al. |
| 5,885,598 A | 3/1999 | Knauf et al. |
| 6,060,051 A | 5/2000 | Heins et al. |
| 6,871,446 B1 | 3/2005 | Yamashita |
| 7,183,299 B2 | 2/2007 | Kobori et al. |
| 7,714,140 B2 | 5/2010 | Nagata et al. |
| 8,318,636 B2 | 11/2012 | Bais et al. |
| 8,445,255 B2 | 5/2013 | Kloepper et al. |
| 8,609,667 B2 | 12/2013 | Liu et al. |
| 8,772,200 B2 | 7/2014 | Shibayama et al. |
| 8,865,759 B2 | 10/2014 | Seitz et al. |
| 9,078,447 B2 | 7/2015 | Schoefl et al. |
| 9,655,364 B2 | 5/2017 | Matsuzaki |
| 9,708,341 B2 | 7/2017 | Wakamatsu et al. |
| 9,781,931 B2 | 10/2017 | Matsuzaki |
| 9,781,932 B2 | 10/2017 | Matsuzaki |
| 9,789,131 B1 | 10/2017 | Korinek et al. |
| 2002/0152503 A1 | 10/2002 | King et al. |
| 2003/0068303 A1 | 4/2003 | Selvig et al. |
| 2003/0203131 A1 | 10/2003 | Lemay |
| 2003/0224936 A1 | 12/2003 | Kretzschmar |
| 2007/0244073 A1 | 10/2007 | Angst et al. |
| 2008/0108686 A1 | 5/2008 | Gewehr et al. |
| 2009/0036509 A1 | 2/2009 | Gewehr et al. |
| 2009/0286768 A1 | 11/2009 | Crew et al. |
| 2010/0160399 A1 | 6/2010 | Ammermann et al. |
| 2010/0209410 A1 | 8/2010 | Schoefl et al. |
| 2010/0240619 A1 | 9/2010 | Gregory et al. |
| 2010/0260735 A1 | 10/2010 | Bais et al. |
| 2011/0212835 A1 | 9/2011 | Bais et al. |
| 2012/0076765 A1 | 3/2012 | Schisler et al. |
| 2012/0094834 A1 | 4/2012 | Frank et al. |
| 2012/0149571 A1 | 6/2012 | Kloepper et al. |
| 2013/0137658 A1 | 5/2013 | Matsuzaki |
| 2013/0184152 A1 | 7/2013 | Gary |
| 2014/0005047 A1 | 1/2014 | Hungenberg et al. |
| 2014/0012855 A1 | 1/2014 | Firat et al. |
| 2014/0112899 A1 | 4/2014 | Jeschke et al. |
| 2014/0127322 A1 | 5/2014 | Oberholzer et al. |
| 2014/0323305 A1 | 10/2014 | Rheinheimer et al. |
| 2015/0051171 A1 | 2/2015 | Yoshimoto et al. |
| 2015/0250173 A1 | 9/2015 | Korber et al. |
| 2015/0299146 A1 | 10/2015 | Hasegawa et al. |
| 2016/0165890 A1 | 6/2016 | Matsuzaki |
| 2016/0278384 A1 | 9/2016 | Jabs et al. |

FOREIGN PATENT DOCUMENTS

| | | | |
|---|---|---|---|
| CA | 1086734 A | | 9/1980 |
| CA | 1100976 A | | 5/1981 |
| CA | 1187084 A | | 5/1985 |
| CA | 1209152 A | | 8/1986 |
| CA | 1210404 A | | 8/1986 |
| CL | 2012002419 A1 | | 7/2014 |
| CL | 2015002622 A1 | | 4/2016 |
| CN | 1086664 A | | 5/1994 |
| CN | 1335854 A | | 2/2002 |
| CN | 1456054 A | | 11/2003 |
| CN | 1475560 A | | 2/2004 |
| CN | 1907024 A | | 2/2007 |
| CN | 101028009 A | | 9/2007 |
| CN | 101225074 A | | 7/2008 |
| CN | 101697736 A | | 4/2010 |
| CN | 101697737 A | | 4/2010 |
| CN | 101917856 A | | 12/2010 |
| DE | 2325878 A1 | | 12/1974 |
| DE | 3801233 A1 | | 8/1988 |
| DE | 37 33 755 A1 | | 4/1989 |
| DE | 4003180 A1 | | 8/1991 |
| DE | 102009009240 A1 | | 8/2010 |
| EP | 354183 A2 | | 2/1990 |
| EP | 1431275 A1 | | 6/2004 |
| EP | 1469122 A2 | | 10/2004 |
| EP | 1700919 A1 | | 9/2006 |
| EP | 2649879 A1 | | 10/2013 |
| EP | 2815649 A1 | | 12/2014 |
| EP | 2835052 A1 | | 2/2015 |
| EP | 2865265 A1 | | 4/2015 |
| EP | 2910126 A1 | | 8/2015 |
| EP | 2962568 A1 | | 1/2016 |
| EP | 3000017 A1 | | 3/2016 |
| EP | 3077479 A1 | | 10/2016 |
| EP | 3113640 A1 | | 1/2017 |
| EP | 3114567 A1 | | 1/2017 |
| EP | 3126430 A1 | | 2/2017 |
| EP | 3275955 A1 | | 1/2018 |
| EP | 3440950 A1 | | 2/2019 |
| EP | 3470466 A1 | | 4/2019 |
| FR | 2491924 A1 | | 4/1982 |
| GB | 2064520 A | | 6/1981 |
| GB | 2132195 A | | 7/1984 |
| GB | 2143815 A | | 2/1985 |
| GB | 2481118 A | | 12/2011 |
| JP | 59222434 | | 12/1984 |
| JP | 283304 | | 3/1993 |
| NZ | 230176 A | | 1/1992 |
| RS | 247200 | | 12/1986 |
| RU | 2478290 C2 | | 4/2013 |
| WO | WO-94/01546 A1 | | 1/1994 |
| WO | WO-94/10846 A1 | | 5/1994 |
| WO | WO-9619112 A1 | | 6/1996 |
| WO | WO-9641804 A1 | | 12/1996 |
| WO | WO-2000029426 A1 | | 5/2000 |
| WO | WO-02060250 A2 | | 8/2002 |
| WO | WO-02/085891 A1 | | 10/2002 |
| WO | WO-2002091824 A2 | | 11/2002 |
| WO | WO-2003/016303 A1 | | 2/2003 |
| WO | WO-03/064572 A1 | | 8/2003 |
| WO | WO-2005123689 A1 | | 12/2005 |
| WO | WO-2005123690 A1 | | 12/2005 |
| WO | WO-2006015866 A1 | | 2/2006 |
| WO | WO-2006016708 A1 | | 2/2006 |
| WO | WO-2006037632 A1 | | 4/2006 |
| WO | WO-2006/087373 A1 | | 8/2006 |
| WO | WO-2006109933 A1 | | 10/2006 |
| WO | WO-2006119876 A1 | | 11/2006 |
| WO | WO-2007031308 A2 | | 3/2007 |
| WO | WO-2007072999 A1 | | 6/2007 |
| WO | WO-2007/129454 A1 | | 11/2007 |
| WO | WO-2008013622 A2 | | 1/2008 |
| WO | WO-2008082198 A1 | | 7/2008 |
| WO | WO-2009037242 A2 | | 3/2009 |
| WO | WO-02009090181 | | 7/2009 |
| WO | WO-2009094442 A2 | | 7/2009 |
| WO | WO-2010043319 A1 | | 4/2010 |
| WO | WO-2010/109436 A1 | | 9/2010 |
| WO | WO-2010/128003 A2 | | 11/2010 |
| WO | WO-2010139271 A1 | | 12/2010 |
| WO | WO-2010139656 A2 | | 12/2010 |
| WO | WO-2010146114 A1 | | 12/2010 |
| WO | WO-2011081174 A1 | | 7/2011 |
| WO | WO-2011099804 A2 | | 8/2011 |
| WO | WO-2011/109395 A2 | | 9/2011 |
| WO | WO-2011/114280 A2 | | 9/2011 |
| WO | WO-2011117272 A2 | | 9/2011 |
| WO | WO-2011147953 A1 | | 12/2011 |
| WO | WO-2011154494 A1 | | 12/2011 |
| WO | WO-2011162397 A1 | | 12/2011 |
| WO | WO-2012/023143 A1 | | 2/2012 |
| WO | WO-2012020772 A1 | | 2/2012 |
| WO | WO-2012037782 A1 | | 3/2012 |
| WO | WO-12/047608 A2 | | 4/2012 |
| WO | WO-2012/080415 A1 | | 6/2012 |
| WO | WO-2012072696 A1 | | 6/2012 |
| WO | WO-2012076563 A1 | | 6/2012 |
| WO | WO-2012079073 A1 | | 6/2012 |
| WO | WO-2012/163945 A1 | | 12/2012 |
| WO | WO-2013/007767 A1 | | 1/2013 |
| WO | WO-2013/010862 A1 | | 1/2013 |
| WO | WO-2013010885 A1 | | 1/2013 |
| WO | WO-2013010894 A1 | | 1/2013 |
| WO | WO-2013024075 A1 | | 2/2013 |
| WO | WO-2013024076 A1 | | 2/2013 |
| WO | WO-2013024077 A1 | | 2/2013 |

(56) References Cited

FOREIGN PATENT DOCUMENTS

| | | | |
|---|---|---|---|
| WO | WO-2013024080 A1 | 2/2013 | |
| WO | WO-2013024081 A1 | 2/2013 | |
| WO | WO-2013024082 A1 | 2/2013 | |
| WO | WO-2013/050302 A1 | 4/2013 | |
| WO | WO-2013092224 A1 | 6/2013 | |
| WO | WO-2013/116251 A2 | 8/2013 | |
| WO | WO-2013156331 A1 * | 10/2013 | ............ A01N 47/24 |
| WO | WO-02013162072 | 10/2013 | |
| WO | WO-2013162072 A1 * | 10/2013 | ........... A01N 43/713 |
| WO | WO-2013162077 A1 | 10/2013 | |
| WO | WO-2013162716 A2 | 10/2013 | |
| WO | WO-2014007663 A1 | 1/2014 | |
| WO | WO-2014013223 A1 | 1/2014 | |
| WO | WO-2014/029697 A1 | 2/2014 | |
| WO | WO-2014/053398 A1 | 4/2014 | |
| WO | WO-2014/060177 A1 | 4/2014 | |
| WO | WO-2014051161 A1 | 4/2014 | |
| WO | WO-2014051165 A1 | 4/2014 | |
| WO | WO-2014/079773 A1 | 5/2014 | |
| WO | WO-2014076663 A1 | 5/2014 | |
| WO | WO-2014079719 A1 | 5/2014 | |
| WO | WO-2014079724 A1 | 5/2014 | |
| WO | WO-2014079728 A1 | 5/2014 | |
| WO | WO-2014079730 A1 | 5/2014 | |
| WO | WO-2014079752 A1 | 5/2014 | |
| WO | WO-2014079754 A1 | 5/2014 | |
| WO | WO-2014079764 A1 | 5/2014 | |
| WO | WO-2014079766 A1 | 5/2014 | |
| WO | WO-2014079769 A1 | 5/2014 | |
| WO | WO-2014079770 A1 | 5/2014 | |
| WO | WO-2014079771 A1 | 5/2014 | |
| WO | WO-2014079772 A1 | 5/2014 | |
| WO | WO-2014079774 A1 | 5/2014 | |
| WO | WO-2014079804 A1 | 5/2014 | |
| WO | WO-2014079813 A1 | 5/2014 | |
| WO | WO-2014079814 A1 | 5/2014 | |
| WO | WO-2014079841 A1 | 5/2014 | |
| WO | WO-2014/095994 A1 | 6/2014 | |
| WO | WO-2014084223 A1 | 6/2014 | |
| WO | WO-2014086848 A1 | 6/2014 | |
| WO | WO-2014086850 A1 | 6/2014 | |
| WO | WO-2014086851 A1 | 6/2014 | |
| WO | WO-2014086853 A1 | 6/2014 | |
| WO | WO-2014086854 A1 | 6/2014 | |
| WO | WO-2014086856 A1 | 6/2014 | |
| WO | WO-2014095932 A1 | 6/2014 | |
| WO | WO-2014147528 A1 | 9/2014 | |
| WO | WO-2014147534 A1 | 9/2014 | |
| WO | WO-2014191271 A1 | 12/2014 | |
| WO | WO-2014202421 A1 | 12/2014 | |
| WO | WO-2015003908 A1 | 1/2015 | |
| WO | WO-2015012243 A1 | 1/2015 | |
| WO | WO-2015012244 A1 | 1/2015 | |
| WO | WO-2015012245 A1 | 1/2015 | |
| WO | WO-2015/038503 A1 | 3/2015 | |
| WO | WO-2015051171 A1 | 4/2015 | |
| WO | WO-2015113860 A1 | 8/2015 | |
| WO | WO-2015135701 A1 | 9/2015 | |
| WO | WO-2015141867 A1 | 9/2015 | |
| WO | WO-2015169711 A1 | 11/2015 | |
| WO | WO-2015177021 A1 | 11/2015 | |
| WO | WO-2015/190316 A1 | 12/2015 | |
| WO | WO-2015180983 A1 | 12/2015 | |
| WO | WO-2015180985 A1 | 12/2015 | |
| WO | WO-2015180987 A1 | 12/2015 | |
| WO | WO-2015180999 A1 | 12/2015 | |
| WO | WO-2015181008 A1 | 12/2015 | |
| WO | WO-2015181009 A1 | 12/2015 | |
| WO | WO-2015181035 A1 | 12/2015 | |
| WO | WO-2015197393 A1 | 12/2015 | |
| WO | WO-2016008740 A1 | 1/2016 | |
| WO | WO-2016071164 A1 | 5/2016 | |
| WO | WO-2016071167 A1 | 5/2016 | |
| WO | WO-2016071168 A1 | 5/2016 | |
| WO | WO-2016071246 A1 | 5/2016 | |
| WO | WO-2016078995 A1 | 5/2016 | |
| WO | WO-2016091675 A1 | 6/2016 | |
| WO | WO-2016/174042 A1 | 11/2016 | |
| WO | WO-2017144231 A1 | 8/2017 | |
| WO | WO-2017/157910 A1 | 9/2017 | |
| WO | WO-2017/157915 A1 | 9/2017 | |
| WO | WO-2017/157916 A1 | 9/2017 | |
| WO | WO-2017/157920 A1 | 9/2017 | |
| WO | WO-2017/157923 A1 | 9/2017 | |
| WO | WO-2017153200 A1 | 9/2017 | |

OTHER PUBLICATIONS

Akama, Tsutomu, et al. "Discovery and structure-activity study of a novel benzoxaborole anti-inflammatory agent ;AN2728) for the potential topical treatment of psoriasis and atopic dermatitis", Bioorganic & Medicinal Chemistry Letters, 2009, p. 2129-2132, vol. 19.

Bartlett, D.W., "The strobilurin fungicides", Pest Management Science, 2002, pp. 649-662, vol. 58.

Bennett et al., "Survival of the Biocontrol Agents Coniothyrium minitans and Bacillus subtilis MBI 600 Introduced into Pasturised, Sterilised and Non-Sterile Soils," Soil Biology & Biochemistry, vol. 35, (2003), pp. 1565-1573.

Brandes, Bridget D., et al., "Synthesis of enantiopure 3-chlorostyrene oxide via an asymmetric epoxidation-ydrolytic kinetic resolution sequence," Tetrahedron; Asymmetry, 1997, p. 3927-3933, vol. 8, No. 23.

Broadband, (Aug. 9, 2012), retrieved from Internet Jan. 29, 2014, url: http://beckerunderwood.com/media/Products/resources/broadband_instructions_B4D27D46613D6.pdf.

Dehne et al., Modern Fungicides and Antifungal Compounds V, Proceedings of the 15th International Reinhardsbrunn Symposium on Modern Fungicides and Antifungal Compounds, (2007), [online] retrieved from: http://dpg.phytomedizin.Drg/fileadmin/daten/04_Verlag/02_SP/05_Reinhard/0294-sp-2008-Reinh-tpdf.

Echeveeri-Molina et al., "Toxicity of Synthetic and Biological Insecticides against Adults of the Eucalyptus Snout-3eetle Gonipterus scutellatus Gyllenhal (Coleoptera: Curculionidae)," Journal of Pest Science, vol. 83, (2010), pp. 297-305.

Enebak, S.A, et al., "Evidence for Induced Systemic Protection to Fusiform Rust in Loblolly Pine by Plant Growth-Jramoting Rhizobacteria," The American Phytopathological Society, Plant Disease/Mar. 2000, vol. 84, No. 3, pp. 306-308.

Extended Search Report, issued in EP Application No. 14192252.6, dated Mar. 19, 2015.

Facts on Friday Bulletin, Cotton Seed Distributors Extension and Development Team, Jul. 23, 2010 (one page).

Farenhorst, Marit, et al., "Synergy in Efficacy of Fungal Entomopathogens and Permethrin against West African nsecticide-Resistant *Anopheles gambiae* Mosquitoes", PlaS One, Aug. 2010, vol. 5, Issue 8, 10p.

Final Office Action, issued in co-pending U.S. Appl. No. 14/443,206, dated Dec. 12, 2017.

Final Office Action, issued in co-pending U.S. Appl. No. 14/443,206, dated Mar. 4, 2019.

Final Office Action, issued in co-pending U.S. Appl. No. 14/443,844, dated Jul. 11, 2018.

Final Office Action, issued in co-pending U.S. Appl. No. 14/443,844, dated Jun. 23, 2017.

Final Office Action, issued in co-pending U.S. Appl. No. 14/777,845, dated Nov. 13, 2018.

Final Office Action, issued in co-pending U.S. Appl. No. 14/777,845, dated Nov. 22, 2017.

Final Office Action, issued in co-pending U.S. Appl. No. 14/777,850, dated Apr. 15, 2019.

Final Office Action, issued in co-pending U.S. Appl. No. 14/777,850, dated Mar. 30, 2018.

Final Office Action, issued in co-pending U.S. Appl. No. 15/313,229, dated Jun. 14, 2018.

Forrester, Julie, et al. "Generation of trimethylsulfonium cation from dimethyl sulfoxide and dimethyl sulfate: implications for the

(56) References Cited

OTHER PUBLICATIONS synthesis of epoxides from aldehydes and ketones", J. Chem. Soc. Perkin Trans. 1, 1995, pp. 2289-2291, vol. 1995.

Fraaije, et al., "Role of Ascospores in Further Spread of QoI-Resistant Cytochrome b Alleles (G143A) in Field Jopulations of Mycosphaerella graminicola", Phytopathology, vol. 95, Issue 8, Aug. 2005, pp. 933-941.

FRAC Fungicide Resistance Action Committee: List of Pathogens with Field Resistance towards Qol Fungicides, ;2012) [online] retrieved from: http://www.fracinfo/doc,s/default-source/qoi-wg/qoi-quick-references/species-with-qo-resistance-%28updated-2012%29.pdf?sfvrsn=4 [retrieved Oct. 8, 2018].

International Preliminary Report On Patentability, issued in PCT/EP2015/074922, dated May 18, 2017.

International Search Report, issued in PCT/EP2015/074922, dated Dec. 4, 2015.

Jeanmart, et al., "Synthetic Approaches to the 2010-2014 New Agrochemicals", Bioorganic & Medicinal Chemistry, vol. 24, Issue 3, 2016, pp. 317-341.

John Lucas, "Resistance to Qol fungicides: implications for cereal disease management in Europe", Jesticide Outlook, vol. 14, Issue 6, 2003, pp. 268-270.

Kataoka et al., "Mechanism of Action and Selectivity of a Novel Fungicide, Pyribencarb," Journal of Pesticide Science, vol. 35, No. 2, (2010), pp. 99-106.

Kianianmomeni et al., Validation of a Real-Time PCR for the Quantitative Estimation of a G143A Mutation in the 3ytochromebc1 Gene of Pyrenophora teres, Pest Management Science, vol. 63, No. 3, (2007), pp. 219-224.

Koch et al., "64. Biosynthesis of cis-Jasmone: A Pathway for the Inactivation and the Disposal of the Plant Stress Hormone Jasmonic Acid to the Gas Phase?" Helvetica Chimica Acta, vol. 80, (1997), pp. 838-850.

Kuck et al., "Chapter 12. FRAC Mode of Action Classification and Resistance Risk of Fungicides," Modern Crop Jrotection Compounds, (2007), pp. 415-432.

Kuzenkov, A.V., "Synthesis of substituted 2-azoloyl-1-pyridylethan-1-ols," Chemistry of hererocyclic compounds, 2003, p. 1492-1495 vol. 39, No. 11.

Leisso et al., "The Influence of Biological and Fungicidal Seed Treatments on Chickpea (Cicer arietinum) Damping Dff," Can J Plant Pathol., vol. 31, (2009), pp. 38-46.

Lima, Lidia Moreira et al., "Bioisosterism: A useful strategy for molecular Modification and drug design", Current Medicinal Chemistry, 2005, p. 23-49, vol. 12.

McKnight and Rossall, "Root Colonization of Cotton Seedlings by Bacillus subtilis MBI 600," 2nd International Workshop on Plant Growth-Promoting Rhizobacteria, (1991), pp. 365-369.

Mosset, Paul et al. "Trimethylsulfonium Methylsulfate, a simple and efficient epoxidizing agent," Synthetic 3ommunications, 1985, p. 749-757, vol. 15, No. 8.

Office Action dated Apr. 3, 2017 for co-pending U.S. Appl. No. 14/777,845.

Office Action dated Feb. 6, 2018 for co-pending U.S. Appl. No. 15/313,229.

Office Action dated Jun. 23, 2017, from U.S. Appl. No. 14/443,844, filed May 19, 2015.

Office Action, issued in co-pending U.S. Appl. No. 14/443,206, dated Apr. 5, 2017.

Office Action, issued in co-pending U.S. Appl. No. 14/443,206, dated May 25, 2018.

Office Action, issued in co-pending U.S. Appl. No. 14/443,520, dated Oct. 14, 2016.

Office Action, issued in co-pending U.S. Appl. No. 14/443,523, dated Sep. 19, 2016.

Office Action, issued in co-pending U.S. Appl. No. 14/443,844, dated Feb. 14, 2017.

Office Action, issued in co-pending U.S. Appl. No. 14/777,845, dated Apr. 3, 2017.

Office Action, issued in co-pending U.S. Appl. No. 14/777,845, dated May 29, 2018.

Office Action, issued in co-pending U.S. Appl. No. 14/777,845, dated Nov. 22, 2017.

Office Action, issued in co-pending U.S. Appl. No. 14/777,850, dated Mar. 24, 2017.

Office Action, issued in co-pending U.S. Appl. No. 14/777,850, dated Oct. 1, 2018.

Office Action, issued in co-pending U.S. Appl. No. 16/083,898, dated Sep. 27, 2019.

Office Action, issued in co-pending U.S. Appl. No. 16/084,446, dated Aug. 1, 2019.

Office Action, issued in corresponding CL Application No. 15/8002684, dated Mar. 27, 2017.

Office Action, issued in corresponding CN Application No. 201380071087.5, dated Apr. 26, 2017.

Office Action, issued in corresponding CN Application No. 201480016731.3, dated Apr. 28, 2017.

Office Action, issued in corresponding UA Application No. 1506049, dated Feb. 14, 2017.

Pasche, et al., "Prevalence, competitive fitness and impact of the F129L mutation in Altemaria solani from the United States", Crop Protection, vol. 27, Issues 3-5, Mar.-May 2008, pp. 427-435.

Rallos, Characterizing Resistance of the Grapevine Powdery Mildew Erysiphe necator to Fungicides Belonging to quinone Outside Inhibitors and Demethylation Inhibitors, (2012) [online] retrieved from: https://vtechworks.lib.vtedu/bitstream/handle/10919/49594/Rallos_LE-D- 2013.pdf?sequence=1 [retrieved Oct. 8, 2018].

Schisler et al., "Formulation of *Bacillus* spp. for Biological Control of Plant Diseases," Journal of Phytopathology, vol. 94, (2004), pp. 1267-1271.

Schmidt et al., "Influence of Soil Temperature and Matric Potential on Sugar Beet Seedling Colonization and Suppression of Pythium Damping-Off by the Antagonistic Bacteria Pseudomonas fluorescens and Bacillus subtilis," Phytopathology, vol. 94, No. 4, (2004), pp. 351-363.

Semar, et al., "Field efficacy of pyraclostrobin against populations of Pyrenophora teres containing the F129L mutation in the cytochrome b gene", Journal of Plant Diseases and Protection, vol. 114, Issue 3, Jun. 2007, pp. 117-119.

Sierotzki, et al., "Cytochrome b gene sequence and structure of Pyrenophora teres and P. triticirepentis and implications for Qol resistance", Pest Management Science, vol. 63, Issue 3, Mar. 2007, pp. 225-233.

Sierotzki, et al., "Mode of resistance to respiration inhibitors at the cytochrome bc1 enzyme complex of \ilycosphaerella fijiensis field isolates", Pest Management Science, vol. 56, Issue 10, 2000, pp. 833-841.

Singh et al., "DuPont CyazypyrTM (DPX-HGW86, cyantraniliprole): A Cross-Spectrum Insecticide for Control of Major Pests of Rice," Abstract of Conference Paper, Entomological Society of America Annual, (2011), retrieved from the Internet on Feb. 9, 2017: https://www.researchgate.net/publication/267528306_DuPont_Cyazypyr_DPX-HGW86_c.

Soares et al., "More Cercospora Species Infect Soybeans Across the Americas than Meets the Eye," PLOS ONE, vol. 10, No. 8, (2015), p. e0133495.

Stamina Supplemental label, BASF Corp, Research Triangle Park, NC, 2011, pp. 1-3.

Standish, et al., "Occurrence of Qol Fungicide Resistance in Cercospora sojina from Mississippi Soybean", Plant Disease, vol. 99, Issue 10, Oct. 2015, pp. 1347-1352.

Tedford et al., Fundamental Aspects for the Development of Resistance to Fungicides, (2007), [online] retrieved from: https://www.plantmanagementnetwork.org/infocenter/topidsoybeanrust/2007/presentationsiTedford.pdf retrieved Oct. 8, 2018].

Wang, "Research Progress and Prospect of Bacillus Subtilis," Journal of the Graduates, Sun Yat-Sen University (Natural Sciences, Medicine), 2012, vol. 33, Issue 3, pp. 14-22.

Wright et al., "Application of Beneficial Microorganisms to Seeds During Drum Priming," Biocontrol Science and Technology, (2003), pp. 599-614.

(56) References Cited

OTHER PUBLICATIONS

Yu et al., "Synthesis and Fungicidal Evaluation of 2-arylphenyl ether-3-(1H-1,2,4-triazol-1-yl)propan-2-ol Derivatives," Journal of Agricultural and Food Chemistry, vol. 57, No. 11, (2009), pp. 4854-4860.
Zeng, et al., "Characterization of Quinone Outside Inhibitor Fungicide Resistance in Cercospora sojina and Development of Diagnostic Tools for its Identification", Plant Disease, vol. 99, Issue 4, 2015, pp. 544-550.
Zhang, "Evaluation of Microbial Products for Management of Powdery Mildew on Summer Squash and Cantaloupe in Florida," Plant Disease, (2011), pp. 461-468.
Zhou, X. G., et al. "Field evaluation of a beneficial Bacillus strain for biocontrol of sheath blight in rice," Phytopathology, 2011, vol. 101, S204.
Zitter et al., "Control of Early Blight of Tomato with Genetic Resistance and Conventional and Biological Sprays," Proc. 1st is on Tomato Diseases, Acta Hort, vol. 695, (2005), pp. 181-190.

\* cited by examiner

PESTICIDAL MIXTURES

This application is a continuation of U.S. application Ser. No. 15/524,064, which is a U.S. National Stage application of International Application No. PCT/EP2015/074922, filed Oct. 28, 2015; this application also claims priority under 35 U.S.C. § 119 to European Patent Application No. 14192252.6, filed Nov. 7, 2014, and European Patent Application No. 14198463.3, filed Dec. 17, 2014; all of the aforementioned applications are hereby incorporated herein by reference in their entirety.

DESCRIPTION

The present invention relates to fungicidal mixtures comprising 1) one fungicidal compound I selected from the group consisting of 1-[3-chloro-2-[[1-(4-chlorophenyl)pyrazol-3-yl]oxymethyl]phenyl]-4-methyl-tetrazol-5-one (I-1), 1-[3-bromo-2-[[1-(4-chlorophenyl)pyrazol-3-yl]oxymethyl]phenyl]-4-methyl-tetrazol-5-one (I-2), 1-[2-[[1-(4-chlorophenyl)pyrazol-3-yl]oxymethyl]-3-methyl-phenyl]-4-methyl-tetrazol-5-one (I-3), 1-[2-[[1-(4-chlorophenyl)pyrazol-3-yl]oxymethyl]-3-fluoro-phenyl]-4-methyl-tetrazol-5-one (I-4), 1-[2-[[1-(2,4-dichlorophenyl)pyrazol-3-yl]oxymethyl]-3-fluoro-phenyl]-4-methyl-tetrazol-5he-one (I-5), 1-[2-[[4-(4-chlorophenyl)thiazol-2-yl]oxymethyl]-3-methyl-phenyl]-4-methyl-tetrazol-5-one (1-6), 1-[3-chloro-2-[[4-(p-tolypthiazol-2-yl]oxymethyl]phenyl]-4-methyl-tetrazol-5-one (I-7), 1-[3-cyclopropyl-2-[[2-methyl-4-(1-methylpyrazol-3-yl)phenoxy]methyl]phenyl]-4-methyl-tetrazol-5-one (1-8), 1-[3-(difluoromethoxy)-2-[[2-methyl-4-(1-methylpyrazol-3-yl)phenoxy]methyl]phenyl]-4-methyl-tetrazol-5-one (I-9), 1-methyl-4-[3-methyl-2-[[2-methyl-4-(1-methylpyrazol-3-yl)phenoxy]methyl]phenyl]tetrazol-5-one (I-10) and 1-methyl-4-[3-methyl-2-[[1-[3-(trifluoromethyl)phenyl]ethylideneamino]oxymethyl]phenyl]tetrazol-5-one (I-11) and 1-[3-chloro-2-[[1-(4-chlorophenyl)pyrazol-3-yl]oxymethyl]phenyl]-4-methyl-tetrazol-5-one (I-12); and 2) and at least one further fungicidal compound II selected from the group of strobilurines consisting of azoxystrobin (II-1), dimoxystrobin (II-2), fluoxastro-bin (II-3), kresoxim-methyl(II-4), mandestrobin (II-5), metaminostrobin (II-6), orysastrobin, (II-7), picoxystrobin (II-8), pyraclostrobin (II-9), trifloxystrobin (II-10), pyribencarb (II-11), famoxadone (II-12), fenamidone (II-13); and the group of carboxamides selected from benzovindiflupyr (II-14), bixafen (II-15), boscalid (II-16), fluopyram (II-17), flutolanil (II-18), fluxapyroxad (II-19), isofetamid (II-20), isopyrazam (II-21), penflufen (II-22), penthiopyrad (II-23), sedaxane (II-24), 3 (difluoromethyl)-1-methyl-N-(1,3-trimethyl¬indan-4-yl)pyrazole-4-carboxamide (II-25), 3 (trifluoromethyl)-1-methyl-N-(1,1,3-trimethyl¬indan-4-yl)pyrazole-4-carboxamide (II-26), 1,3-dimethyl-N-(1,1,3-trimethylindan-4-yl)pyr¬azole-4-carboxamide (II-27), 3-(trifluorometh-yl)-1,5-dimethyl-N-(1,1,3-trimethylindan-4-yl)pyrazole-4-carboxamide (II-28), 1,3,5-tri-methyl-N-(1,1,3-trimethylindan-4-yl)pyrazole-4-car¬(II-29); and the group of sterol biosynthesis inhibitors (SBI fungicides) consisting of bitertanol (II-30), bromuconazole (II-31), cyproconazole (II-32), difenoconazole (II-33), diniconazole (II-34), diniconazole-M (II-35), epoxiconazole (II-36), fenbuconazole (II-37), fluquinconazole (II-38), flusilazole (II-39), flutriafol (II-40), hexaconazole (II-41), imibenconazole (II-42), ipconazole (II-43), metconazole (II-44), myclobutanil (II-45), oxpoconazole (II-46), paclobutrazole (II-47), penconazole (II-48), propiconazole (II-49), prothioconazole (II-50), simeconazole (II-51), tebuconazole (II-52), tetraconazole (II-53), triadimefon (II-54), triadimenol (II-55), triticonazole (II-56), uniconazole (II-57), 2-[rel-(2S; 3R)-3-(2-chlorophenyl)-2-(2,4-difluorophenyl)-oxi-ranyl-methyl]-2H-[1,2,4]triazole-3-thiol (II-58); and the group of sterol biosynthesis inhibitors (SBI fungicides) and delta14-reductase inhibitors consisting of dodemorph (II-59), dodemorph-acetate (II-60), fenpropimorph (II-61), tridemorph (II-62), fenpropidin (II-63), spiroxamine (II-64); and the group of inhibitors of cell division and cytoskeleton consisting of benomyl(II-65), carbendazim (II-66), fuberidazole (II-67), thiabendazole (II-68), thiophanate-methyl(II-69); di-ethofencarb (II-70), ethaboxam (II-71), pencycuron (II-72), fluopicolide (II-73), zoxamide (II-74), metrafenone (II-75), pyriofenone (II-76); and the group of inhibitors with Multi Site Action consisting of Bordeaux mixture, (II-77), copper acetate, (II-78), copper hydroxide, (II-79), copper oxychloride, (II-80), basic copper sulfate, (II-81), sulfur; (II-82), mancozeb, (II-83), maneb, (II-13), metam, (II-85), metiram, (II-86), propineb, (II-87), thiram, (II-88), zineb, (II-89), ziram; (II-90), chlorothalonil, (II-91), captan, (II-92), folpet, (II-93), phthalide, (II-94), dodine, (II-95), iminoctadine, (II-96), dithianon, (II-97), 2,6-di-methyl-1H,5H-[1,4]dithiino[2,3-c:5,6-c']dipyrrole-1,3,5,7(2H,6H)-tetraone (II-98); and the group of cell wall synthesis inhibitors consisting of validamycin (II-99), polyoxin B (II-100), pyroquilon (II-101), tricyclazole (II-102), carpropamid (II-103); and the group of plant defence inducers consisting of acibenzolar-S-methyl(II-104), probenazole (II-105), isotianil (II-106), tiadinil (II-107), prohexadione-calcium (II-108), fosetyl(II-109), phosphorous acid and its salts (II-110); and the group of respiration inhibitors consisting of cyazofamid (II-111), amisulbrom (II-112), dinocap (II-113), fluazinam (II-114), ferimzone (II-115), fentin salts, such as fentin-acetate, fentin chloride or fentin hydroxide, (II-116), ametoctradin (II-117), silthiofam (II-118); and the group of sterol biosynthesis inhibitors (SBI fungicides) consisting of imazalil (II-119), pefurazoate (II-120), prochloraz (II-121), triflumizol (II-122); and the group of sterol biosynthesis inhibitors (SBI fungicides) consisting of fenarimol (II-123), pyrifenox (II-124), triforine (II-125), [3-(4-chloro-2-fluoro-phenyl)-5-(2,4-difluoro-phenyl)isoxazol-4-yl]-(3-pyridyl)methanol (II-126); and the group of inhibitors of amino acid and protein synthesis consisting of cyprodinil (II-127), mepanipyrim (II-128), pyrimethanil (II-129), kasugamycin (II-130), streptomycin (II-131), polyoxin (II-132), validamycin A (II-133); and the group of signal transduction inhibitors consisting of iprodione (II-134), procymidone (II-135), vinclozolin (II-136), fludioxonil (II-137), quinoxyfen (II-138); and the group of lipid and membrane synthesis inhibitors consisting of edifenphos (II-139), iprobenfos (II-140), isoprothiolane (II-141), tolclofos-methyl(II-142), dimethomorph (II-143), flumorph (II-144), mandipropamid (II-145), pyrimorph (II-146), benthiavalicarb (II-147), iprovalicarb (II-148), valifenalat (II-149), propamocarb (II-150), oxathiapiprolin (II-151), 2-{3-[2-(1-{[3,5-bis(di-fluoromethyl-1H-pyrazol-1-yl]acetyl}piperidin-4-yl)-1,3-thiazol-4-yl]-4,5-dihydro-1,2-oxazol-5-yl}phenyl methanesulfonate (G.5.2), 2-{3-[2-(1-{[3,5-bis(difluoro-methyl)-1H-pyrazol-1-yl]acetyl}piperidin-4-yl) 1,3-thiazol-4-yl]-4,5-dihydro-1,2-oxazol-5-yl}-3-chlorophenyl methanesulfonate; (II-152);

and the group of sterol biosynthesis inhibitors (SBI fungicides): Inhibitors of 3-keto reductase consisting of fenhexamid (II-153); and the group of nucleic acid synthesis inhibitors consisting of benalaxyl(II-154), benalaxyl-M (II-155), kiralaxyl(II-156), metalaxyl(II-157), metalaxyl-M (mefenoxam) (II-158), oxadixyl(II-159), hymexazole (II-160), oxolinic acid (II-161), bupirimate (II-162), 5-fluorocytosine (II-163), 5-fluoro-2-(p-tolylmethoxy)pyrimidin-4-amine (II-164), 5-fluoro-2-(4-fluorophenyl-methoxy)pyrimidin-4-amine (II-165); and the group of fungicides with unknown mode of action consisting of cyflufenamid (II-166), cymoxanil (II-167), diclomezine (II-168), difenzoquat (II-169), difenzoquatmethylsulfate (II-170), fenpyrazamine (II-171), flumetover (II-172), flusulfamide (II-173), flutianil (II-174), oxa-thiapiprolin (II-175), tolprocarb (II-176), oxine-copper (II-177), proquinazid (II-178), tebuflo-quin (II-179), tecloftalam (II-180), picarbutrazox (II-181), 3-[5-(4-chlorophenyl)-2,3-dimethyl-isoxazolidin-3-yl]-pyridine (pyrisoxazole) (II-182), 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl] etha-none (II-183), 2-[3,5-bis(difluoromethyl)-1H-pyrazol-1-yl]-1-[4-(4-{5-[2-fluoro-6-(prop-2-yn-1-yl-oxy)phenyl]-4,5-dihydro-1,2-oxazol-3-yl}-1,3-thi-azol-2-yl)piperidin-1-yl]ethanone (II-113), 2-[3,5-bis(difluoromethyl)-1H-pyrazol-1-yl]-1-[4-(4-{5-[2-chloro-6-(prop-2-yn-1-yl-oxy)phenyl]-4,5-dihydro-1,2-oxazol-3-yl}-1,3-thiazol-2-yl) piperidin-1-yl]ethanone (II-185), 2-[2-[(7,8-difluoro-2-methyl-3-quinolyl)oxy]-6-fluoro-phenyl]propan-2-ol (II-186), 2-[2-fluoro-6-[(8-fluoro-2-methyl-3-quinolyl)oxy]-phen-yl]propan-2-01 (II-187), 9-fluoro-2,2-dimethyl-5-(3-quinolyl)-3H-1,4-benzoxazepine (II-188), 3-(5-fluoro-3,3,4,4-tetramethyl-3,4-dihydroiso-quinolin-1-yl)-quinoline (II-189), 3-(4,4-difluoro-3,3-dimethyl-3,4-dihydroisoquinolin-1-yl)-quin-oline (II-190), 3-(4,4,5-trifluoro-3,3-dimethyl-3,4-dihydroisoquinolin-1-yl)quinoline (II-191).

The above-referred mixtures are herein below also referred as "inventive mixtures".

Moreover, the invention relates to a method for controlling pests, this refers to includes animal pests and harmful fungi, using the inventive mixtures and to the use of compound I and compound II and optionally a second compound II for preparing such mixtures, and also to compositions comprising such mixtures.

Moreover, the invention relates to a method for controlling harmful fungi, using the inventive mixtures of compound 1,11 and optionally second compound II and to the use of compound I and one or two compounds II as defined above for preparing such mixtures, and also to compositions comprising such mixtures.

Additionally, the present invention also comprises a method for protection of plant propagation material (preferably seed) from harmful pests, such as fungi or insects, arachnids or nematodes comprising contacting the plant propagation materials (preferably seeds) with an inventive mixture in pesticidally effective amounts The term "plant propagation material" is to be understood to denote all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants, including seedlings and young plants, which are to be transplanted after germination or after emergence from soil. These young plants may also be protected before transplantation by a total or partial treatment by immersion or pouring. In a particular preferred embodiment, the term propagation material denotes seeds.

Additionally, the present invention also comprises a method for protection of plant propagation material (preferably seed) from harmful fungi comprising contacting the plant propagation materials (preferably seeds) with the inventive mixture in pesticidally effective amounts.

Moreover, the invention relates to a method for controlling harmful fungi using the inventive mixtures mixtures and to the use of the compounds present in the inventive mixtures for preparing such mixtures, and also to compositions comprising such mixtures.

The present invention further relates to plant-protecting active ingredient mixtures having synergistically enhanced action of improving the health of plants and to a method of applying such inventive mixtures to the plants.

Compounds I as well as their pesticidal action and methods for producing them are known e.g. from WO 2013/162072, WO 2013/162072, WO 2013/162072, WO 2013/162072, WO 2013/162072, WO 2013/162077, WO 2013/162077, WO 2014/051161, WO 2014/051161, WO 2014/051165 and WO 2014/013223. Compounds II as well as their pesticidal action and methods for producing them are generally known. For instance, they may be found in the e-Pesticide Manual V5.2 (ISBN 978 1 901396 85 0) (2008-2011) among other publications.

One typical problem arising in the field of pest control lies in the need to reduce the dosage rates of the active ingredient in order to reduce or avoid unfavorable environmental or toxicological effects whilst still allowing effective pest control.

In regard to the instant invention the term pests embrace harmful fungi.

Another problem encountered concerns the need to have available pest control agents which are effective against a broad spectrum of harmful fungi.

There also exists the need for pest control agents that combine knock-down activity with prolonged control, that is, fast action with long lasting action.

Another difficulty in relation to the use of pesticides is that the repeated and exclusive application of an individual pesticidal compound leads in many cases to a rapid selection of pests, that means animal pests, and harmful fungi, which have developed natural or adapted resistance against the active compound in question. Therefore there is a need for pest control agents that help prevent or overcome resistance.

Another problem underlying the present invention is the desire for compositions that improve plants, a process which is commonly and hereinafter referred to as "plant health".

The term plant health comprises various sorts of improvements of plants that are not connected to the control of pests. For example, advantageous properties that may be mentioned are improved crop characteristics including: emergence, crop yields, protein content, oil content, starch content, more developed root system (improved root growth), improved stress tolerance (e.g. against drought, heat, salt, UV, water, cold), reduced ethylene (reduced production and/or inhibition of reception), tillering increase, increase in plant height, bigger leaf blade, less dead basal leaves, stronger tillers, greener leaf color, pigment content, photosynthetic activity, less input needed (such as fertilizers or water), less seeds needed, more productive tillers, earlier flowering, early grain maturity, less plant verse (lodging), increased shoot growth, enhanced plant vigor, increased plant stand and early and better germination; or any other advantages familiar to a person skilled in the art.

It was therefore an object of the present invention to provide pesticidal mixtures which solve the problems of reducing the dosage rate and/or enhancing the spectrum of activity and/or combining knock-down activity with prolonged control and/or to resistance management and/or promoting the health of plants.

We have found that this object is in part or in whole achieved by the mixtures comprising the active compounds defined in the outset.

Especially, it has been found that the mixtures as defined in the outset show markedly enhanced action against pests compared to the control rates that are possible with the individual compounds and/or is suitable Afor improving the health of plants when applied to plants, parts of plants, seeds, or at their locus of growth.

It has been found that the action of the inventive mixtures goes far beyond the fungicidal and/or plant health improving action of the active compounds present in the mixture alone (synergistic action).

Moreover, we have found that simultaneous, that is joint or separate, application of the compound I and the compound II and optionally second compound II or successive application of the compound I and the compound II and optionally second compound II allows enhanced control of pests, that harmful fungi, compared to the control rates that are possible with the individual compounds (synergistic mixtures).

Moreover, we have found that simultaneous, that is joint or separate, application of the compound I and the compound II and optionally second compound II or successive application of the compound I and the compound II and optional optionally second compound II allows enhanced control of harmful fungi, compared to the control rates that are possible with the individual compounds (synergistic mixtures).

Moreover, we have found that simultaneous, that is joint or separate, application of the compound I and the compound II and optionally second compound II or successive application of the compound I and the compound II and optionally second compound II provides enhanced plant health effects compared to the plant health effects that are possible with the individual compounds.

The ratio by weight of compound I and compound II in binary mixtures is from 20000:1 to 1:20000, from 500:1 to 1:500, preferably from 100:1 to 1:100 more preferably from 50:1 to 1:50, most preferably from 20:1 to 1:20, including also ratios from 10:1 to 1:10, 1:5 to 5:1, or 1:1.

The ratio by weight of compound I, II and second compound II in each combination of two ingredients in the mixture of three ingredients is from 20000:1 to 1:20000, from 500:1 to 1:500, preferably from 100:1 to 1:100 more preferably from 50:1 to 1:50, most preferably from 20:1 to 1:20, including also ratios from 10:1 to 1:10, 1:5 to 5:1, or 1:1.

The following binary mixtures set forth herein are subject to the teaching of the present invention.

In the tables A, B, C, D, E, F, G, H and Z-set forth below, compounds of formula I are abbreviated as follows:

| No | chemical name |
|---|---|
| I-1 | 1-[3-chloro-2-[[1-(4-chlorophenyl)pyrazol-3-yl]oxymethyl]phenyl]-4-methyl-tetrazol-5-one |
| I-2 | 1-[3-bromo-2-[[1-(4-chlorophenyl)pyrazol-3-yl]oxymethyl]phenyl]-4-methyl-tetrazol-5-one |

-continued

| No | chemical name |
|---|---|
| I-3 | 1-[2-[[1-(4-chlorophenyl)pyrazol-3-yl]oxymethyl]-3-methyl-phenyl]-4-methyl-tetrazol-5-one |
| I-4 | 1-[2-[[1-(4-chlorophenyl)pyrazol-3-yl]oxymethyl]-3-fluoro-phenyl]-4-methyl-tetrazol-5-one |
| I-5 | 1-[2-[[1-(2,4-dichlorophenyl)pyrazol-3-yl]oxymethyl]-3-fluoro-phenyl]-4-methyl-tetrazol-5-one |
| I-6 | 1-[2-[[4-(4-chlorophenyl)thiazol-2-yl]oxymethyl]-3-methyl-phenyl]-4-methyl-tetrazol-5-one |
| I-7 | 1-[3-chloro-2-[[4-(p-tolyl)thiazol-2-yl]oxymethyl]phenyl]-4-methyl-tetrazol-5-one |
| I-8 | 1-[3-cyclopropyl-2-[[2-methyl-4-(1-methylpyrazol-3-yl)phenoxy]methyl]phenyl]-4-methyl-tetrazol-5-one |
| I-9 | 1-[3-(difluoromethoxy)-2-[[2-methyl-4-(1-methylpyrazol-3-yl)phenoxy]methyl]phenyl]-4-methyl-tetrazol-5-one |
| I-10 | 1-methyl-4-[3-methyl-2-[[2-methyl-4-(1-methylpyrazol-3-yl)phenoxy]methyl]phenyl]tetrazol-5-one |
| I-11 | 1-methyl-4-[3-methyl-2-[[1-[3-(trifluoromethyl)phenyl]ethylidene-amino]oxymethyl]phenyl]tetrazol-5-one |
| I-12 | 1-[3-chloro-2-[[1-(4-chlorophenyl)pyrazol-3-yl]oxymethyl]phenyl]-4-methyl-tetrazol-5-one |

In the tables A, B, C, D, E, F, G and H set forth below compounds II are abbreviated by the number in brackets behind the individual pestidcide as displayed on pages 1 to 3 of the present invention.

"I" is compound I, "II" is compound II

TABLE A1

| No | I | II |
|---|---|---|
| M.A.1.1 | I-1 | II-1.1 |
| M.A.1.2 | I-1 | II-1.2 |
| M.A.1.3 | I-1 | II-1.3 |
| M.A.1.4 | I-1 | II-1.4 |
| M.A.1.5 | I-1 | II-1.5 |
| M.A.1.6 | I-1 | II-1.6 |
| M.A.1.7 | I-1 | II-1.7 |
| M.A.1.8 | I-1 | II-1.8 |
| M.A.1.9 | I-1 | II-1.9 |
| M.A.1.10 | I-1 | II-1.10 |
| M.A.1.11 | I-1 | II-1.11 |
| M.A.1.12 | I-1 | II-1.12 |
| M.A.1.13 | I-1 | II-1.13 |

Table A2

Table A2 is as Table A1, in which the compound 1-1 is replaced by compound 1-2, and the mixtures are named from M.A.2.1 to M.A.2.13. In the context of the present invention, each of the rows of Table A2 corresponds to one mixture.

Table A3

Table A3 is as Table A1, in which the compound 1-1 is replaced by compound 1-3, and the mixtures are named from M.A.3.1 to M.A.3.13. In the context of the present invention, each of the rows of Table A3 corresponds to one mixture.

Table A4

Table A4A is as Table A1, in which the compound 1-1 is replaced by compound 1-4, and the mixtures are named from M.A.4.1 to M.A.4.13. In the context of the present invention, each of the rows of Table A4 corresponds to one mixture.

Table A5

Table A5 is as Table A1, in which the compound 1-1 is replaced by compound 1-5, and the mixtures are named from M.A.5.1 to M.A.5.13. In the context of the present invention, each of the rows of Table A5 corresponds to one mixture.

Table A6

Table A6 is as Table A1, in which the compound 1-1 is replaced by compound 1-6, and the mixtures are named from M.A.6.1 to M.A.6.13. In the context of the present invention, each of the rows of Table A6 corresponds to one mixture.

Table A7

Table A7 is as Table A1, in which the compound 1-1 is replaced by compound 1-7, and the mixtures are named from M.A.7.1 to M.A.7.13. In the context of the present invention, each of the rows of Table A7 corresponds to one mixture.

Table A8

Table A8 is as Table A1, in which the compound 1-1 is replaced by compound 1-8, and the mixtures are named from M.A.8.1 to M.A.8.13. In the context of the present invention, each of the rows of Table A8 corresponds to one mixture.

Table A9

Table A9 is as Table A1, in which the compound 1-1 is replaced by compound 1-9, and the mixtures are named from M.A.9.1 to M.A.9.13. In the context of the present invention, each of the rows of Table A9 corresponds to one mixture.

Table A10

Table A10 is as Table A1, in which the compound 1-1 is replaced by compound 1-10, and the mixtures are named from M.A.10.1 to M.A.10.13. In the context of the present invention, each of the rows of Table A10 corresponds to one mixture.

Table A11

Table A11 is as Table A1, in which the compound 1-1 is replaced by compound 1-11, and the mixtures are named from M.A.11.1 to M.A.11.13. In the context of the present invention, each of the rows of Table A11 corresponds to one mixture.

Table A12

Table A12 is as Table A1, in which the compound 1-1 is replaced by compound 1-12, and the mixtures are named from M.A.12.1 to M.A.12.13. In the context of the present invention, each of the rows of Table A12 corresponds to one mixture.

All tables A are preferred embodiments of the present invention. Within table A1 to table A12, the following mixtures are preferred: M.A.1.1, M.A.1.4, M.A.1.5, M.A.1.6, M.A.1.8, M.A.1.9, M.A.1.10, M.A.2.1, M.A.2.4, M.A.2.5, M.A.2.6, M.A.2.8, M.A.2.9, M.A.2.10, M.A.3.1, M.A.3.4, M.A.3.5, M.A.3.6, M.A.3.8, M.A.3.9, M.A.3.10, M.A.4.1, M.A.4.4, M.A.4.5, M.A.4.6, M.A.4.8, M.A.4.9, M.A.4.10, M.A.5.1, M.A.5.4, M.A.5.5, M.A.5.6, M.A.5.8, M.A.5.9, M.A.5.10, M.A.6.1, M.A.6.4, M.A.6.5, M.A.6.6, M.A.6.8, M.A.6.9, M.A.6.10, M.A.7.1, M.A.7.4, M.A.7.5, M.A.7.6, M.A.7.8, M.A.7.9, M.A.7.10, M.A.8.1, M.A.8.4, M.A.8.5, M.A.8.6, M.A.8.8, M.A.8.9, M.A.8.10, M.A.9.1, M.A.9.4, M.A.9.5, M.A.9.6, M.A.9.8, M.A.9.9, M.A.9.10, M.A.10.1, M.A.10.4, M.A.10.5, M.A.10.6, M.A.10.8, M.A.10.9, M.A.10.10, M.A.11.1, M.A.11.4, M.A.11.5, M.A.11.6, M.A.11.8, M.A.11.9, M.A.11.10, M.A.12.1, M.A.12.4, M.A.12.5, M.A.12.6, M.A.12.8, M.A.12.9 and M.A.12.10.

Within table A, the following mixtures are more preferred: M.A.1.4, M.A.1.9, M.A.2.4, M.A.2.9, M.A.3.4, M.A.3.9, M.A.4.4, M.A.4.9, M.A.5.4, M.A.5.9, M.A.6.4, M.A.6.9, M.A.7.4, M.A.7.9, M.A.8.4, M.A.8.9, M.A.9.4, M.A.9.9, M.A.10.4, M.A.10.9, M.A.11.4, M.A.11.9, M.A.12.4 and M.A.12.9.

TABLE B1

| No | I | II |
|---|---|---|
| M.B.1.1 | I-1 | II-14 |
| M.B.1.2 | I-1 | II-15 |
| M.B.1.3 | I-1 | II-16 |
| M.B.1.4 | I-1 | II-17 |
| M.B.1.5 | I-1 | II-18 |
| M.B.1.6 | I-1 | II-19 |
| M.B.1.7 | I-1 | II-20 |
| M.B.1.8 | I-1 | II-21 |
| M.B.1.9 | I-1 | II-22 |
| M.B.1.10 | I-1 | II-23 |
| M.B.1.11 | I-1 | II-24 |
| M.B.1.12 | I-1 | II-25 |
| M.B.1.13 | I-1 | II-26 |
| M.B.1.14 | I-1 | II-27 |
| M.B.1.15 | I-1 | II-28 |
| M.B.1.16 | I-1 | II-29 |

Table B2

Table B2 is as Table B1, in which the compound 1-1 is replaced by compound 1-2, and the mixtures are named from M.B.2.1 to M.B.2.16. In the context of the present invention, each of the rows of Table B2 corresponds to one mixture.

Table B3

Table B3 is as Table B1, in which the compound 1-1 is replaced by compound 1-3, and the mixtures are named from M.B.3.1 to M.B.3.16. In the context of the present invention, each of the rows of Table B3 corresponds to one mixture.

Table B4

Table B4A is as Table B1, in which the compound 1-1 is replaced by compound 1-4, and the mixtures are named from M.B.4.1 to M.B.4.16. In the context of the present invention, each of the rows of Table B4 corresponds to one mixture.

Table B5

Table B5 is as Table B1, in which the compound 1-1 is replaced by compound 1-5, and the mixtures are named from M.B.5.1 to M.B.5.16. In the context of the present invention, each of the rows of Table B5 corresponds to one mixture.

Table B6

Table B6 is as Table B1, in which the compound 1-1 is replaced by compound 1-6, and the mixtures are named from M.B.6.1 to M.B.6.16. In the context of the present invention, each of the rows of Table B6 corresponds to one mixture.

Table B7

Table B7 is as Table B1, in which the compound 1-1 is replaced by compound 1-7, and the mixtures are named from M.B.7.1 to M.B.7.16. In the context of the present invention, each of the rows of Table B7 corresponds to one mixture.

Table B8

Table B8 is as Table B1, in which the compound 1-1 is replaced by compound 1-8, and the mixtures are named from M.B.8.1 to M.B.8.16. In the context of the present invention, each of the rows of Table B8 corresponds to one mixture.

Table B9

Table B9 is as Table B1, in which the compound 1-1 is replaced by compound 1-9, and the mixtures are named from M.B.9.1 to M.B.9.16. In the context of the present invention, each of the rows of Table B9 corresponds to one mixture.

Table B10

Table B10 is as Table B1, in which the compound 1-1 is replaced by compound 1-10, and the mixtures are named from M.B.10.1 to M.B.10.16. In the context of the present invention, each of the rows of Table B10 corresponds to one mixture.

Table B11

Table B11 is as Table B1, in which the compound 1-1 is replaced by compound 1-11, and the mixtures are named from M.B.11.1 to M.B.11.16. In the context of the present invention, each of the rows of Table B11 corresponds to one mixture.

Table B12

Table B12 is as Table B1, in which the compound 1-1 is replaced by compound 1-12, and the mixtures are named from M.B.12.1 to M.B.12.16. In the context of the present invention, each of the rows of Table B12 corresponds to one mixture.

All tables B are preferred embodiments of the present invention. Within table B1 to table B12, the following mixtures are preferred:
M.B.1.1, M.B.1.2, M.B.1.3, M.B.1.4, M.B.1.6, M.B.1.12, M.B.1.13, M.B.1.14, M.B.1.15, M.B.1.16, M.B.2.1, M.B.2.2, M.B.2.3, M.B.2.4, M.B.2.6, M.B.2.12, M.B.2.13, M.B.2.14, M.B.2.15, M.B.2.16, M.B.3.1, M.B.3.2, M.B.3.3, M.B.3.4, M.B.3.6, M.B.3.12, M.B.3.13, M.B.3.14, M.B.3.15, M.B.3.16, M.B.4.1, M.B.4.2, M.B.4.3, M.B.4.4, M.B.4.6, M.B.4.12, M.B.4.13, M.B.4.14, M.B.4.15, M.B.4.16, M.B.5.1, M.B.5.2, M.B.5.3, M.B.5.4, M.B.5.6, M.B.5.12, M.B.5.13, M.B.5.14, M.B.5.15, M.B.5.16, M.B.6.1, M.B.6.2, M.B.6.3, M.B.6.4, M.B.6.6, M.B.6.12, M.B.6.13, M.B.6.14, M.B.6.15, M.B.6.16, M.B.7.1, M.B.7.2, M.B.7.3, M.B.7.4, M.B.7.6, M.B.7.12, M.B.7.13, M.B.7.14, M.B.7.15, M.B.7.16, M.B.8.1, M.B.8.2, M.B.8.3, M.B.8.4, M.B.8.6, M.B.8.12, M.B.8.13, M.B.8.14, M.B.8.15, M.B.8.16, M.B.9.1, M.B.9.2, M.B.9.3, M.B.9.4, M.B.9.6, M.B.9.12, M.B.9.13, M.B.9.14, M.B.9.15, M.B.9.16, M.B.10.1, M.B.10.2, M.B.10.3, M.B.10.4, M.B.10.6, M.B.10.12, M.B.10.13, M.B.10.14, M.B.10.15, M.B.10.16, M.B.11.1, M.B.11.2, M.B.11.3, M.B.11.4, M.B.11.6, M.B.11.12, M.B.11.13, M.B.11.14, M.B.11.15, M.B.11.16, M.B.12.1, M.B.12.2, M.B.12.3, M.B.12.4, M.B.12.6, M.B.12.12, M.B.12.13, M.B.12.14, M.B.12.15 and M.B.12.16.

Within table B1 to table B12, the following mixtures are more preferred:
M.B.1.3, M.B.1.6, M.B.2.3, M.B.2.6, M.B.3.3, M.B.3.6, M.B.4.3, M.B.4.6, M.B.5.3, M.B.5.6, M.B.6.3, M.B.6.6, M.B.7.3, M.B.7.6, M.B.8.3, M.B.8.6, M.B.9.3, M.B.9.6, M.B.10.3, M.B.10.6, M.B.11.3, M.B.11.6, M.B.12.3 and M.B.12.6.

TABLE C1

| No | I | II |
|---|---|---|
| M.C.1.1 | I-1 | II-30 |
| M.C.1.2 | I-1 | II-31 |
| M.C.1.3 | I-1 | II-32 |
| M.C.1.4 | I-1 | II-33 |
| M.C.1.5 | I-1 | II-34 |
| M.C.1.6 | I-1 | II-35 |
| M.C.1.7 | I-1 | II-36 |
| M.C.1.8 | I-1 | II-37 |
| M.C.1.9 | I-1 | II-38 |
| M.C.1.10 | I-1 | II-39 |
| M.C.1.11 | I-1 | II-40 |
| M.C.1.12 | I-1 | II-41 |
| M.C.1.13 | I-1 | II-42 |
| M.C.1.14 | I-1 | II-43 |
| M.C.1.15 | I-1 | II-44 |
| M.C.1.16 | I-1 | II-45 |
| M.C.1.17 | I-1 | II-46 |
| M.C.1.18 | I-1 | II-47 |
| M.C.1.19 | I-1 | II-48 |
| M.C.1.20 | I-1 | II-49 |
| M.C.1.21 | I-1 | II-50 |
| M.C.1.22 | I-1 | II-51 |
| M.C.1.23 | I-1 | II-52 |
| M.C.1.24 | I-1 | II-53 |
| M.C.1.25 | I-1 | II-54 |
| M.C.1.26 | I-1 | II-55 |
| M.C.1.27 | I-1 | II-56 |
| M.C.1.28 | I-1 | II-57 |
| M.C.1.29 | I-1 | II-58 |

Table C2

Table C2 is as Table C1, in which the compound I-1 is replaced by compound I-2, and the mixtures are named from M.C.2.1 to M.C.2.29. In the context of the present invention, each of the rows of Table C2 corresponds to one mixture.

Table C3

Table C3 is as Table C1, in which the compound I-1 is replaced by compound 1-3, and the mixtures are named from M.C.3.1 to M.C.3.29. In the context of the present invention, each of the rows of Table C3 corresponds to one mixture.

Table C4

Table C4A is as Table C1, in which the compound I-1 is replaced by compound 1-4, and the mixtures are named from M.C.4.1 to M.C.4.29. In the context of the present invention, each of the rows of Table C4 corresponds to one mixture.

Table C5

Table C5 is as Table C1, in which the compound I-1 is replaced by compound 1-5, and the mixtures are named from M.C.5.1 to M.C.5.29. In the context of the present invention, each of the rows of Table C5 corresponds to one mixture.

Table C6

Table C6 is as Table C1, in which the compound I-1 is replaced by compound 1-6, and the mixtures are named from M.C.6.1 to M.C.6.29. In the context of the present invention, each of the rows of Table C6 corresponds to one mixture.

Table C7

Table C7 is as Table C1, in which the compound I-1 is replaced by compound 1-7, and the mixtures are named from M.C.7.1 to M.C.7.29. In the context of the present invention, each of the rows of Table C7 corresponds to one mixture.

Table C8

Table C8 is as Table C1, in which the compound I-1 is replaced by compound I-8, and the mixtures are named from M.C.8.1 to M.C.8.29. In the context of the present invention, each of the rows of Table C8 corresponds to one mixture.

Table C9

Table C9 is as Table C1, in which the compound I-1 is replaced by compound I-9, and the mixtures are named from M.C.9.1 to M.C.9.29. In the context of the present invention, each of the rows of Table C9 corresponds to one mixture.

Table C10

Table C10 is as Table C1, in which the compound I-1 is replaced by compound I-10, and the mixtures are named from M.C.10.1 to M.C.10.29. In the context of the present invention, each of the rows of Table C10 corresponds to one mixture.

Table C11

Table C11 is as Table C1, in which the compound I-1 is replaced by compound I-11, and the mixtures are named from M.C.11.1 to M.C.11.29. In the context of the present invention, each of the rows of Table C11 corresponds to one mixture.

Table C12

Table C12 is as Table C1, in which the compound I-1 is replaced by compound I-12, and the mixtures are named from M.C.12.1 to M.C.12.29. In the context of the present invention, each of the rows of Table C12 corresponds to one mixture.

All tables C are preferred embodiments of the present invention. Within Table C1 to Table C12, the following mixtures are preferred: M.C.1.3, M.C.1.4, M.C.1.7, M.C.1.15, M.C.1.20, M.C.1.21, M.C.1.23, M.C.1.27, M.C.2.3, M.C.2.4, M.C.2.7, M.C.2.15, M.C.2.20, M.C.2.21, M.C.2.23, M.C.2.27, M.C.3.3, M.C.3.4, M.C.3.7, M.C.3.15, M.C.3.20, M.C.3.21, M.C.3.23, M.C.3.27, M.C.4.3, M.C.4.4, M.C.4.7, M.C.4.15, M.C.4.20, M.C.4.21, M.C.4.23, M.C.4.27, M.C.5.3, M.C.5.4, M.C.5.7, M.C.5.15, M.C.5.20, M.C.5.21, M.C.5.23, M.C.5.27, M.C.6.3, M.C.6.4, M.C.6.7, M.C.6.15, M.C.6.20, M.C.6.21, M.C.6.23, M.C.6.27, M.C.7.3, M.C.7.4, M.C.7.7, M.C.7.15, M.C.7.20, M.C.7.21, M.C.7.23, M.C.7.27, M.C.8.3, M.C.8.4, M.C.8.7, M.C.8.15, M.C.8.20, M.C.8.21, M.C.8.23, M.C.8.27, M.C.9.3, M.C.9.4, M.C.9.7, M.C.9.15, M.C.9.20, M.C.9.21, M.C.9.23, M.C.9.27, M.C.10.3, M.C.10.4, M.C.10.7, M.C.10.15, M.C.10.20, M.C.10.21, M.C.10.23, M.C.10.27, M.C.11.3, M.C.11.4, M.C.11.7, M.C.11.15, M.C.11.20, M.C.11.21, M.C.11.23, M.C.11.27, M.C.12.3, M.C.12.4, M.C.12.7, M.C.12.15, M.C.12.20, M.C.12.21, M.C.12.23 and M.C.12.27.

Within Table C1 to Table C12, the following mixtures are more preferred: M.C.1.15, M.C.2.15, M.C.3.15, M.C.4.15, M.C.5.15, M.C.6.15, M.C.7.15, M.C.8.15, M.C.9.15, M.C.10.15, M.C.11.15, M.C.12.15, M.C.1.20, M.C.2.20, M.C.3.20, M.C.4.20, M.C.5.20, M.C.6.20, M.C.7.20, M.C.8.20, M.C.9.20, M.C.10.20, M.C.11.20, M.C.12.20, M.C.1.21, M.C.2.21, M.C.3.21, M.C.4.21, M.C.5.21, M.C.6.21, M.C.7.21, M.C.8.21, M.C.9.21, M.C.10.21, M.C.11.21 and M.C.12.21.

TABLE D1

| No | I | II |
|---|---|---|
| M.D.1.1 | I-1 | II-59 |
| M.D.1.2 | I-1 | II-60 |
| M.D.1.3 | I-1 | II-61 |
| M.D.1.4 | I-1 | II-62 |
| M.D.1.5 | I-1 | II-63 |
| M.D.1.6 | I-1 | II-64 |

Table D2

Table D2 is as Table D1, in which the compound I-1 is replaced by compound I-2, and the mixtures are named from M.D.2.1 to M.D.2.6. In the context of the present invention, each of the rows of Table D2 corresponds to one mixture.

Table D3

Table D3 is as Table D1, in which the compound I-1 is replaced by compound I-3, and the mixtures are named from M.D.3.1 to M.D.3.6. In the context of the present invention, each of the rows of Table D3 corresponds to one mixture.

Table D4

Table D4A is as Table D1, in which the compound I-1 is replaced by compound I-4, and the mixtures are named from M.D.4.1 to M.D.4.6. In the context of the present invention, each of the rows of Table D4 corresponds to one mixture.

Table D5

Table D5 is as Table D1, in which the compound I-1 is replaced by compound I-5, and the mixtures are named from M.D.5.1 to M.D.5.6. In the context of the present invention, each of the rows of Table D5 corresponds to one mixture.

Table D6

Table D6 is as Table D1, in which the compound I-1 is replaced by compound I-6, and the mixtures are named from M.D.6.1 to M.D.6.6. In the context of the present invention, each of the rows of Table D6 corresponds to one mixture.

Table D7

Table D7 is as Table D1, in which the compound I-1 is replaced by compound I-7, and the mixtures are named from M.D.7.1 to M.D.7.6. In the context of the present invention, each of the rows of Table D7 corresponds to one mixture.

Table D8

Table D8 is as Table D1, in which the compound I-1 is replaced by compound I-8, and the mixtures are named from M.D.8.1 to M.D.8.6. In the context of the present invention, each of the rows of Table D8 corresponds to one mixture.

Table D9

Table D9 is as Table D1, in which the compound I-1 is replaced by compound I-9, and the mixtures are named from M.D.9.1 to M.D.9.6. In the context of the present invention, each of the rows of Table D9 corresponds to one mixture.

Table D10

Table D10 is as Table D1, in which the compound I-1 is replaced by compound I-10, and the mixtures are named from M.D.10.1 to M.D.10.6. In the context of the present invention, each of the rows of Table D10 corresponds to one mixture.

Table D11

Table D11 is as Table D1, in which the compound I-1 is replaced by compound I-11, and the mixtures are named from M.D.11.1 to M.D.11.6. In the context of the present invention, each of the rows of Table D11 corresponds to one mixture.

Table D12

Table D12 is as Table D1, in which the compound I-1 is replaced by compound I-12, and the mixtures are named from M.D.12.1 to M.D.12.6. In the context of the present invention, each of the rows of Table D12 corresponds to one mixture.

All tables D are preferred embodiments of the present invention. Within Table D1 to Table D12, the following mixtures are preferred: M.D.1.3, M.D.2.3, M.D.3.3, M.D.4.3, M.D.5.3, M.D.6.3, M.D.7.3, M.D.8.3, M.D.9.3, M.D.10.3, M.D.11.3, M.D.12.3, M.D.1.4, M.D.2.4, M.D.3.4, M.D.4.4, M.D.5.4, M.D.6.4, M.D.7.4, M.D.8.4, M.D.9.4, M.D.10.4, M.D.11.4, M.D.12.4, M.D.1.6, M.D.2.6, M.D.3.6, M.D.4.6, M.D.5.6, M.D.6.6, M.D.7.6, M.D.8.6, M.D.9.6, M.D.10.6, M.D.11.6 and M.D.12.6. Within Table D1 to Table D12, the following mixtures are more preferred: M.D.1.3, M.D.2.3, M.D.3.3, M.D.4.3, M.D.5.3, M.D.6.3, M.D.7.3, M.D.8.3, M.D.9.3, M.D.10.3, M.D.11.3, M.D.12.3, M.D.1.4, M.D.2.4, M.D.3.4, M.D.4.4, M.D.5.4, M.D.6.4, M.D.7.4, M.D.8.4, M.D.9.4, M.D.10.4, M.D.11.4, M.D.12.4, M.D.1.6, M.D.2.6, M.D.3.6, M.D.4.6, M.D.5.6, M.D.6.6, M.D.7.6, M.D.8.6, M.D.9.6, M.D.10.6, M.D.11.6 and M.D.12.6.

TABLE E1

| Table E1 | | |
| --- | --- | --- |
| No | I | II |
| M.F.1.1 | I-1 | II-65 |
| M.F.1.2 | I-1 | II-66 |
| M.F.1.3 | I-1 | II-67 |
| M.F.1.4 | I-1 | II-68 |
| M.F.1.5 | I-1 | II-69 |

Table E2

Table E2 is as Table E1, in which the compound I-1 is replaced by compound I-2, and the mixtures are named from M.E.2.1 to M.E.2.5. In the context of the present invention, each of the rows of Table E2 corresponds to one mixture.

Table E3

Table E3 is as Table E1, in which the compound I-1 is replaced by compound I-3, and the mixtures are named from M.E.3.1 to M.E.3.5. In the context of the present invention, each of the rows of Table E3 corresponds to one mixture.

Table E4

Table E4A is as Table E1, in which the compound I-1 is replaced by compound I-4, and the mixtures are named from M.E.4.1 to M.E.4.5. In the context of the present invention, each of the rows of Table E4 corresponds to one mixture.

Table E5

Table E5 is as Table E1, in which the compound I-1 is replaced by compound I-5, and the mixtures are named from M.E.5.1 to M.E.5.5. In the context of the present invention, each of the rows of Table E5 corresponds to one mixture.

Table E6

Table E6 is as Table E1, in which the compound I-1 is replaced by compound I-6, and the mixtures are named from M.E.6.1 to M.E.6.5. In the context of the present invention, each of the rows of Table E6 corresponds to one mixture.

Table E7

Table E7 is as Table E1, in which the compound I-1 is replaced by compound I-7, and the mixtures are named from M.E.7.1 to M.E.7.5. In the context of the present invention, each of the rows of Table E7 corresponds to one mixture.

Table E8

Table E8 is as Table E1, in which the compound I-1 is replaced by compound I-8, and the mixtures are named from M.E.8.1 to M.E.8.5. In the context of the present invention, each of the rows of Table E8 corresponds to one mixture.

Table E9

Table E9 is as Table E1, in which the compound I-1 is replaced by compound I-9, and the mixtures are named from M.E.9.1 to M.E.9.5. In the context of the present invention, each of the rows of Table E9 corresponds to one mixture.

Table E10

Table E10 is as Table E1, in which the compound I-1 is replaced by compound I-10, and the mixtures are named from M.E.10.1 to M.E.10.5. In the context of the present invention, each of the rows of Table E10 corresponds to one mixture.

Table E1

Table E11 is as Table E1, in which the compound I-1 is replaced by compound I-11, and the mixtures are named from M.E.11.1 to M.E.11.5. In the context of the present invention, each of the rows of Table E11 corresponds to one mixture.

Table E12

Table E12 is as Table E1, in which the compound I-1 is replaced by compound I-12, and the mixtures are named from M.E.12.1 to M.E.12.5. In the context of the present invention, each of the rows of Table E12 corresponds to one mixture.

All tables E are preferred embodiments of the present invention. Within Table E1 to Table E12, the following mixtures are preferred: M.E.1.5, M.E.2.5, M.E.3.5, M.E.4.5, M.E.5.5, M.E.6.5, M.E.7.5, M.E.8.5, M.E.9.5, M.E.10.5, M.E.11.5 and M.E.12.5.

TABLE F1

| Table F1 | | |
| --- | --- | --- |
| No | I | II |
| M.F.1.1 | I-1 | II-70 |
| M.F.1.2 | I-1 | II-71 |
| M.F.1.3 | I-1 | II-72 |
| M.F.1.4 | I-1 | II-73 |
| M.F.1.5 | I-1 | II-74 |
| M.F.1.6 | I-1 | II-75 |
| M.F.1.7 | I-1 | II-76 |

Table F2

Table F2 is as Table F1, in which the compound I-1 is replaced by compound I-2, and the mixtures are named from M.F.2.1 to M.F.2.7. In the context of the present invention, each of the rows of Table F2 corresponds to one mixture.

Table F3

Table F3 is as Table F1, in which the compound I-1 is replaced by compound I-3, and the mixtures are named from M.F.3.1 to M.F.3.7. In the context of the present invention, each of the rows of Table F3 corresponds to one mixture.

Table F4

Table F4A is as Table F1, in which the compound I-1 is replaced by compound I-4, and the mixtures are named from M.F.4.1 to M.F.4.7. In the context of the present invention, each of the rows of Table F4 corresponds to one mixture.

Table F5

Table F5 is as Table F1, in which the compound I-1 is replaced by compound I-5, and the mixtures are named from M.F.5.1 to M.F.5.7. In the context of the present invention, each of the rows of Table F5 corresponds to one mixture.

Table F6

Table F6 is as Table F1, in which the compound I-1 is replaced by compound I-6, and the mixtures are named from M.F.6.1 to M.F.6.7. In the context of the present invention, each of the rows of Table F6 corresponds to one mixture.

Table F7

Table F7 is as Table F1, in which the compound I-1 is replaced by compound I-7, and the mixtures are named from M.F.7.1 to M.F.7.7. In the context of the present invention, each of the rows of Table F7 corresponds to one mixture.

Table F8

Table F8 is as Table F1, in which the compound I-1 is replaced by compound I-8, and the mixtures are named from M.F.8.1 to M.F.8.7. In the context of the present invention, each of the rows of Table F8 corresponds to one mixture.

Table F9

Table F9 is as Table F1, in which the compound I-1 is replaced by compound I-9, and the mixtures are named from M.F.9.1 to M.F.9.7. In the context of the present invention, each of the rows of Table F9 corresponds to one mixture.

Table F10

Table F10 is as Table F1, in which the compound I-1 is replaced by compound I-10, and the mixtures are named from M.F.10.1 to M.F.10.7. In the context of the present invention, each of the rows of Table F10 corresponds to one mixture.

Table F11

Table F11 is as Table F1, in which the compound I-1 is replaced by compound I-11, and the mixtures are named from M.F.11.1 to M.F.11.7. In the context of the present invention, each of the rows of Table F11 corresponds to one mixture.

Table F12

Table F12 is as Table F1, in which the compound I-1 is replaced by compound I-12, and the mixtures are named from M.F.12.1 to M.F.12.7. In the context of the present invention, each of the rows of Table F12 corresponds to one mixture.

All tables F are preferred embodiments of the present invention. Within Table F1 to Table F12, the following mixtures are preferred:

M.F.1.7, M.F.1.6, M.F.2.7, M.F.2.6, M.F.3.7, M.F.3.6, M.F.4.7, M.F.4.6, M.F.5.7, M.F.5.6, M.F.6.7, M.F.6.7, M.F.7.6, M.F.7.7, M.F.8.6, M.F.8.7, M.F.9.6, M.F.9.7, M.F.10.6, M.F.10.7, M.F.11.6, M.F.11.7, M.F.12.6 and M.F.12.7.

Within Table F1 to Table F12, the following mixtures are more preferred:

M.F.1.7, M.F.2.7, M.F.3.7, M.F.4.7, M.F.5.7, M.F.6.7, M.F.7.7, M.F.8.7, M.F.9.7, M.F.10.7, M.F.11.7 and M.F.12.7.

TABLE G1

| No | I | II |
|---|---|---|
| M.G.1.1 | I-1 | II-77 |
| M.G.1.2 | I-1 | II-78 |
| M.G.1.3 | I-1 | II-79 |
| M.G.1.4 | I-1 | II-80 |
| M.G.1.5 | I-1 | II-81 |
| M.G.1.6 | I-1 | II-82 |
| M.G.1.7 | I-1 | II-83 |
| M.G.1.8 | I-1 | II-84 |
| M.G.1.9 | I-1 | II-85 |
| M.G.1.10 | I-1 | II-86 |
| M.G.1.11 | I-1 | II-87 |
| M.G.1.12 | I-1 | II-88 |
| M.G.1.13 | I-1 | II-89 |
| M.G.1.14 | I-1 | II-90 |
| M.G.1.15 | I-1 | II-91 |
| M.G.1.16 | I-1 | II-92 |
| M.G.1.17 | I-1 | II-93 |
| M.G.1.18 | I-1 | II-94 |
| M.G.1.19 | I-1 | II-95 |
| M.G.1.20 | I-1 | II-96 |
| M.G.1.21 | I-1 | II-97 |
| M.G.1.22 | I-1 | II-98 |

Table G2

Table G2 is as Table G1, in which the compound I-1 is replaced by compound I-2, and the mixtures are named from M.G.2.1 to M.G.2.22. In the context of the present invention, each of the rows of Table G2 corresponds to one mixture.

Table G3

Table G3 is as Table G1, in which the compound I-1 is replaced by compound I-3, and the mixtures are named from M.G.3.1 to M.G.3.22. In the context of the present invention, each of the rows of Table G3 corresponds to one mixture.

Table G4

Table G4A is as Table G1, in which the compound I-1 is replaced by compound I-4, and the mixtures are named from M.G.4.1 to M.G.4.22. In the context of the present invention, each of the rows of Table G4 corresponds to one mixture.

Table G5

Table G5 is as Table G1, in which the compound I-1 is replaced by compound I-5, and the mixtures are named from M.G.5.1 to M.G.5.22. In the context of the present invention, each of the rows of Table G5 corresponds to one mixture.

Table G6

Table G6 is as Table G1, in which the compound I-1 is replaced by compound I-6, and the mixtures are named from M.G.6.1 to M.G.6.22. In the context of the present invention, each of the rows of Table G6 corresponds to one mixture.

Table G7

Table G7 is as Table G1, in which the compound I-1 is replaced by compound I-7, and the mixtures are named from M.G.7.1 to M.G.7.22. In the context of the present invention, each of the rows of Table G7 corresponds to one mixture.

Table G8

Table G8 is as Table G1, in which the compound I-1 is replaced by compound I-8, and the mixtures are named from M.G.8.1 to M.G.8.22. In the context of the present invention, each of the rows of Table G8 corresponds to one mixture.

Table G9

Table G9 is as Table G1, in which the compound I-1 is replaced by compound I-9, and the mixtures are named from M.G.9.1 to M.G.9.22. In the context of the present invention, each of the rows of Table G9 corresponds to one mixture.

Table G10

Table G10 is as Table G1, in which the compound I-1 is replaced by compound I-10, and the mixtures are named from M.G.10.1 to M.G.10.22. In the context of the present invention, each of the rows of Table G10 corresponds to one mixture.

Table G11

Table G11 is as Table G1, in which the compound I-1 is replaced by compound I-11, and the mixtures are named from M.G.11.1 to M.G.11.22. In the context of the present invention, each of the rows of Table G11 corresponds to one mixture.

Table G12

Table G12 is as Table G1, in which the compound I-1 is replaced by compound I-12, and the mixtures are named from M.G.12.1 to M.G.12.22. In the context of the present invention, each of the rows of Table G12 corresponds to one mixture.

All tables G are preferred embodiments of the present invention. Within Table G1 to Table G12, the following mixtures are preferred: M.G.1.7, M.G.2.7, M.G.3.7, M.G.4.7, M.G.5.7, M.G.6.7, M.G.7.7, M.G.8.7, M.G.9.7, M.G.10.7, M.G.11.7, M.G.12.7, M.G.1.15, M.G.2.15, M.G.3.15, M.G.4.15, M.G.5.15, M.G.6.15, M.G.7.15, M.G.8.15, M.G.9.15, M.G.10.15, M.G.11.15, M.G.12.15, M.G.1.22, M.G.2.22, M.G.3.22, M.G.4.22, M.G.5.22, M.G.6.22, M.G.7.22, M.G.8.22, M.G.9.22, M.G.10.22, M.G.11.22 and M.G.12.22.

Within Table G1 to Table G12, the following mixtures are more preferred: M.G.1.15, M.G.2.15, M.G.3.15, M.G.4.15, M.G.5.15, M.G.6.15, M.G.7.15, M.G.8.15, M.G.9.15, M.G.10.15, M.G.11.15 and M.G.12.15.

TABLE H1

| No | I | II |
|---|---|---|
| M.H.1.1 | II-1 | II-99 |
| M.H.1.2 | II-1 | II-100 |
| M.H.1.3 | II-1 | II-101 |
| M.H.1.4 | II-1 | II-102 |

TABLE H1-continued

Table H1

| No | I | II |
|---|---|---|
| M.H.1.5 | II-1 | II-103 |
| M.H.1.6 | II-1 | II-104 |
| M.H.1.7 | II-1 | II-105 |
| M.H.1.8 | II-1 | II-106 |
| M.H.1.9 | II-1 | II-107 |
| M.H.1.10 | II-1 | II-108 |
| M.H.1.11 | II-1 | II-109 |
| M.H.1.12 | II-1 | II-110 |
| M.H.1.13 | II-1 | II-111 |
| M.H.1.14 | II-1 | II-112 |
| M.H.1.15 | II-1 | II-113 |
| M.H.1.16 | II-1 | II-114 |
| M.H.1.17 | II-1 | II-115 |
| M.H.1.18 | II-1 | II-116 |
| M.H.1.19 | II-1 | II-117 |
| M.H.1.20 | II-1 | II-118 |
| M.H.1.21 | II-1 | II-119 |
| M.H.1.22 | II-1 | II-120 |
| M.H.1.23 | II-1 | II-121 |
| M.H.1.24 | II-1 | II-122 |
| M.H.1.25 | II-1 | II-123 |
| M.H.1.26 | II-1 | II-124 |
| M.H.1.27 | II-1 | II-125 |
| M.H.1.28 | II-1 | II-126 |
| M.H.1.29 | II-1 | II-127 |
| M.H.1.30 | II-1 | II-128 |
| M.H.1.31 | II-1 | II-129 |
| M.H.1.32 | II-1 | II-130 |
| M.H.1.33 | II-1 | II-131 |
| M.H.1.34 | II-1 | II-132 |
| M.H.1.35 | II-1 | II-133 |
| M.H.1.36 | II-1 | II-134 |
| M.H.1.37 | II-1 | II-135 |
| M.H.1.38 | II-1 | II-136 |
| M.H.1.39 | II-1 | II-137 |
| M.H.1.40 | II-1 | II-138 |
| M.H.1.41 | II-1 | II-139 |
| M.H.1.42 | II-1 | II-140 |
| M.H.1.43 | II-1 | II-141 |
| M.H.1.44 | II-1 | II-142 |
| M.H.1.45 | II-1 | II-143 |
| M.H.1.46 | II-1 | II-144 |
| M.H.1.47 | II-1 | II-145 |
| M.H.1.48 | II-1 | II-146 |
| M.H.1.49 | II-1 | II-147 |
| M.H.1.50 | II-1 | II-148 |
| M.H.1.51 | II-1 | II-149 |
| M.H.1.52 | II-1 | II-150 |
| M.H.1.53 | II-1 | II-151 |
| M.H.1.54 | II-1 | II-152 |
| M.H.1.55 | II-1 | II-153 |
| M.H.1.56 | II-1 | II-154 |
| M.H.1.57 | II-1 | II-155 |
| M.H.1.58 | II-1 | II-156 |
| M.H.1.59 | II-1 | II-157 |
| M.H.1.60 | II-1 | II-158 |
| M.H.1.61 | II-1 | II-159 |
| M.H.1.62 | II-1 | II-160 |
| M.H.1.63 | II-1 | II-161 |
| M.H.1.64 | II-1 | II-162 |
| M.H.1.65 | II-1 | II-163 |
| M.H.1.66 | II-1 | II-164 |
| M.H.1.67 | II-1 | II-165 |
| M.H.1.68 | II-1 | II-166 |
| M.H.1.69 | II-1 | II-167 |
| M.H.1.70 | II-1 | II-168 |
| M.H.1.71 | II-1 | II-169 |
| M.H.1.72 | II-1 | II-170 |
| M.H.1.73 | II-1 | II-171 |
| M.H.1.74 | II-1 | II-172 |
| M.H.1.75 | II-1 | II-173 |
| M.H.1.76 | II-1 | II-174 |
| M.H.1.77 | II-1 | II-175 |
| M.H.1.78 | II-1 | II-176 |
| M.H.1.79 | II-1 | II-177 |
| M.H.1.80 | II-1 | II-178 |
| M.H.1.81 | II-1 | II-179 |
| M.H.1.82 | II-1 | II-180 |
| M.H.1.83 | II-1 | II-181 |
| M.H.1.84 | II-1 | II-182 |
| M.H.1.85 | II-1 | II-183 |
| M.H.1.86 | II-1 | II-184 |
| M.H.1.87 | II-1 | II-185 |
| M.H.1.88 | II-1 | II-186 |
| M.H.1.89 | II-1 | II-187 |
| M.H.1.90 | II-1 | II-188 |
| M.H.1.91 | II-1 | II-189 |
| M.H.1.92 | II-1 | II-190 |
| M.H.1.93 | II-1 | II-191 |

Table H2

Table H2 is as Table H1, in which the compound I-1 is replaced by compound I-2, and the mixtures are named from M.H.2.1 to M.H.2.93. In the context of the present invention, each of the rows of Table H2 corresponds to one mixture.

Table H3

Table H3 is as Table H1, in which the compound I-1 is replaced by compound I-3, and the mixtures are named from M.H.3.1 to M.H.3.93. In the context of the present invention, each of the rows of Table H3 corresponds to one mixture.

Table H4

Table H4A is as Table H1, in which the compound I-1 is replaced by compound I-4, and the mixtures are named from M.H.4.1 to M.H.4.93. In the context of the present invention, each of the rows of Table H4 corresponds to one mixture.

Table H5

Table H5 is as Table H1, in which the compound I-1 is replaced by compound I-5, and the mixtures are named from M.H.5.1 to M.H.5. 93. In the context of the present invention, each of the rows of Table H5 corresponds to one mixture.

Table H6

Table H6 is as Table H1, in which the compound I-1 is replaced by compound I-6, and the mixtures are named from M.H.6.1 to M.H.6.93. In the context of the present invention, each of the rows of Table H6 corresponds to one mixture.

Table H7

Table H7 is as Table H1, in which the compound I-1 is replaced by compound I-7, and the mixtures are named from M.H.7.1 to M.H.7.93. In the context of the present invention, each of the rows of Table H7 corresponds to one mixture.

Table H8

Table H8 is as Table H1, in which the compound I-1 is replaced by compound I-8, and the mixtures are named from M.H.8.1 to M.H.8.93. In the context of the present invention, each of the rows of Table H8 corresponds to one mixture.

Table H9

Table H9 is as Table H1, in which the compound I-1 is replaced by compound I-9, and the mixtures are named from M.H.9.1 to M.H.9.93. In the context of the present invention, each of the rows of Table H9 corresponds to one mixture.

Table H10

Table H10 is as Table H1, in which the compound I-1 is replaced by compound I-10, and the mixtures are named from M.H.10.1 to M.H.10.93. In the context of the present invention, each of the rows of Table H10 corresponds to one mixture.

Table H11

Table H11 is as Table H1, in which the compound I-1 is replaced by compound I-11, and the mixtures are named from M.H.11.1 to M.H.11.93. In the context of the present invention, each of the rows of Table H11 corresponds to one mixture.

Table H12

Table H12 is as Table H1, in which the compound I-1 is replaced by compound I-12, and the mixtures are named from M.H.12.1 to M.H.12.93. In the context of the present invention, each of the rows of Table H12 corresponds to one mixture.

The invention also relates to the ternary mixtures comprising one compound I and two compounds II. In particular, the present invention relates to the ternary mixtures set forth in Table Z.

Within Table Z, the following abbreviations are used:

azoxystrobin (IIa-1); kresoxim-methyl(IIa-2); mandestrobin (IIa-3) metaminostrobin (IIa-4); picoxystrobin (IIa-5); pyraclostrobin (IIa-6) trifloxystrobin (IIa-7); benzovindiflupyr (IIb-1); bixafen (IIb-2) boscalid (IIb-3); fluopyram (IIb-4); fluxapyroxad (IIb-5) 3 (difluoromethyl)-1-methyl-N-(1,1,3-trimethyl¬indan-4-yl)pyrazole-4-carboxamide (IIb-6) 3 (trifluoromethyl)-1-methyl-N-(1,1,3-trimethyl¬indan-4-yl)pyrazole-4-carboxamide (IIb-7) 1,3-dimethyl-N-(1,1,3-trimethylindan-4-yl)pyr¬azole-4-carboxamide (IIb-8) 3-(trifluorometh-yl)-1,5-dimethyl-N-(1,1,3-trimethylindan-4-yl)¬pyrazole-4-carboxamide (IIb-9) 1,3,5-tri-methyl-N-(1,1,3-trimethylindan-4-yl)pyrazole-4¬car-iboxamide (IIb-10) cyproconazole (IIc-1); difenoconazole (IIc-2); epoxiconazole (IIc-3); metconazole (IIc-4); propiconazole (IIc-5); prothioconazole (IIc-6); tebuconazole (IIc-7); triticonazole (IIc-8); fenpropimorph (IId-1); fenpropidin (IId-2); spiroxamine (IId-3); mancozeb, (IIe-1); chlorothalonil, (IIe-2); 2,6-di-methyl-1H,5H-[1,4]dithiino[2,3-c:5,6-c']dipyrrole-1,3,5,7(2H,6H)-tetraone (IIe-3) thiophanate-methyl(IIf-1) metrafenone (IIf-2) pyriofenone (IIf-3) "I" means compound I, "II(1)" means the first "II(1)" means the second compound II.

The present invention therefore relates to the following ternary mixtures:

TABLE Z1

| No | I | 11 (1) | II (2) |
|---|---|---|---|
| M.Z.1.1 | I-1 | 11a-1 | IIb-1 |
| M.Z.1.2 | I-1 | IIa-1 | IIb-2 |
| M.Z.1.3 | I-1 | IIa-1 | IIb-3 |
| M.Z.1.4 | I-1 | IIa-1 | IIb-4 |
| M.Z.1.5 | I-1 | IIa-1 | IIb-5 |
| M.Z.1.6 | I-1 | IIa-1 | IIb-6 |
| M.Z.1.7 | I-1 | IIa-2 | IIb-1 |
| M.Z.1.8 | I-1 | IIa-2 | IIb-2 |
| M.Z.1.9 | I-1 | IIa-2 | IIb-3 |
| M.Z.1.10 | I-1 | IIa-2 | IIb-4 |
| M.Z.1.11 | I-1 | IIa-2 | IIb-5 |
| M.Z.1.12 | I-1 | IIa-2 | IIb-6 |
| M.Z.1.13 | I-1 | IIa-2 | IIb-7 |
| M.Z.1.14 | I-1 | IIa-2 | IIb-8 |
| M.Z.1.15 | I-1 | IIa-2 | IIb-9 |
| M.Z.1.16 | I-1 | IIa-2 | IIb-10 |
| M.Z.1.17 | I-1 | IIa-3 | IIb-1 |
| M.Z.1.18 | I-1 | IIa-3 | IIb-2 |
| M.Z.1.19 | I-1 | IIa-3 | IIb-3 |
| M.Z.1.20 | I-1 | IIa-3 | IIb-4 |
| M.Z.1.21 | I-1 | IIa-3 | IIb-5 |
| M.Z.1.22 | I-1 | IIa-3 | IIb-6 |
| M.Z.1.23 | I-1 | IIa-3 | IIb-7 |
| M.Z.1.24 | I-1 | IIa-3 | IIb-8 |
| M.Z.1.25 | I-1 | IIa-3 | IIb-9 |
| M.Z.1.26 | I-1 | IIa-3 | IIb-10 |
| M.Z.1.27 | I-1 | IIa-4 | IIb-1 |
| M.Z.1.28 | I-1 | IIa-4 | IIb-2 |
| M.Z.1.29 | I-1 | IIa-4 | IIb-3 |
| M.Z.1.30 | I-1 | IIa-4 | IIb-4 |
| M.Z.1.31 | I-1 | IIa-4 | IIb-5 |
| M.Z.1.32 | I-1 | IIa-4 | IIb-6 |
| M.Z.1.33 | I-1 | IIa-4 | IIb-7 |
| M.Z.1.34 | I-1 | IIa-4 | IIb-8 |
| M.Z.1.35 | I-1 | IIa-4 | IIb-9 |
| M.Z.1.36 | I-1 | IIa-4 | IIb-10 |
| M.Z.1.37 | I-1 | IIa-5 | IIb-1 |
| M.Z.1.38 | I-1 | IIa-5 | IIb-2 |
| M.Z.1.39 | I-1 | IIa-5 | IIb-3 |
| M.Z.1.40 | I-1 | IIa-5 | IIb-4 |
| M.Z.1.41 | I-1 | IIa-5 | IIb-5 |
| M.Z.1.42 | I-1 | IIa-5 | IIb-6 |
| M.Z.1.43 | I-1 | IIa-5 | IIb-7 |
| M.Z.1.44 | I-1 | IIa-5 | IIb-8 |
| M.Z.1.45 | I-1 | IIa-5 | IIb-9 |
| M.Z.1.46 | I-1 | IIa-5 | IIb-10 |
| M.Z.1.47 | I-1 | IIa-6 | IIb-1 |
| M.Z.1.48 | I-1 | IIa-6 | IIb-2 |
| M.Z.1.49 | I-1 | IIa-6 | IIb-3 |
| M.Z.1.50 | I-1 | IIa-6 | IIb-4 |
| M.Z.1.51 | I-1 | IIa-6 | IIb-5 |
| M.Z.1.52 | I-1 | IIa-6 | IIb-6 |
| M.Z.1.53 | I-1 | IIa-6 | IIb-7 |
| M.Z.1.54 | I-1 | IIa-6 | IIb-8 |
| M.Z.1.55 | I-1 | IIa-6 | IIb-9 |
| M.Z.1.56 | I-1 | IIa-6 | IIb-10 |
| M.Z.1.57 | I-1 | IIa-7 | IIb-1 |
| M.Z.1.58 | I-1 | IIa-7 | IIb-2 |
| M.Z.1.59 | I-1 | IIa-7 | IIb-3 |
| M.Z.1.60 | I-1 | IIa-7 | IIb-4 |
| M.Z.1.61 | I-1 | IIa-7 | IIb-5 |
| M.Z.1.62 | I-1 | IIa-7 | IIb-6 |
| M.Z.1.63 | I-1 | IIa-7 | IIb-7 |
| M.Z.1.64 | I-1 | IIa-7 | IIb-8 |
| M.Z.1.65 | I-1 | IIa-7 | IIb-9 |
| M.Z.1.66 | I-1 | IIa-7 | IIb-10 |
| M.Z.1.67 | I-1 | IIa-1 | IIc-1 |
| M.Z.1.68 | I-1 | IIa-1 | IIc-2 |
| M.Z.1.69 | I-1 | IIa-1 | IIc-3 |
| M.Z.1.70 | I-1 | IIa-1 | IIc-4 |
| M.Z.1.71 | I-1 | IIa-1 | IIc-5 |
| M.Z.1.72 | I-1 | IIa-1 | IIc-6 |
| M.Z.1.73 | I-1 | IIa-1 | IIc-7 |
| M.Z.1.74 | I-1 | IIa-1 | IIc-8 |
| M.Z.1.75 | I-1 | IIa-2 | IIc-1 |
| M.Z.1.76 | I-1 | IIa-2 | IIc-2 |
| M.Z.1.77 | I-1 | IIa-2 | IIc-3 |
| M.Z.1.78 | I-1 | IIa-2 | IIc-4 |

TABLE Z1-continued

| No | I | II (1) | II (2) |
|---|---|---|---|
| M.Z.1.79 | I-1 | IIa-2 | IIc-5 |
| M.Z.1.80 | I-1 | IIa-2 | IIc-6 |
| M.Z.1.81 | I-1 | IIa-2 | IIc-7 |
| M.Z.1.82 | I-1 | IIa-2 | IIc-8 |
| M.Z.1.83 | I-1 | IIa-3 | IIc-1 |
| M.Z.1.84 | I-1 | IIa-3 | IIc-2 |
| M.Z.1.85 | I-1 | IIa-3 | IIc-3 |
| M.Z.1.86 | I-1 | IIa-3 | IIc-4 |
| M.Z.1.87 | I-1 | IIa-3 | IIc-5 |
| M.Z.1.88 | I-1 | IIa-3 | IIc-6 |
| M.Z.1.89 | I-1 | IIa-3 | IIc-7 |
| M.Z.1.90 | I-1 | IIa-3 | IIc-8 |
| M.Z.1.91 | I-1 | IIa-4 | IIc-1 |
| M.Z.1.92 | I-1 | IIa-4 | IIc-2 |
| M.Z.1.93 | I-1 | IIa-4 | IIc-3 |
| M.Z.1.94 | I-1 | IIa-4 | IIc-4 |
| M.Z.1.95 | I-1 | IIa-4 | IIc-5 |
| M.Z.1.96 | I-1 | IIa-4 | IIc-6 |
| M.Z.1.97 | I-1 | IIa-4 | IIc-7 |
| M.Z.1.98 | I-1 | IIa-4 | IIc-8 |
| M.Z.1.99 | I-1 | IIa-5 | IIc-1 |
| M.Z.1.100 | I-1 | IIa-5 | IIc-2 |
| M.Z.1.101 | I-1 | IIa-5 | IIc-3 |
| M.Z.1.102 | I-1 | IIa-5 | IIc-4 |
| M.Z.1.103 | I-1 | IIa-5 | IIc-5 |
| M.Z.1.104 | I-1 | IIa-5 | IIc-6 |
| M.Z.1.105 | I-1 | IIa-5 | IIc-7 |
| M.Z.1.106 | I-1 | IIa-5 | IIc-8 |
| M.Z.1.107 | I-1 | IIa-6 | IIc-1 |
| M.Z.1.108 | I-1 | IIa-6 | IIc-2 |
| M.Z.1.109 | I-1 | IIa-6 | IIc-3 |
| M.Z.1.110 | I-1 | IIa-6 | IIc-4 |
| M.Z.1.111 | I-1 | IIa-6 | IIc-5 |
| M.Z.1.112 | I-1 | IIa-6 | IIc-6 |
| M.Z.1.113 | I-1 | IIa-6 | IIc-7 |
| M.Z.1.114 | I-1 | IIa-6 | IIc-8 |
| M.Z.1.115 | I-1 | IIa-7 | IIc-1 |
| M.Z.1.116 | I-1 | IIa-7 | IIc-2 |
| M.Z.1.117 | I-1 | IIa-7 | IIc-3 |
| M.Z.1.118 | I-1 | IIa-7 | IIc-4 |
| M.Z.1.119 | I-1 | IIa-7 | IIc-5 |
| M.Z.1.120 | I-1 | IIa-7 | IIc-6 |
| M.Z.1.121 | I-1 | IIa-7 | IIc-7 |
| M.Z.1.122 | I-1 | IIa-7 | IIc-8 |
| M.Z.1.123 | I-1 | IIa-1 | IId-1 |
| M.Z.1.124 | I-1 | IIa-1 | IId-2 |
| M.Z.1.125 | I-1 | IIa-1 | IId-3 |
| M.Z.1.126 | I-1 | IIa-2 | IId-1 |
| M.Z.1.127 | I-1 | IIa-2 | IId-2 |
| M.Z.1.128 | I-1 | IIa-2 | IId-3 |
| M.Z.1.129 | I-1 | IIa-3 | IId-1 |
| M.Z.1.130 | I-1 | IIa-3 | IId-2 |
| M.Z.1.131 | I-1 | IIa-3 | IId-3 |
| M.Z.1.132 | I-1 | IIa-4 | IId-1 |
| M.Z.1.133 | I-1 | IIa-4 | IId-2 |
| M.Z.1.134 | I-1 | IIa-4 | IId-3 |
| M.Z.1.135 | I-1 | IIa-5 | IId-1 |
| M.Z.1.136 | I-1 | IIa-5 | IId-2 |
| M.Z.1.137 | I-1 | IIa-5 | IId-3 |
| M.Z.1.138 | I-1 | IIa-6 | IId-1 |
| M.Z.1.139 | I-1 | IIa-6 | IId-2 |
| M.Z.1.140 | I-1 | IIa-6 | IId-3 |
| M.Z.1.141 | I-1 | IIa-7 | IId-1 |
| M.Z.1.142 | I-1 | IIa-7 | IId-2 |
| M.Z.1.143 | I-1 | IIa-7 | IId-3 |
| M.Z.1.144 | I-1 | IIa-1 | IIe-1 |
| M.Z.1.145 | I-1 | IIa-1 | IIe-2 |
| M.Z.1.146 | I-1 | IIa-1 | IIe-3 |
| M.Z.1.147 | I-1 | IIa-2 | IIe-1 |
| M.Z.1.148 | I-1 | IIa-2 | IIe-2 |
| M.Z.1.149 | I-1 | IIa-2 | IIe-3 |
| M.Z.1.150 | I-1 | IIa-3 | IIe-1 |
| M.Z.1.151 | I-1 | IIa-3 | IIe-2 |
| M.Z.1.152 | I-1 | IIa-3 | IIe-3 |
| M.Z.1.153 | I-1 | IIa-4 | IIe-1 |
| M.Z.1.154 | I-1 | IIa-4 | IIe-2 |
| M.Z.1.155 | I-1 | IIa-4 | IIe-3 |
| M.Z.1.156 | I-1 | IIa-5 | IIe-1 |
| M.Z.1.157 | I-1 | IIa-5 | IIe-2 |
| M.Z.1.158 | I-1 | IIa-5 | IIe-3 |
| M.Z.1.159 | I-1 | IIa-6 | IIe-1 |
| M.Z.1.160 | I-1 | IIa-6 | IIe-2 |
| M.Z.1.161 | I-1 | IIa-6 | IIe-3 |
| M.Z.1.162 | I-1 | IIa-7 | IIe-1 |
| M.Z.1.163 | I-1 | IIa-7 | IIe-2 |
| M.Z.1.164 | I-1 | IIa-7 | IIe-3 |
| M.Z.1.165 | I-1 | IIa-1 | IIf-1 |
| M.Z.1.166 | I-1 | IIa-1 | IIf-2 |
| M.Z.1.167 | I-1 | IIa-1 | IIf-3 |
| M.Z.1.168 | I-1 | IIa-2 | IIf-1 |
| M.Z.1.169 | I-1 | IIa-2 | IIf-2 |
| M.Z.1.170 | I-1 | IIa-2 | IIf-3 |
| M.Z.1.171 | I-1 | IIa-3 | IIf-1 |
| M.Z.1.172 | I-1 | IIa-3 | IIf-2 |
| M.Z.1.173 | I-1 | IIa-3 | IIf-3 |
| M.Z.1.174 | I-1 | IIa-4 | IIf-1 |
| M.Z.1.175 | I-1 | IIa-4 | IIf-2 |
| M.Z.1.176 | I-1 | IIa-4 | IIf-3 |
| M.Z.1.177 | I-1 | IIa-5 | IIf-1 |
| M.Z.1.178 | I-1 | IIa-5 | IIf-2 |
| M.Z.1.179 | I-1 | IIa-5 | IIf-3 |
| M.Z.1.180 | I-1 | IIa-6 | IIf-1 |
| M.Z.1.181 | I-1 | IIa-6 | IIf-2 |
| M.Z.1.182 | I-1 | IIa-6 | IIf-3 |
| M.Z.1.183 | I-1 | IIa-7 | IIf-1 |
| M.Z.1.184 | I-1 | IIa-7 | IIf-2 |
| M.Z.1.185 | I-1 | IIa-7 | IIf-3 |
| M.Z.1.186 | I-1 | IIb-1 | IIc-1 |
| M.Z.1.187 | I-1 | IIb-1 | IIc-2 |
| M.Z.1.188 | I-1 | IIb-1 | IIc-3 |
| M.Z.1.189 | I-1 | IIb-1 | IIc-4 |
| M.Z.1.190 | I-1 | IIb-1 | IIc-5 |
| M.Z.1.191 | I-1 | IIb-1 | IIc-6 |
| M.Z.1.192 | I-1 | IIb-1 | IIc-7 |
| M.Z.1.193 | I-1 | IIb-1 | IIc-8 |
| M.Z.1.194 | I-1 | IIb-2 | IIc-1 |
| M.Z.1.195 | I-1 | IIb-2 | IIc-2 |
| M.Z.1.196 | I-1 | IIb-2 | IIc-3 |
| M.Z.1.197 | I-1 | IIb-2 | IIc-4 |
| M.Z.1.198 | I-1 | IIb-2 | IIc-5 |
| M.Z.1.199 | I-1 | IIb-2 | IIc-6 |
| M.Z.1.200 | I-1 | IIb-2 | IIc-7 |
| M.Z.1.201 | I-1 | IIb-2 | IIc-8 |
| M.Z.1.202 | I-1 | IIb-3 | IIc-1 |
| M.Z.1.203 | I-1 | IIb-3 | IIc-2 |
| M.Z.1.204 | I-1 | IIb-3 | IIc-3 |
| M.Z.1.205 | I-1 | IIb-3 | IIc-4 |
| M.Z.1.206 | I-1 | IIb-3 | IIc-5 |
| M.Z.1.207 | I-1 | IIb-3 | IIc-6 |
| M.Z.1.208 | I-1 | IIb-3 | IIc-7 |
| M.Z.1.209 | I-1 | IIb-3 | IIc-8 |
| M.Z.1.210 | I-1 | IIb-4 | IIc-1 |
| M.Z.1.211 | I-1 | IIb-4 | IIc-2 |
| M.Z.1.212 | I-1 | IIb-4 | IIc-3 |
| M.Z.1.213 | I-1 | IIb-4 | IIc-4 |
| M.Z.1.214 | I-1 | IIb-4 | IIc-5 |
| M.Z.1.215 | I-1 | IIb-4 | IIc-6 |
| M.Z.1.216 | I-1 | IIb-4 | IIc-7 |
| M.Z.1.217 | I-1 | IIb-4 | IIc-8 |
| M.Z.1.218 | I-1 | IIb-5 | IIc-1 |
| M.Z.1.219 | I-1 | IIb-5 | IIc-2 |
| M.Z.1.220 | I-1 | IIb-5 | IIc-3 |
| M.Z.1.221 | I-1 | IIb-5 | IIc-4 |
| M.Z.1.222 | I-1 | IIb-5 | IIc-5 |
| M.Z.1.223 | I-1 | IIb-5 | IIc-6 |
| M.Z.1.224 | I-1 | IIb-5 | IIc-7 |
| M.Z.1.225 | I-1 | IIb-5 | IIc-8 |
| M.Z.1.226 | I-1 | IIb-6 | IIc-1 |
| M.Z.1.227 | I-1 | IIb-6 | IIc-2 |
| M.Z.1.228 | I-1 | IIb-6 | IIc-3 |
| M.Z.1.229 | I-1 | IIb-6 | IIc-4 |
| M.Z.1.230 | I-1 | IIb-6 | IIc-5 |
| M.Z.1.231 | I-1 | IIb-6 | IIc-6 |
| M.Z.1.232 | I-1 | IIb-6 | IIc-7 |
| M.Z.1.233 | I-1 | IIb-6 | IIc-8 |
| M.Z.1.234 | I-1 | IIb-7 | IIc-1 |

TABLE Z1-continued

| No | I | II (1) | II (2) |
|---|---|---|---|
| M.Z.1.235 | I-1 | IIb-7 | IIc-2 |
| M.Z.1.236 | I-1 | IIb-7 | IIc-3 |
| M.Z.1.237 | I-1 | IIb-7 | IIc-4 |
| M.Z.1.238 | I-1 | IIb-7 | IIc-5 |
| M.Z.1.239 | I-1 | IIb-7 | IIc-6 |
| M.Z.1.240 | I-1 | IIb-7 | IIc-7 |
| M.Z.1.241 | I-1 | IIb-7 | IIc-8 |
| M.Z.1.242 | I-1 | IIb-8 | IIc-1 |
| M.Z.1.243 | I-1 | IIb-8 | IIc-2 |
| M.Z.1.244 | I-1 | IIb-8 | IIc-3 |
| M.Z.1.245 | I-1 | IIb-8 | IIc-4 |
| M.Z.1.246 | I-1 | IIb-8 | IIc-5 |
| M.Z.1.247 | I-1 | IIb-8 | IIc-6 |
| M.Z.1.248 | I-1 | IIb-8 | IIc-7 |
| M.Z.1.249 | I-1 | IIb-8 | IIc-8 |
| M.Z.1.250 | I-1 | IIb-9 | IIc-1 |
| M.Z.1.251 | I-1 | IIb-9 | IIc-2 |
| M.Z.1.252 | I-1 | IIb-9 | IIc-3 |
| M.Z.1.253 | I-1 | IIb-9 | IIc-4 |
| M.Z.1.254 | I-1 | IIb-9 | IIc-5 |
| M.Z.1.255 | I-1 | IIb-9 | IIc-6 |
| M.Z.1.256 | I-1 | IIb-9 | IIc-7 |
| M.Z.1.257 | I-1 | IIb-9 | IIc-8 |
| M.Z.1.258 | I-1 | IIb-10 | IIc-1 |
| M.Z.1.259 | I-1 | IIb-10 | IIc-2 |
| M.Z.1.260 | I-1 | IIb-10 | IIc-3 |
| M.Z.1.261 | I-1 | IIb-10 | IIc-4 |
| M.Z.1.262 | I-1 | IIb-10 | IIc-5 |
| M.Z.1.263 | I-1 | IIb-10 | IIc-6 |
| M.Z.1.264 | I-1 | IIb-10 | IIc-7 |
| M.Z.1.265 | I-1 | IIb-10 | IIc-8 |
| M.Z.1.266 | I-1 | IIb-1 | IId-1 |
| M.Z.1.267 | I-1 | IIb-1 | IId-2 |
| M.Z.1.268 | I-1 | IIb-1 | IId-3 |
| M.Z.1.269 | I-1 | IIb-2 | IId-1 |
| M.Z.1.270 | I-1 | IIb-2 | IId-2 |
| M.Z.1.271 | I-1 | IIb-2 | IId-3 |
| M.Z.1.272 | I-1 | IIb-3 | IId-1 |
| M.Z.1.273 | I-1 | IIb-3 | IId-2 |
| M.Z.1.274 | I-1 | IIb-3 | IId-3 |
| M.Z.1.275 | I-1 | IIb-4 | IId-1 |
| M.Z.1.276 | I-1 | IIb-4 | IId-2 |
| M.Z.1.277 | I-1 | IIb-4 | IId-3 |
| M.Z.1.278 | I-1 | IIb-5 | IId-1 |
| M.Z.1.279 | I-1 | IIb-5 | IId-2 |
| M.Z.1.280 | I-1 | IIb-5 | IId-3 |
| M.Z.1.281 | I-1 | IIb-6 | IId-1 |
| M.Z.1.282 | I-1 | IIb-6 | IId-2 |
| M.Z.1.283 | I-1 | IIb-6 | IId-3 |
| M.Z.1.284 | I-1 | IIb-7 | IId-1 |
| M.Z.1.285 | I-1 | IIb-7 | IId-2 |
| M.Z.1.286 | I-1 | IIb-7 | IId-3 |
| M.Z.1.287 | I-1 | IIb-8 | IId-1 |
| M.Z.1.288 | I-1 | IIb-8 | IId-2 |
| M.Z.1.289 | I-1 | IIb-8 | IId-3 |
| M.Z.1.290 | I-1 | IIb-9 | IId-1 |
| M.Z.1.291 | I-1 | IIb-9 | IId-2 |
| M.Z.1.292 | I-1 | IIb-9 | IId-3 |
| M.Z.1.293 | I-1 | IIb-10 | IId-1 |
| M.Z.1.294 | I-1 | IIb-10 | IId-2 |
| M.Z.1.295 | I-1 | IIb-10 | IId-3 |
| M.Z.1.296 | I-1 | IIb-1 | IIe-1 |
| M.Z.1.297 | I-1 | IIb-1 | IIe-2 |
| M.Z.1.298 | I-1 | IIb-1 | IIe-3 |
| M.Z.1.299 | I-1 | IIb-2 | IIe-1 |
| M.Z.1.300 | I-1 | IIb-2 | IIe-2 |
| M.Z.1.301 | I-1 | IIb-2 | IIe-3 |
| M.Z.1.302 | I-1 | IIb-3 | IIe-1 |
| M.Z.1.303 | I-1 | IIb-3 | IIe-2 |
| M.Z.1.304 | I-1 | IIb-3 | IIe-3 |
| M.Z.1.305 | I-1 | IIb-4 | IIe-1 |
| M.Z.1.306 | I-1 | IIb-4 | IIe-2 |
| M.Z.1.307 | I-1 | IIb-4 | IIe-3 |
| M.Z.1.308 | I-1 | IIb-5 | IIe-1 |
| M.Z.1.309 | I-1 | IIb-5 | IIe-2 |
| M.Z.1.310 | I-1 | IIb-5 | IIe-3 |
| M.Z.1.311 | I-1 | IIb-6 | IIe-1 |
| M.Z.1.312 | I-1 | IIb-6 | IIe-2 |
| M.Z.1.313 | I-1 | IIb-6 | IIe-3 |
| M.Z.1.314 | I-1 | IIb-7 | IIe-1 |
| M.Z.1.315 | I-1 | IIb-7 | IIe-2 |
| M.Z.1.316 | I-1 | IIb-7 | IIe-3 |
| M.Z.1.317 | I-1 | IIb-8 | IIe-1 |
| M.Z.1.318 | I-1 | IIb-8 | IIe-2 |
| M.Z.1.319 | I-1 | IIb-8 | IIe-3 |
| M.Z.1.320 | I-1 | IIb-9 | IIe-1 |
| M.Z.1.321 | I-1 | IIb-9 | IIe-2 |
| M.Z.1.322 | I-1 | IIb-9 | IIe-3 |
| M.Z.1.323 | I-1 | IIb-10 | IIe-1 |
| M.Z.1.324 | I-1 | IIb-10 | IIe-2 |
| M.Z.1.325 | I-1 | IIb-10 | IIe-3 |
| M.Z.1.326 | I-1 | IIb-1 | IIf-1 |
| M.Z.1.327 | I-1 | IIb-1 | IIf-2 |
| M.Z.1.328 | I-1 | IIb-1 | IIf-3 |
| M.Z.1.329 | I-1 | IIb-2 | IIf-1 |
| M.Z.1.330 | I-1 | IIb-2 | IIf-2 |
| M.Z.1.331 | I-1 | IIb-2 | IIf-3 |
| M.Z.1.332 | I-1 | IIb-3 | IIf-1 |
| M.Z.1.333 | I-1 | IIb-3 | IIf-2 |
| M.Z.1.334 | I-1 | IIb-3 | IIf-3 |
| M.Z.1.335 | I-1 | IIb-4 | IIf-1 |
| M.Z.1.336 | I-1 | IIb-4 | IIf-2 |
| M.Z.1.337 | I-1 | IIb-4 | IIf-3 |
| M.Z.1.338 | I-1 | IIb-5 | IIf-1 |
| M.Z.1.339 | I-1 | IIb-5 | IIf-2 |
| M.Z.1.340 | I-1 | IIb-5 | IIf-3 |
| M.Z.1.341 | I-1 | IIb-6 | IIf-1 |
| M.Z.1.342 | I-1 | IIb-6 | IIf-2 |
| M.Z.1.343 | I-1 | IIb-6 | IIf-3 |
| M.Z.1.344 | I-1 | IIb-7 | IIf-1 |
| M.Z.1.345 | I-1 | IIb-7 | IIf-2 |
| M.Z.1.346 | I-1 | IIb-7 | IIf-3 |
| M.Z.1.347 | I-1 | IIb-8 | IIf-1 |
| M.Z.1.348 | I-1 | IIb-8 | IIf-2 |
| M.Z.1.349 | I-1 | IIb-8 | IIf-3 |
| M.Z.1.350 | I-1 | IIb-9 | IIf-1 |
| M.Z.1.351 | I-1 | IIb-9 | IIf-2 |
| M.Z.1.352 | I-1 | IIb-9 | IIf-3 |
| M.Z.1.353 | I-1 | IIb-10 | IIf-1 |
| M.Z.1.354 | I-1 | IIb-10 | IIf-2 |
| M.Z.1.355 | I-1 | IIb-10 | IIf-3 |
| M.Z.1.356 | I-1 | IIc-1 | IId-1 |
| M.Z.1.357 | I-1 | IIc-1 | IId-2 |
| M.Z.1.358 | I-1 | IIc-1 | IId-3 |
| M.Z.1.359 | I-1 | IIc-2 | IId-1 |
| M.Z.1.360 | I-1 | IIc-2 | IId-2 |
| M.Z.1.361 | I-1 | IIc-2 | IId-3 |
| M.Z.1.362 | I-1 | IIc-3 | IId-1 |
| M.Z.1.363 | I-1 | IIc-3 | IId-2 |
| M.Z.1.364 | I-1 | IIc-3 | IId-3 |
| M.Z.1.365 | I-1 | IIc-4 | IId-1 |
| M.Z.1.366 | I-1 | IIc-4 | IId-2 |
| M.Z.1.367 | I-1 | IIc-4 | IId-3 |
| M.Z.1.368 | I-1 | IIc-5 | IId-1 |
| M.Z.1.369 | I-1 | IIc-5 | IId-2 |
| M.Z.1.370 | I-1 | IIc-5 | IId-3 |
| M.Z.1.371 | I-1 | IIc-6 | IId-1 |
| M.Z.1.372 | I-1 | IIc-6 | IId-2 |
| M.Z.1.373 | I-1 | IIc-6 | IId-3 |
| M.Z.1.374 | I-1 | IIc-7 | IId-1 |
| M.Z.1.375 | I-1 | IIc-7 | IId-2 |
| M.Z.1.376 | I-1 | IIc-7 | IId-3 |
| M.Z.1.377 | I-1 | IIc-8 | IId-1 |
| M.Z.1.378 | I-1 | IIc-8 | IId-2 |
| M.Z.1.379 | I-1 | IIc-8 | IId-3 |
| M.Z.1.380 | I-1 | IIc-1 | IIe-1 |
| M.Z.1.381 | I-1 | IIc-1 | IIe-2 |
| M.Z.1.382 | I-1 | IIc-1 | IIe-3 |
| M.Z.1.383 | I-1 | IIc-2 | IIe-1 |
| M.Z.1.384 | I-1 | IIc-2 | IIe-2 |
| M.Z.1.385 | I-1 | IIc-2 | IIe-3 |
| M.Z.1.386 | I-1 | IIc-3 | IIe-1 |
| M.Z.1.387 | I-1 | IIc-3 | IIe-2 |
| M.Z.1.388 | I-1 | IIc-3 | IIe-3 |
| M.Z.1.389 | I-1 | IIc-4 | IIe-1 |
| M.Z.1.390 | I-1 | IIc-4 | IIe-2 |

TABLE Z1-continued

| No | I | II (1) | II (2) |
|---|---|---|---|
| M.Z.1.391 | I-1 | IIc-4 | IIe-3 |
| M.Z.1.392 | I-1 | IIc-5 | IIe-1 |
| M.Z.1.393 | I-1 | IIc-5 | IIe-2 |
| M.Z.1.394 | I-1 | IIc-5 | IIe-3 |
| M.Z.1.395 | I-1 | IIc-6 | IIe-1 |
| M.Z.1.396 | I-1 | IIc-6 | IIe-2 |
| M.Z.1.397 | I-1 | IIc-6 | IIe-3 |
| M.Z.1.398 | I-1 | IIc-7 | IIe-1 |
| M.Z.1.399 | I-1 | IIc-7 | IIe-2 |
| M.Z.1.400 | I-1 | IIc-7 | IIe-3 |
| M.Z.1.401 | I-1 | IIc-8 | IIe-1 |
| M.Z.1.402 | I-1 | IIc-8 | IIe-2 |
| M.Z.1.403 | I-1 | IIc-8 | IIe-3 |
| M.Z.1.404 | I-1 | IIc-1 | IIf-1 |
| M.Z.1.405 | I-1 | IIc-1 | IIf-2 |
| M.Z.1.406 | I-1 | IIc-1 | IIf-3 |
| M.Z.1.407 | I-1 | IIc-2 | IIf-1 |
| M.Z.1.408 | I-1 | IIc-2 | IIf-2 |
| M.Z.1.409 | I-1 | IIc-2 | IIf-3 |
| M.Z.1.410 | I-1 | IIc-3 | IIf-1 |
| M.Z.1.411 | I-1 | IIc-3 | IIf-2 |
| M.Z.1.412 | I-1 | IIc-3 | IIf-3 |
| M.Z.1.413 | I-1 | IIc-4 | IIf-1 |
| M.Z.1.414 | I-1 | IIc-4 | IIf-2 |
| M.Z.1.415 | I-1 | IIc-4 | IIf-3 |
| M.Z.1.416 | I-1 | IIc-5 | IIf-1 |
| M.Z.1.417 | I-1 | IIc-5 | IIf-2 |
| M.Z.1.418 | I-1 | IIc-5 | IIf-3 |
| M.Z.1.419 | I-1 | IIc-6 | IIf-1 |
| M.Z.1.420 | I-1 | IIc-6 | IIf-2 |
| M.Z.1.421 | I-1 | IIc-6 | IIf-3 |
| M.Z.1.422 | I-1 | IIc-7 | IIf-1 |
| M.Z.1.423 | I-1 | IIc-7 | IIf-2 |
| M.Z.1.424 | I-1 | IIc-7 | IIf-3 |
| M.Z.1.425 | I-1 | IIc-8 | IIf-1 |
| M.Z.1.426 | I-1 | IIc-8 | IIf-2 |
| M.Z.1.427 | I-1 | IIc-8 | IIf-3 |
| M.Z.1.428 | I-1 | IId-1 | IIe-1 |
| M.Z.1.429 | I-1 | IId-1 | IIe-2 |
| M.Z.1.430 | I-1 | IId-1 | IIe-3 |
| M.Z.1.431 | I-1 | IId-2 | IIe-1 |
| M.Z.1.432 | I-1 | IId-2 | IIe-2 |
| M.Z.1.433 | I-1 | IId-2 | IIe-3 |
| M.Z.1.434 | I-1 | IId-3 | IIe-1 |
| M.Z.1.435 | I-1 | IId-3 | IIe-2 |
| M.Z.1.436 | I-1 | IId-3 | IIe-3 |
| M.Z.1.437 | I-1 | IId-1 | IIf-1 |
| M.Z.1.438 | I-1 | IId-1 | IIf-2 |
| M.Z.1.439 | I-1 | IId-1 | IIf-3 |
| M.Z.1.440 | I-1 | IId-2 | IIf-1 |
| M.Z.1.441 | I-1 | IId-2 | IIf-2 |
| M.Z.1.442 | I-1 | IId-2 | IIf-3 |
| M.Z.1.443 | I-1 | IId-3 | IIf-1 |
| M.Z.1.444 | I-1 | IId-3 | IIf-2 |
| M.Z.1.445 | I-1 | IId-3 | IIf-3 |
| M.Z.1.446 | I-1 | IIe-1 | IIf-1 |
| M.Z.1.447 | I-1 | IIe-1 | IIf-2 |
| M.Z.1.448 | I-1 | IIe-1 | IIf-3 |
| M.Z.1.449 | I-1 | IIe-2 | IIf-1 |
| M.Z.1.450 | I-1 | IIe-2 | IIf-2 |
| M.Z.1.451 | I-1 | IIe-2 | IIf-3 |
| M.Z.1.452 | I-1 | IIe-3 | IIf-1 |
| M.Z.1.453 | I-1 | IIe-3 | IIf-2 |
| M.Z.1.454 | I-1 | IIe-3 | IIf-3 |
| M.Z.1.455 | I-1 | IIc-6 | IIc-2 |
| M.Z.1.456 | I-1 | IIc-6 | IIc-5 |
| M.Z.1.457 | I-1 | IIa-1 | IIb-7 |
| M.Z.1.458 | I-1 | IIa-1 | IIb-8 |
| M.Z.1.459 | I-1 | IIa-1 | IIb-9 |
| M.Z.1.460 | I-1 | IIa-1 | IIb-10 |

Table Z2

Table Z2 is as Table Z1, in which the compound I-1 is replaced by compound I-2, and the mixtures are named from M.Z.2.1 to M.Z.2.456. In the context of the present invention, each of the rows of Table Z2 corresponds to one mixture.

Table Z3

Table Z3 is as Table Z1, in which the compound I-1 is replaced by compound I-3, and the mixtures are named from M.Z.3.1 to M.Z.3.456. In the context of the present invention, each of the rows of Table Z3 corresponds to one mixture.

Table Z4

Table Z4A is as Table Z1, in which the compound I-1 is replaced by compound I-4, and the mixtures are named from M.Z.4.1 to M.Z.4.456. In the context of the present invention, each of the rows of Table Z4 corresponds to one mixture.

Table Z5

Table Z5 is as Table Z1, in which the compound I-1 is replaced by compound I-5, and the mixtures are named from M.Z.5.1 to M.Z.5.456. In the context of the present invention, each of the rows of Table Z5 corresponds to one mixture.

Table Z6

Table Z6 is as Table Z1, in which the compound I-1 is replaced by compound I-6, and the mixtures are named from M.Z.6.1 to M.Z.6.456. In the context of the present invention, each of the rows of Table Z6 corresponds to one mixture.

Table Z7

Table Z7 is as Table Z1, in which the compound I-1 is replaced by compound I-7, and the mixtures are named from M.Z.7.1 to M.Z.7.456. In the context of the present invention, each of the rows of Table Z7 corresponds to one mixture.

Table Z8

Table Z8 is as Table Z1, in which the compound I-1 is replaced by compound I-8, and the mixtures are named from M.Z.8.1 to M.Z.8.456. In the context of the present invention, each of the rows of Table Z8 corresponds to one mixture.

Table Z9

Table Z9 is as Table Z1, in which the compound I-1 is replaced by compound I-9, and the mixtures are named from M.Z.9.1 to M.Z.9.456. In the context of the present invention, each of the rows of Table Z9 corresponds to one mixture.

Table Z10

Table Z10 is as Table Z1, in which the compound I-1 is replaced by compound I-10, and the mixtures are named from M.Z.10.1 to M.Z.10.456. In the context of the present invention, each of the rows of Table Z10 corresponds to one mixture.

Table Z11

Table Z11 is as Table Z1, in which the compound I-1 is replaced by compound I-11, and the mixtures are named from M.Z.11.1 to M.Z.11.456. In the context of the present invention, each of the rows of Table Z11 corresponds to one mixture.

Table Z12

Table Z12 is as Table Z1, in which the compound I-1 is replaced by compound I-12, and the mixtures are named from M.Z.12.1 to M.Z.12.456. In the context of the present invention, each of the rows of Table Z12 corresponds to one mixture.

The invention also relates to the ternary mixtures comprising one compound land two compunds 11, wherein, wherein the first compound II (compound II-1) is metrafenone and the other compound II (compound II-2) is selected from the group consisting of
- (a) strobilurines such as azoxystrobin; kresoxim-methyl; mandestrobin, meta-minostrobin; picoxystrobin; pyraclostrobin or trifloxystrobin; and
- (b) azoles such as cyproconazole; difenoconazole; epoxiconazole; metconazole (; pro-piconazole; prothioconazole; tebuconazole; triticonazole or bromoconazole;
- (c) morpholines such as fenpropimorph, tridemorph, fenpropidin and spiroxamine;
- (d) chlorothalonil; and
- (e) 2-[[(7R,8R,9S)-7-benzyl-9-methyl-8-(2-methylpropanoyloxy)-2,6-dioxo-1,5-dioxonan-3-yl]carbamoyl]-4-methoxy-3-pyridyl]oxymethyl 2-methylpropanoate (ii-z-01) and [(6S,7R,8R)-8-benzyl-3-[(3-hydroxy-4-methoxy-pyridine-2-carbonyl)amino]-6-methyl-4,9-dioxo-1,5-dioxonan-7-yl] 2-methylpropanoate (ii-z-02).

Preferred compounds II-2 are selected from
- (a) strobilurines such as azoxystrobin; kresoxim-methyl; picoxystrobin; pyraclostrobin or trifloxystrobin; and
- (b) azoles such as propiconazole, prothioconazole or bromoconazoke;
- (c) morpholines such as fenpropimorph, fenpropidin and spiroxamine;
- (d) chlorothalonil; and
- (e) 2-[[(7R,8R,9S)-7-benzyl-9-methyl-8-(2-methylpropanoyloxy)-2,6-dioxo-1,5-dioxonan-3-yl]carbamoyl]-4-methoxy-3-pyridylloxymethyl 2-methylpropanoate and [(6S,7R,8R)-8-benzyl-3-[(3-hydroxy-4-methoxy-pyridine-2-carbonyl)amino]-6-methyl-4,9-dioxo-1,5-dioxonan-7-yl] 2-methylpropanoate; and
- (f) SDHIs such as benzovindiflupyr, bixafen, boscalid, fluopyram and fluxapyroxad More preferred second compounds II are selected from pyraclostrobin, propiconazole, prothioconazole and chlorothalonil.

These ternary mixtures are shown below in Tables Za1 to Za12.

TABLE Za1

| No | I | II-1 | II-2 |
|---|---|---|---|
| M.Za.1.1 | I-1 | metrafenone | pyraclostrobin |
| M.Za.1.2 | I-1 | metrafenone | propiconazole |
| M.Za.1.3 | I-1 | metrafenone | prothioconazole |
| M.Za.1.4 | I-1 | metrafenone | chlorothalonil |
| M.Za.1.5 | I-1 | metrafenone | azoxystrobin |
| M.Za.1.6 | I-1 | metrafenone | kresoxim-methyl |
| M.Za.1.7 | I-1 | metrafenone | picoxystrobin |
| M.Za.1.8 | I-1 | metrafenone | trifloxystrobin |
| M.Za.1.9 | I-1 | metrafenone | bromoconazole |
| M.Za.1.10 | I-1 | metrafenone | fenpropimorph |
| M.Za.1.11 | I-1 | metrafenone | fenpropidin |
| M.Za.1.12 | I-1 | metrafenone | spiroxamine |
| M.Za.1.13 | I-1 | metrafenone | II-z-01 |
| M.Za.1.14 | I-1 | metrafenone | II-z-02 |
| M.Za.1.15 | I-1 | metrafenone | mandestrobin |
| M.Za.1.16 | I-1 | metrafenone | metaminostrobin |
| M.Za.1.17 | I-1 | metrafenone | tebuconazole |
| M.Za.1.18 | I-1 | metrafenone | triticonazole |
| M.Za.1.19 | I-1 | metrafenone | cyproconazole |
| M.Za.1.20 | I-1 | metrafenone | difenoconazole |
| M.Za.1.21 | I-1 | metrafenone | epoxiconazole |
| M.Za.1.22 | I-1 | metrafenone | metconazole |
| M.Za.1.23 | I-1 | metrafenone | tridemorph |
| M.Za.1.24 | I-1 | metrafenone | benzovindiflupyr |
| M.Za.1.25 | I-1 | metrafenone | bixafen |
| M.Za.1.26 | I-1 | metrafenone | boscalid |
| M.Za.1.27 | I-1 | metrafenone | fluopyram |
| M.Za.1.28 | I-1 | metrafenone | fluxapyroxad |

Table Za2

Table Za2 is as Table Za1, in which the compound I-1 is replaced by compound I-2, and the mixtures are named from M.Za.2.1 to M.Za.2.28. In the context of the present invention, each of the rows of Table Za2 corresponds to one mixture.

Table Za3

Table Za3 is as Table Za1, in which the compound I-1 is replaced by compound I-3, and the mixtures are named from M.Za.3.1 to M.Za.3.28. In the context of the present invention, each of the rows of Table Za3 corresponds to one mixture.

Table Za4

Table Za4A is as Table Za1, in which the compound I-1 is replaced by compound I-4, and the mixtures are named from M.Za.4.1 to M.Za.4.28. In the context of the present invention, each of the rows of Table Za4 corresponds to one mixture.

Table Za5

Table Za5 is as Table Za1, in which the compound I-1 is replaced by compound I-5, and the mixtures are named from M.Za.5.1 to M.Za.5.28. In the context of the present invention, each of the rows of Table Za5 corresponds to one mixture.

Table Za6

Table Za6 is as Table Za1, in which the compound I-1 is replaced by compound I-6, and the mixtures are named from M.Za.6.1 to M.Za.6.28. In the context of the present invention, each of the rows of Table Za6 corresponds to one mixture.

Table Za7

Table Za7 is as Table Za1, in which the compound I-1 is replaced by compound I-7, and the mixtures are named from M.Za.7.1 to M.Za.7.28. In the context of the present invention, each of the rows of Table Za7 corresponds to one mixture.

Table Za8

Table Za8 is as Table Za1, in which the compound I-1 is replaced by compound I-8, and the mixtures are named from M.Za.8.1 to M.Za.8.28. In the context of the present invention, each of the rows of Table Za8 corresponds to one mixture.

Table Za9

Table Za9 is as Table Za1, in which the compound I-1 is replaced by compound I-9, and the mixtures are named from M.Za.9.1 to M.Za.9.28. In the context of the present invention, each of the rows of Table Za9 corresponds to one mixture.

Table Za10

Table Za10 is as Table Za1, in which the compound I-1 is replaced by compound I-10, and the mixtures are named from M.Za.10.1 to M.Za.10.28. In the context of the present invention, each of the rows of Table Za10 corresponds to one mixture.

Table Za11

Table Za11 is as Table Za1, in which the compound I-1 is replaced by compound I-11, and the mixtures are named from M.Za.11.1 to M.Za.11.28. In the context of the present invention, each of the rows of Table Za11 corresponds to one mixture.

Table Za12

Table Za12 is as Table Za1, in which the compound I-1 is replaced by compound I-12, and the mixtures are named from M.Za.12.1 to M.Za.12.28. In the context of the present invention, each of the rows of Table Za12 corresponds to one mixture.

Within tables Za1 to Za12, the following mixtures are preferred:

M.Za.1.1, M.Za.1.2, M.Za.1.3, M.Za.1.4, M.Za.1.5, M.Za.1.6, M.Za.1.7, M.Za.1.8, M.Za.1.9, M.Za.1.10, M.Za.1.11, M.Za.1.12, M.Za.1.28

M.Za.2.1, M.Za.2.2, M.Za.2.3, M.Za.2.4, M.Za.2.5, M.Za.2.6, M.Za.2.7, M.Za.2.8, M.Za.2.9, M.Za.2.10, M.Za.2.11, M.Za.2.12, M.Za.2.28

M.Za.3.1, M.Za.3.2, M.Za.3.3, M.Za.3.4, M.Za.3.5, M.Za.3.6, M.Za.3.7, M.Za.3.8, M.Za.3.9, M.Za.3.10, M.Za.3.11, M.Za.3.12, M.Za.3.28

M.Za.4.1, M.Za.4.2, M.Za.4.3, M.Za.4.4, M.Za.4.5, M.Za.4.6, M.Za.4.7, M.Za.4.8, M.Za.4.9, M.Za.4.10, M.Za.4.11, M.Za.4.12, M.Za.4.28

M.Za.5.1, M.Za.5.2, M.Za.5.3, M.Za.5.4, M.Za.5.5, M.Za.5.6, M.Za.5.7, M.Za.5.8, M.Za.5.9, M.Za.5.10, M.Za.5.11, M.Za.5.12, M.Za.5.28

M.Za.6.1, M.Za.6.2, M.Za.6.3, M.Za.6.4, M.Za.6.5, M.Za.6.6, M.Za.6.7, M.Za.6.8, M.Za.6.9, M.Za.6.10, M.Za.6.11, M.Za.6.12, M.Za.6.28

M.Za.7.1, M.Za.7.2, M.Za.7.3, M.Za.7.4, M.Za.7.5, M.Za.7.6, M.Za.7.7, M.Za.7.8, M.Za.7.9, M.Za.7.10, M.Za.7.11, M.Za.7.12, M.Za.7.28

M.Za.8.1, M.Za.8.2, M.Za.8.3, M.Za.8.4, M.Za.8.5, M.Za.8.6, M.Za.8.7, M.Za.8.8, M.Za.8.9, M.Za.8.10, M.Za.8.11, M.Za.8.12, M.Za.8.28

M.Za.9.1, M.Za.9.2, M.Za.9.3, M.Za.9.4, M.Za.9.5, M.Za.9.6, M.Za.9.7, M.Za.9.8, M.Za.9.9, M.Za.9.10, M.Za.9.11, M.Za.9.12, M.Za.9.28

M.Za.10.1, M.Za.10.2, M.Za.10.3, M.Za.10.4, M.Za.10.5, M.Za.10.6, M.Za.10.7, M.Za.10.8, M.Za.10.9, M.Za.10.10, M.Za.10.11, M.Za.10.12, M.Za.10.28

M.Za.11.1, M.Za.11.2, M.Za.11.3, M.Za.11.4, M.Za.11.5, M.Za.11.6, M.Za.11.7, M.Za.11.8, M.Za.11.9, M.Za.11.10, M.Za.11.11, M.Za.11.12, M.Za.11.28

M.Za.12.1, M.Za.12.2, M.Za.12.3, M.Za.12.4, M.Za.12.5, M.Za.12.6, M.Za.12.7, M.Za.12.8, M.Za.12.9, M.Za.12.10, M.Za.12.11, M.Za.12.12 and M.Za.12.28.

Within tables Za1 to Za12, the following mixtures are more preferred:

M.Za.1.1, M.Za.1.2, M.Za.1.3, M.Za.1.4, M.Za.1.28,
M.Za.2.1, M.Za.2.2, M.Za.2.3, M.Za.2.4, M.Za.2.28,
M.Za.3.1, M.Za.3.2, M.Za.3.3, M.Za.3.4, M.Za.3.28,
M.Za.4.1, M.Za.4.2, M.Za.4.3, M.Za.4.4, M.Za.4.28,
M.Za.5.1, M.Za.5.2, M.Za.5.3, M.Za.5.4 M.Za.5.28,
M.Za.6.1, M.Za.6.2, M.Za.6.3, M.Za.6.4, M.Za.6.28,
M.Za.7.1, M.Za.7.2, M.Za.7.3, M.Za.7.4, M.Za.7.28,
M.Za.8.1, M.Za.8.2, M.Za.8.3, M.Za.8.4, M.Za.8.28,
M.Za.9.1, M.Za.9.2, M.Za.9.3, M.Za.9.4, M.Za.9.28,
M.Za.10.1, M.Za.10.2, M.Za.10.3, M.Za.10.4, M.Za.10.28,
M.Za.11.1, M.Za.11.2, M.Za.11.3, M.Za.11.4, M.Za.11.28,
M.Za.12.1, M.Za.12.2, M.Za.12.3, M.Za.12.4 and M.Za.12.28.

The invention also relates to the ternary mixtures comprising one compound I and two compunds II, wherein the first compound II (compound II-1) is propiconazole and the other compound II (compound II-2) is selected from the group consisting of (a) strobilurines such as azoxystrobin; kresoxim-methyl; mandestrobin, metaminostrobin; picoxystrobin; pyraclostrobin or trifloxystrobin; and (c) morphopholines such as fenpropimorph, tridemorph, fenpropidin and spiroxamine; and (d) chlorothalonil.

Preferred compounds II-2 are selected from (a) strobilurines such as azoxystrobin; kresoxim-methyl; picoxystrobin; pyraclostrobin or trifloxystrobin; and (c) morphopholines such as fenpropimorph, fenpropidin and spiroxamine; and (d) chlorothalonil.

Most preferred second compounds II are selected from pyraclostrobin chlorothalonil.

These ternary mixtures are shown below in Tables Zb1 to Zb12 as herein set forth below.

TABLE Zb1

| No | I | II (1) | II (2) |
|---|---|---|---|
| M.Zb.1.1 | I-1 | propicona-zole | pyraclostrobin |
| M.Zb.1.2 | I-1 | propicona-zole | chlorothalonil |
| M.Zb.1.3 | I-1 | propicona-zole | azoxystrobin |
| M.Zb.1.4 | I-1 | propicona-zole | kresoxim-methyl |
| M.Zb.1.5 | I-1 | propicona-zole | picoxystrobin |
| M.Zb.1.6 | I-1 | propicona-zole | trifloxystrobin |
| M.Zb.1.7 | I-1 | propicona-zole | fenpropimorph |
| M.Zb.1.8 | I-1 | propicona-zole | fenpropidin |
| M.Zb.1.9 | I-1 | propicona-zole | spiroxamine |
| M.Zb.1.10 | I-1 | propicona-zole | tridemorph |

TABLE Zb1-continued

| No | I | 11 (1) | II (2) |
|---|---|---|---|
| M.Zb.1.11 | I-1 | propicona-zole | mandestrobin |
| M.Zb.1.12 | I-1 | propicona-zole | metaminostrobin |

Table Zb2

Table Zb2 is as Table Zb1, in which the compound I-1 is replaced by compound I-2, and the mixtures are named from M.Zb.2.1 to M.Zb.2.12. In the context of the present invention, each of the rows of Table Zb2 corresponds to one mixture.

Table Zb3

Table Zb3 is as Table Zb1, in which the compound I-1 is replaced by compound I-3, and the mixtures are named from M.Zb.3.1 to M.Zb.3.12. In the context of the present invention, each of the rows of Table Zb3 corresponds to one mixture.

Table Zb4

Table Zb4A is as Table Zb1, in which the compound I-1 is replaced by compound I-4, and the mixtures are named from M.Zb.4.1 to M.Zb.4.12. In the context of the present invention, each of the rows of Table Zb4 corresponds to one mixture.

Table Zb5

Table Zb5 is as Table Zb1, in which the compound I-1 is replaced by compound I-5, and the mixtures are named from M.Zb.5.1 to M.Zb.5.12. In the context of the present invention, each of the rows of Table Zb5 corresponds to one mixture.

Table Zb6

Table Zb6 is as Table Zb1, in which the compound I-1 is replaced by compound I-6, and the mixtures are named from M.Zb.6.1 to M.Zb.6.12. In the context of the present invention, each of the rows of Table Zb6 corresponds to one mixture.

Table Zb7

Table Zb7 is as Table Zb1, in which the compound I-1 is replaced by compound I-7, and the mixtures are named from M.Zb.7.1 to M.Zb.7.12. In the context of the present invention, each of the rows of Table Zb7 corresponds to one mixture.

Table Zb8

Table Zb8 is as Table Zb1, in which the compound I-1 is replaced by compound I-8, and the mixtures are named from M.Zb.8.1 to M.Zb.8.12. In the context of the present invention, each of the rows of Table Zb8 corresponds to one mixture.

Table Zb9

Table Zb9 is as Table Zb1, in which the compound I-1 is replaced by compound I-9, and the mixtures are named from M.Zb.9.1 to M.Zb.9.12. In the context of the present invention, each of the rows of Table Zb9 corresponds to one mixture.

Table Zb10

Table Zb10 is as Table Zb1, in which the compound I-1 is replaced by compound I-10, and the mixtures are named from M.Zb.10.1 to M.Zb.10.12. In the context of the present invention, each of the rows of Table Zb10 corresponds to one mixture.

Table Zb11

Table Zb11 is as Table Zb1, in which the compound I-1 is replaced by compound I-11, and the mixtures are named from M.Zb.11.1 to M.Zb.11.12. In the context of the present invention, each of the rows of Table Zb11 corresponds to one mixture.

Table Zb12

Table Zba12 is as Table Zba1, in which the compound I-1 is replaced by compound I-12, and the mixtures are named from M.Zba.12.1 to M.Zba.12.12. In the context of the present invention, each of the rows of Table Zba12 corresponds to one mixture.

Within tables Zb1 to Zb12, the following mixtures are preferred:

M.Zb.1.1, M.Zb.1.2, M.Zb.1.3, M.Zb.1.4, M.Zb.1.5, M.Zb.1.6, M.Zb.1.7, M.Zb.1.8, M.Zb.1.9, M.Zb.2.1, M.Zb.2.2, M.Zb.2.3, M.Zb.2.4, M.Zb.2.5, M.Zb.2.6, M.Zb.2.7, M.Zb.2.8, M.Zb.2.9, M.Zb.3.1, M.Zb.3.2, M.Zb.3.3, M.Zb.3.4, M.Zb.3.5, M.Zb.3.6, M.Zb.3.7, M.Zb.3.8, M.Zb.3.9, M.Zb.4.1, M.Zb.4.2, M.Zb.4.3, M.Zb.4.4, M.Zb.4.5, M.Zb.4.6, M.Zb.4.7, M.Zb.4.8, M.Zb.4.9, M.Zb.5.1, M.Zb.5.2, M.Zb.5.3, M.Zb.5.4, M.Zb.5.5, M.Zb.5.6, M.Zb.5.7, M.Zb.5.8, M.Zb.5.9, M.Zb.6.1, M.Zb.6.2, M.Zb.6.3, M.Zb.6.4, M.Zb.6.5, M.Zb.6.6, M.Zb.6.7, M.Zb.6.8, M.Zb.6.9, M.Zb.7.1, M.Zb.7.2, M.Zb.7.3, M.Zb.7.4, M.Zb.7.5, M.Zb.7.6, M.Zb.7.7, M.Zb.7.8, M.Zb.7.9, M.Zb.8.1, M.Zb.8.2, M.Zb.8.3, M.Zb.8.4, M.Zb.8.5, M.Zb.8.6, M.Zb.8.7, M.Zb.8.8, M.Zb.8.9, M.Zb.9.1, M.Zb.9.2, M.Zb.9.3, M.Zb.9.4, M.Zb.9.5, M.Zb.9.6, M.Zb.9.7, M.Zb.9.8, M.Zb.9.9, M.Zb.10.1, M.Zb.10.2, M.Zb.10.3, M.Zb.10.4, M.Zb.10.5, M.Zb.10.6, M.Zb.10.7, M.Zb.10.8, M.Zb.10.9, M.Zb.11.1, M.Zb.11.2, M.Zb.11.3, M.Zb.11.4, M.Zb.11.5, M.Zb.11.6, M.Zb.11.7, M.Zb.11.8, M.Zb.11.9, M.Zb.12.1, M.Zb.12.2, M.Zb.12.3, M.Zb.12.4, M.Zb.12.5, M.Zb.12.6, M.Zb.12.7, M.Zb.12.8 and M.Zb.12.9.

Within tables Zb1 to Zb12, the following mixtures are more preferred:

M.Zb.1.1, M.Zb.1.2 M.Zb.2.1, M.Zb.2.2 M.Zb.3.1, M.Zb.3.2 M.Zb.4.1, M.Zb.4.2 M.Zb.5.1, M.Zb.5.2 M.Zb.6.1, M.Zb.6.2 M.Zb.7.1, M.Zb.7.2 M.Zb.8.1, M.Zb.8.2 M.Zb.9.1, M.Zb.9.2 M.Zb.10.1, M.Zb.10.2 M.Zb.11.1, M.Zb.11.2 M.Zb.12.1 and M.Zb.12.2.

The invention also relates to the ternary mixtures comprising one compound land two compunds 11, wherein, wherein the first compound 11 (compound II-1) is fluxapyroxad and the other compound 11 (compound II-2) is selected from the group consisting of (a) strobilurines such as azoxystrobin; kresoxim-methyl; mandestrobin, meta-minostrobin; picoxystrobin; pyraclostrobin or trifloxystrobin; and (b) azoles such as cyproconazole; difenoconazole; epoxiconazole; metconazole (; pro-piconazole; prothioconazole; tebuconazole or triticonazole;
(c) morphopholines such as fenpropimorph, tridemorph, fenpropidin and spiroxamine and
(d) chlorothalonil.

Preferred compounds II-2 are selected from
(a) strobilurines such as azoxystrobin; kresoxim-methyl; picoxystrobin; pyraclostrobin or trifloxystrobin; and
(b) azoles such as propiconazole or prothioconazole;
(c) morphopholines such as fenpropimorph, fenpropidin and spiroxamine; and
(d) chlorothalonil; and More preferred second compounds II are selected from pyraclostrobin, propiconazole, prothioconazole and chlorothalonil.

These ternary mixtures are shown below in Tables Zc1 to Zc12.

TABLE Za1

| No | I | II-1 | II-2 |
|---|---|---|---|
| M.Zc.1.1 | I-1 | fluxapyroxad | pyraclostrobin |
| M.Zc.1.2 | I-1 | fluxapyroxad | propiconazole |
| M.Zc.1.3 | I-1 | fluxapyroxad | prothioconazole |
| M.Zc.1.4 | I-1 | fluxapyroxad | chlorothalonil |
| M.Zc.1.5 | I-1 | fluxapyroxad | azoxystrobin |
| M.Zc.1.6 | I-1 | fluxapyroxad | kresoxim-methyl |
| M.Zc.1.7 | I-1 | fluxapyroxad | picoxystrobin |
| M.Zc.1.8 | I-1 | fluxapyroxad | trifloxystrobin |
| M.Zc.1.9 | I-1 | fluxapyroxad | fenpropimorph |
| M.Zc.1.10 | I-1 | fluxapyroxad | fenpropidin |
| M.Zc.1.11 | I-1 | fluxapyroxad | spiroxamine |
| M.Zc.1.12 | I-1 | fluxapyroxad | mandestrobin |
| M.Zc.1.13 | I-1 | fluxapyroxad | metaminostrobin |
| M.Zc.1.14 | I-1 | fluxapyroxad | tebuconazole |
| M.Zc.1.15 | I-1 | fluxapyroxad | triticonazole |
| M.Zc.1.16 | I-1 | fluxapyroxad | cyproconazole |
| M.Zc.1.17 | I-1 | fluxapyroxad | difenoconazole |
| M.Zc.1.18 | I-1 | fluxapyroxad | epoxiconazole |
| M.Zc.1.19 | I-1 | fluxapyroxad | metconazole |
| M.Zc.1.20 | I-1 | fluxapyroxad | tridemorph |

Table Zc2

Table Zc2 is as Table Zc1, in which the compound I-1 is replaced by compound I-2, and the mixtures are named from M.Zc.2.1 to M.Zc.2.20. In the context of the present invention, each of the rows of Table Zc2 corresponds to one mixture.

Table Zc3

Table Zc3 is as Table Zc1, in which the compound I-1 is replaced by compound I-3, and the mixtures are named from M.Zc.3.1 to M.Zc.3.20. In the context of the present invention, each of the rows of Table Zc3 corresponds to one mixture.

Table Zc4

Table Zc4A is as Table Zc1, in which the compound I-1 is replaced by compound I-4, and the mixtures are named from M.Zc.4.1 to M.Zc.4.20. In the context of the present invention, each of the rows of Table Zc4 corresponds to one mixture.

Table Zc5

Table Zc5 is as Table Zc1, in which the compound I-1 is replaced by compound I-5, and the mixtures are named from M.Zc.5.1 to M.Zc.5.20. In the context of the present invention, each of the rows of Table Zc5 corresponds to one mixture.

Table Zc6

Table Zc6 is as Table Zc1, in which the compound I-1 is replaced by compound I-6, and the mixtures are named from M.Zc.6.1 to M.Zc.6.20. In the context of the present invention, each of the rows of Table Zc6 corresponds to one mixture.

Table Zc7

Table Zc7 is as Table Zc1, in which the compound I-1 is replaced by compound I-7, and the mixtures are named from M.Zc.7.1 to M.Zc.7.20. In the context of the present invention, each of the rows of Table Zc7 corresponds to one mixture.

Table Zc8

Table Zc8 is as Table Zc1, in which the compound I-1 is replaced by compound I-8, and the mixtures are named from M.Zc.8.1 to M.Zc.8.20. In the context of the present invention, each of the rows of Table Zc8 corresponds to one mixture.

Table Zc9

Table Zc9 is as Table Zc1, in which the compound I-1 is replaced by compound I-9, and the mixtures are named from M.Zc.9.1 to M.Zc.9.20. In the context of the present invention, each of the rows of Table Zc9 corresponds to one mixture.

Table Zc10

Table Zc10 is as Table Zc1, in which the compound I-1 is replaced by compound I-10, and the mixtures are named from M.Zc.10.1 to M.Zc.10.20. In the context of the present invention, each of the rows of Table Zc10 corresponds to one mixture.

Table Zc11

Table Zc11 is as Table Zc1, in which the compound I-1 is replaced by compound I-11, and the mixtures are named from M.Zc.11.1 to M.Zc.11.20. In the context of the present invention, each of the rows of Table Zc11 corresponds to one mixture.

Table Zc12

Table Zc12 is as Table Zc1, in which the compound I-1 is replaced by compound I-12, and the mixtures are named from M.Zc.12.1 to M.Zc.12.20. In the context of the present invention, each of the rows of Table Zc12 corresponds to one mixture.

Within tables Zc1 to Zc12, the following mixtures are preferred:
M.Zc.1.1, M.Zc.1.2, M.Zc.1.3, M.Zc.1.4, M.Zc.1.5, M.Zc.1.6, M.Zc.1.7, M.Zc.1.8, M.Zc.1.9, M.Zc.1.10, M.Zc.1.11
M.Zc.2.1, M.Zc.2.2, M.Zc.2.3, M.Zc.2.4, M.Zc.2.5, M.Zc.2.6, M.Zc.2.7, M.Zc.2.8, M.Zc.2.9, M.Zc.2.10, M.Zc.2.11

M.Zc.3.1, M.Zc.3.2, M.Zc.3.3, M.Zc.3.4, M.Zc.3.5, M.Zc.3.6, M.Zc.3.7, M.Zc.3.8, M.Zc.3.9, M.Zc.3.10, M.Zc.3.11

M.Zc.4.1, M.Zc.4.2, M.Zc.4.3, M.Zc.4.4, M.Zc.4.5, M.Zc.4.6, M.Zc.4.7, M.Zc.4.8, M.Zc.4.9, M.Zc.4.10, M.Zc.4.11

M.Zc.5.1, M.Zc.5.2, M.Zc.5.3, M.Zc.5.4, M.Zc.5.5, M.Zc.5.6, M.Zc.5.7, M.Zc.5.8, M.Zc.5.9, M.Zc.5.10, M.Zc.5.11

M.Zc.6.1, M.Zc.6.2, M.Zc.6.3, M.Zc.6.4, M.Zc.6.5, M.Zc.6.6, M.Zc.6.7, M.Zc.6.8, M.Zc.6.9, M.Zc.6.10, M.Zc.6.11

M.Zc.7.1, M.Zc.7.2, M.Zc.7.3, M.Zc.7.4, M.Zc.7.5, M.Zc.7.6, M.Zc.7.7, M.Zc.7.8, M.Zc.7.9, M.Zc.7.10, M.Zc.7.11

M.Zc.8.1, M.Zc.8.2, M.Zc.8.3, M.Zc.8.4, M.Zc.8.5, M.Zc.8.6, M.Zc.8.7, M.Zc.8.8, M.Zc.8.9, M.Zc.8.10, M.Zc.8.11

M.Zc.9.1, M.Zc.9.2, M.Zc.9.3, M.Zc.9.4, M.Zc.9.5, M.Zc.9.6, M.Zc.9.7, M.Zc.9.8, M.Zc.9.9, M.Zc.9.10, M.Zc.9.11

M.Zc.10.1, M.Zc.10.2, M.Zc.10.3, M.Zc.10.4, M.Zc.10.5, M.Zc.10.6, M.Zc.10.7, M.Zc.10.8, M.Zc.10.9, M.Zc.10.10, M.Zc.10.11

M.Zc.11.1, M.Zc.11.2, M.Zc.11.3, M.Zc.11.4, M.Zc.11.5, M.Zc.11.6, M.Zc.11.7, M.Zc.11.8, M.Zc.11.9, M.Zc.11.10, M.Zc.11.11

M.Zc.12.1, M.Zc.12.2, M.Zc.12.3, M.Zc.12.4, M.Zc.12.5, M.Zc.12.6, M.Zc.12.7, M.Zc.12.8, M.Zc.12.9, M.Zc.12.10 and M.Zc.12.11.

Within tables Zc1 to Zc12, the following mixtures are more preferred: M.Zc.1.1, M.Zc.1.2, M.Zc.1.3, M.Zc.1.4, M.Zc.2.1, M.Zc.2.2, M.Zc.2.3, M.Zc.2.4, M.Zc.3.1, M.Zc.3.2, M.Zc.3.3, M.Zc.3.4, M.Zc.4.1, M.Zc.4.2, M.Zc.4.3, M.Zc.4.4, M.Zc.5.1, M.Zc.5.2, M.Zc.5.3, M.Zc.5.4, M.Zc.6.1, M.Zc.6.2, M.Zc.6.3, M.Zc.6.4, M.Zc.7.1, M.Zc.7.2, M.Zc.7.3, M.Zc.7.4, M.Zc.8.1, M.Zc.8.2, M.Zc.8.3, M.Zc.8.4, M.Zc.9.1, M.Zc.9.2, M.Zc.9.3, M.Zc.9.4, M.Zc.10.1, M.Zc.10.2, M.Zc.10.3, M.Zc.10.4, M.Zc.11.1, M.Zc.11.2, M.Zc.11.3, M.Zc.11.4, M.Zc.12.1, M.Zc.12.2, M.Zc.12.3 and M.Zc.12.4.

The invention also relates to the ternary mixtures comprising one compound I and two compounds 11, wherein the first compound II (compound II-1) is chlorothalonil and the other compound II (compound II-2) is selected from the group consisting of (a) strobilurines such as azoxystrobin; kresoxim-methyl; mandestrobin, meta-minostrobin; picoxystrobin; pyraclostrobin or trifloxystrobin; and (c) morpholines such as fenpropimorph, tridemorph, fenpropidin and spiroxamine.

Preferred compounds II-2 are selected from (a) strobilurines such as azoxystrobin; kresoxim-methyl; picoxystrobin; pyraclostrobin or trifloxystrobin; and (c) morpholines such as fenpropimorph, fenpropidin and spiroxamine Most preferred, the ternary mixtures comprise one compound I, chlorothalonil and pyraclostrobin.

These ternary mixtures are shown below in Tables Zd1 to Zd12 as herein set forth below.

TABLE Zd1

| No | I | 11 (1) | II (2) |
|---|---|---|---|
| M.Zd.1.1 | I-1 | chlorothalonil | pyraclostrobin |
| M.Zd.1.2 | I-1 | chlorothalonil | azoxystrobin |
| M.Zd.1.3 | I-1 | chlorothalonil | kresoxim-methyl |
| M.Zd.1.4 | I-1 | chlorothalonil | picoxystrobin |
| M.Zd.1.5 | I-1 | chlorothalonil | trifloxystrobin |
| M.Zd.1.6 | I-1 | chlorothalonil | fenpropimorph |
| M.Zd.1.7 | I-1 | chlorothalonil | fenpropidin |
| M.Zd.1.8 | I-1 | chlorothalonil | spiroxamine |
| M.Zd.1.9 | I-1 | chlorothalonil | tridemorph |
| M.Zd.1.10 | I-1 | chlorothalonil | mandestrobin |
| M.Zd.1.11 | I-1 | chlorothalonil | metaminostrobin |

Table Zd2

Table Zd2 is as Table Zd1, in which the compound I-1 is replaced by compound I-2, and the mixtures are named from M.Zd.2.1 to M.Zd.2.11. In the context of the present invention, each of the rows of Table Zd2 corresponds to one mixture.

Table Zd3

Table Zd3 is as Table Zd1, in which the compound I-1 is replaced by compound I-3, and the mixtures are named from M.Zd.3.1 to M.Zd.3.11. In the context of the present invention, each of the rows of Table Zd3 corresponds to one mixture.

Table Zd4

Table Zd4A is as Table Zd1, in which the compound I-1 is replaced by compound I-4, and the mixtures are named from M.Zd.4.1 to M.Zd.4.11. In the context of the present invention, each of the rows of Table Zd4 corresponds to one mixture.

Table Zd5

Table Zd5 is as Table Zd1, in which the compound I-1 is replaced by compound I-5, and the mixtures are named from M.Zd.5.1 to M.Zd.5.11. In the context of the present invention, each of the rows of Table Zd5 corresponds to one mixture.

Table Zd6

Table Zd6 is as Table Zd1, in which the compound I-1 is replaced by compound I-6, and the mixtures are named from M.Zd.6.1 to M.Zd.6.11. In the context of the present invention, each of the rows of Table Zd6 corresponds to one mixture.

Table Zd7

Table Zd7 is as Table Zd1, in which the compound I-1 is replaced by compound I-7, and the mixtures are named from M.Zd.7.1 to M.Zd.7.11. In the context of the present invention, each of the rows of Table Zd7 corresponds to one mixture.

Table Zd8

Table Zd8 is as Table Zd1, in which the compound I-1 is replaced by compound I-8, and the mixtures are named from M.Zd.8.1 to M.Zd.8.11. In the context of the present invention, each of the rows of Table Zd8 corresponds to one mixture.

Table Zd9

Table Zd9 is as Table Zd1, in which the compound I-1 is replaced by compound I-9, and the mixtures are named from M.Zd.9.1 to M.Zd.9.11. In the context of the present invention, each of the rows of Table Zd9 corresponds to one mixture.

Table Zd10

Table Zd10 is as Table Zd1, in which the compound I-1 is replaced by compound I-10, and the mixtures are named from M.Zd.10.1 to M.Zd.10.11. In the context of the present invention, each of the rows of Table Zd10 corresponds to one mixture.

Table Zd 11

Table Zd11 is as Table Zd1, in which the compound I-1 is replaced by compound I-11, and the mixtures are named from M.Zd.11.1 to M.Zd.11.11. In the context of the present invention, each of the rows of Table Zd11 corresponds to one mixture.

Table Zd12

Table Zd12 is as Table Zd1, in which the compound I-1 is replaced by compound I-12, and the mixtures are named from M.Zd.12.1 to M.Zd.12.11. In the context of the present invention, each of the rows of Table Zda12 corresponds to one mixture.

Within tables Zd1 to Zd12, the following mixtures are preferred:

M.Zb.1.1, M.Zb.1.2, M.Zb.1.3, M.Zb.1.4, M.Zb.1.5, M.Zb.1.6, M.Zb.1.7, M.Zb.1.8, M.Zb.2.1, M.Zb.2.2, M.Zb.2.3, M.Zb.2.4, M.Zb.2.5, M.Zb.2.6, M.Zb.2.7, M.Zb.2.8, M.Zb.3.1, M.Zb.3.2, M.Zb.3.3, M.Zb.3.4, M.Zb.3.5, M.Zb.3.6, M.Zb.3.7, M.Zb.3.8, M.Zb.4.1, M.Zb.4.2, M.Zb.4.3, M.Zb.4.4, M.Zb.4.5, M.Zb.4.6, M.Zb.4.7, M.Zb.4.8, M.Zb.5.1, M.Zb.5.2, M.Zb.5.3, M.Zb.5.4, M.Zb.5.5, M.Zb.5.6, M.Zb.5.7, M.Zb.5.8, M.Zb.6.1, M.Zb.6.2, M.Zb.6.3, M.Zb.6.4, M.Zb.6.5, M.Zb.6.6, M.Zb.6.7, M.Zb.6.8, M.Zb.7.1, M.Zb.7.2, M.Zb.7.3, M.Zb.7.4, M.Zb.7.5, M.Zb.7.6, M.Zb.7.7, M.Zb.7.8, M.Zb.8.1, M.Zb.8.2, M.Zb.8.3, M.Zb.8.4, M.Zb.8.5, M.Zb.8.6, M.Zb.8.7, M.Zb.8.8, M.Zb.9.1, M.Zb.9.2, M.Zb.9.3, M.Zb.9.4, M.Zb.9.5, M.Zb.9.6, M.Zb.9.7, M.Zb.9.8, M.Zb.10.1, M.Zb.10.2, M.Zb.10.3, M.Zb.10.4, M.Zb.10.5, M.Zb.10.6, M.Zb.10.7, M.Zb.10.8, M.Zb.11.1, M.Zb.11.2, M.Zb.11.3, M.Zb.11.4, M.Zb.11.5, M.Zb.11.6, M.Zb.11.7, M.Zb.11.8, M.Zb.12.1, M.Zb.12.2, M.Zb.12.3, M.Zb.12.4, M.Zb.12.5, M.Zb.12.6, M.Zb.12. and M.Zb.12.8, Within tables Zd1 to Zd12, the following mixtures are most preferred:

M.Zb.1.1, M.Zb.2.1, M.Zb.3.1, M.Zb.4.1, M.Zb.5.1, M.Zb.6.1, M.Zb.7.1, M.Zb.8.1, M.Zb.9.1, M.Zb.10.1, M.Zb.11.1 and M.Zb.12.1.

The invention also relates to the ternary mixtures comprising one compound I and two compounds II, wherein the first compound II (compound II-1) is prothioconazole and the other compound II (compound II-2) is selected from the group consisting of (a) strobilurines such as azoxystrobin; kresoxim-methyl; mandestrobin, meta-minostrobin; picoxystrobin; pyraclostrobin or trifloxystrobin; and
(c) morphopholines such as fenpropimorph, tridemorph, fenpropidin and spiroxamine; and
(d) chlorothalonil.

Preferred compounds II-2 are selected from
(a) strobilurines such as azoxystrobin; kresoxim-methyl; picoxystrobin; pyraclostrobin or trifloxystrobin; and
(c) morphopholines such as fenpropimorph, fenpropidin and spiroxamine; and
(d) chlorothalonil.

Most preferred second compounds II are selected from pyraclostrobin chlorothalonil.

These ternary mixtures are shown below in Tables Ze1 to Ze12 as herein set forth below.

TABLE Ze1

| No | I | 11 (1) | II (2) |
|---|---|---|---|
| M.Ze.1.1 | I-1 | prothioconazole | pyraclostrobin |
| M.Ze.1.2 | I-1 | prothioconazole | chlorothalonil |
| M.Ze.1.3 | I-1 | prothioconazole | azoxystrobin |
| M.Ze.1.4 | I-1 | prothioconazole | kresoxim-methyl |
| M.Ze.1.5 | I-1 | prothioconazole | picoxystrobin |
| M.Ze.1.6 | I-1 | prothioconazole | trifloxystrobin |
| M.Ze.1.7 | I-1 | prothioconazole | fenpropimorph |
| M.Ze.1.8 | I-1 | prothioconazole | fenpropidin |
| M.Ze.1.9 | I-1 | prothioconazole | spiroxamine |
| M.Ze.1.10 | I-1 | prothioconazole | tridemorph |
| M.Ze.1.11 | I-1 | prothioconazole | mandestrobin |
| M.Ze.1.12 | I-1 | prothioconazole | metaminostrobin |

Table Ze2

Table Ze2 is as Table Ze1, in which the compound I-1 is replaced by compound I-2, and the mixtures are named from M.Ze.2.1 to M.Ze.2.12. In the context of the present invention, each of the rows of Table Ze2 corresponds to one mixture.

Table Ze3

Table Ze3 is as Table Ze1, in which the compound I-1 is replaced by compound I-3, and the mixtures are named from M.Ze.3.1 to M.Ze.3.12. In the context of the present invention, each of the rows of Table Ze3 corresponds to one mixture.

Table Ze4

Table Ze4A is as Table Ze1, in which the compound I-1 is replaced by compound I-4, and the mixtures are named from M.Ze.4.1 to M.Ze.4.12. In the context of the present invention, each of the rows of Table Ze4 corresponds to one mixture.

Table Ze5

Table Ze5 is as Table Ze1, in which the compound I-1 is replaced by compound I-5, and the mixtures are named from M.Ze.5.1 to M.Ze.5.12. In the context of the present invention, each of the rows of Table Ze5 corresponds to one mixture.

Table Ze6

Table Ze6 is as Table Ze1, in which the compound I-1 is replaced by compound I-6, and the mixtures are named from M.Ze.6.1 to M.Ze.6.12. In the context of the present invention, each of the rows of Table Ze6 corresponds to one mixture.

Table Ze7

Table Ze7 is as Table Ze1, in which the compound I-1 is replaced by compound I-7, and the mixtures are named from M.Ze.7.1 to M.Ze.7.12. In the context of the present invention, each of the rows of Table Ze7 corresponds to one mixture.

Table Ze8

Table Ze8 is as Table Ze1, in which the compound I-1 is replaced by compound I-8, and the mixtures are named from M.Ze.8.1 to M.Ze.8.12. In the context of the present invention, each of the rows of Table Ze8 corresponds to one mixture.

Table Ze9

Table Ze9 is as Table Ze1, in which the compound I-1 is replaced by compound I-9, and the mixtures are named from M.Ze.9.1 to M.Ze.9.12. In the context of the present invention, each of the rows of Table Ze9 corresponds to one mixture.

Table Ze10

Table Ze10 is as Table Ze1, in which the compound I-1 is replaced by compound I-10, and the mixtures are named from M.Ze.10.1 to M.Ze.10.12. In the context of the present invention, each of the rows of Table Ze10 corresponds to one mixture.

Table Ze11

Table Ze11 is as Table Ze1, in which the compound I-1 is replaced by compound I-11, and the mixtures are named from M.Ze.11.1 to M.Ze.11.12. In the context of the present invention, each of the rows of Table Ze11 corresponds to one mixture.

Table Ze12

Table Zea12 is as Table Zea1, in which the compound I-1 is replaced by compound I-12, and the mixtures are named from M.Zea.12.1 to M.Zea.12.12. In the context of the present invention, each of the rows of Table Zea12 corresponds to one mixture.

Within tables Ze1 to Ze12, the following mixtures are preferred:
M.Ze.1.1, M.Ze.1.2, M.Ze.1.3, M.Ze.1.4, M.Ze.1.5, M.Ze.1.6, M.Ze.1.7, M.Ze.1.8, M.Ze.1.9, M.Ze.2.1, M.Ze.2.2, M.Ze.2.3, M.Ze.2.4, M.Ze.2.5, M.Ze.2.6, M.Ze.2.7, M.Ze.2.8, M.Ze.2.9, M.Ze.3.1, M.Ze.3.2, M.Ze.3.3, M.Ze.3.4, M.Ze.3.5, M.Ze.3.6, M.Ze.3.7, M.Ze.3.8, M.Ze.3.9, M.Ze.4.1, M.Ze.4.2, M.Ze.4.3, M.Ze.4.4, M.Ze.4.5, M.Ze.4.6, M.Ze.4.7, M.Ze.4.8, M.Ze.4.9, M.Ze.5.1, M.Ze.5.2, M.Ze.5.3, M.Ze.5.4, M.Ze.5.5, M.Ze.5.6, M.Ze.5.7, M.Ze.5.8, M.Ze.5.9, M.Ze.6.1, M.Ze.6.2, M.Ze.6.3, M.Ze.6.4, M.Ze.6.5, M.Ze.6.6, M.Ze.6.7, M.Ze.6.8, M.Ze.6.9, M.Ze.7.1, M.Ze.7.2, M.Ze.7.3, M.Ze.7.4, M.Ze.7.5, M.Ze.7.6, M.Ze.7.7, M.Ze.7.8, M.Ze.7.9, M.Ze.8.1, M.Ze.8.2, M.Ze.8.3, M.Ze.8.4, M.Ze.8.5, M.Ze.8.6, M.Ze.8.7, M.Ze.8.8, M.Ze.8.9, M.Ze.9.1, M.Ze.9.2, M.Ze.9.3, M.Ze.9.4, M.Ze.9.5, M.Ze.9.6, M.Ze.9.7, M.Ze.9.8, M.Ze.9.9, M.Ze.10.1, M.Ze.10.2, M.Ze.10.3, M.Ze.10.4, M.Ze.10.5, M.Ze.10.6, M.Ze.10.7, M.Ze.10.8, M.Ze.10.9, M.Ze.11.1, M.Ze.11.2, M.Ze.11.3, M.Ze.11.4, M.Ze.11.5, M.Ze.11.6, M.Ze.11.7, M.Ze.11.8, M.Ze.11.9, M.Ze.12.1, M.Ze.12.2, M.Ze.12.3, M.Ze.12.4, M.Ze.12.5, M.Ze.12.6, M.Ze.12.7, M.Ze.12.8 and M.Ze.12.9.

Within tables Ze1 to Ze12, the following mixtures are more preferred:
M.Ze.1.1, M.Ze.1.2 M.Ze.2.1, M.Ze.2.2 M.Ze.3.1, M.Ze.3.2 M.Ze.4.1, M.Ze.4.2 M.Ze.5.1, M.Ze.5.2 M.Ze.6.1, M.Ze.6.2 M.Ze.7.1, M.Ze.7.2 M.Ze.8.1, M.Ze.8.2 M.Ze.9.1, M.Ze.9.2 M.Ze.10.1, M.Ze.10.2 M.Ze.11.1, M.Ze.11.2 M.Ze.12.1 and M.Ze.12.2.

All above-referred mixtures are herein below referred to as "inventive mixtures".

The inventive mixtures can further contain one or more insecticides, fungicides, herbicides.

The inventive mixtures can be converted into customary types of agrochemical compositions, e. g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wetTable Apowders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Monograph No. 2, 6th Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegeTable Aor animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegeTable Aorigin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

SuitableSuitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglecTable Aor even no pesticidal activity themselves, and which improve the biological performance of the inventive mixtures on the target. Examples are surfactants, mineral or vegeTable Aoils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:
i) Water-soluble concentrates (SL, LS)

10-60 wt % of an inventive mixture and 5-15 wt % wetting agent (e.g. alcohol alkoxylates) are dissolved in water and/or in a water-soluble solvent (e.g. alcohols) ad 100 wt %. The active substance dissolves upon dilution with water.

ii) Dispersible concentrates (DC)

5-25 wt % of an inventive mixture and 1-10 wt % dispersant (e. g. polyvinylpyrrolidone) are dissolved in organic solvent (e.g. cyclohexanone) ad 100 wt %. Dilution with water gives a dispersion.

iii) Emulsifiable concentrates (EC)

15-70 wt % of an inventive mixture and 5-10 wt % emulsifiers (e.g. calcium dodecylbenzenesulfonate and castor oil ethoxylate) are dissolved in water-insoluble organic solvent (e.g. aromatic hydrocarbon) ad 100 wt %. Dilution with water gives an emulsion.

iv) Emulsions (EW, EO, ES)

5-40 wt % of an inventive mixture and I-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into water ad 100 wt % by means of an emulsifying machine and made into a homogeneous emulsion. Dilution with water gives an emulsion.

v) Suspensions (SC, OD, FS)

In an agitated ball mill, 20-60 wt % of an inventive mixture are comminuted with addition of 2-10 wt % dispersants and wetting agents (e.g. sodium lignosulfonate and alcohol ethoxylate), 0.1-2 wt % thickener (e.g. xanthan gum) and water ad 100 wt % to give a fine active substance suspension. Dilution with water gives a sTable Asuspension of the active substance. For FS type composition up to 40 wt % binder (e.g. polyvinylalcohol) is added.

vi) Water-dispersible granules and water-soluble granules (WG, SG)

50-80 wt % of an inventive mixture are ground finely with addition of dispersants and wetting agents (e.g. sodium lignosulfonate and alcohol ethoxylate) ad 100 wt % and prepared as water-dispersible or water-soluble granules by means of technical appliances (e. g. extrusion, spray tower, fluidized bed). Dilution with water gives a sTable Adispersion or solution of the active substance.

vii) Water-dispersible powders and water-soluble powders (WP, SP, WS)

50-80 wt % of an inventive mixture are ground in a rotor-stator mill with addition of I-5 wt % dispersants (e.g. sodium lignosulfonate), I-3 wt % wetting agents (e.g. alcohol ethoxylate) and solid carrier (e.g. silica gel) ad 100 wt %. Dilution with water gives a sTable Adispersion or solution of the active substance.

viii) Gel (GW, GF)

In an agitated ball mill, 5-25 wt % of an inventive mixture are comminuted with addition of 3-10 wt % dispersants (e.g. sodium lignosulfonate), I-5 wt % thickener (e.g. carboxymethylcellulose) and water ad 100 wt % to give a fine suspension of the active substance. Dilution with water gives a sTable Asuspension of the active substance.

iv) Microemulsion (ME)

5-20 wt % of an inventive mixture are added to 5-30 wt % organic solvent blend (e.g. fatty acid dimethylamide and cyclohexanone), 10-25 wt % surfactant blend (e.g. alcohol ethoxylate and arylphenol ethoxylate), and water ad 100%. This mixture is stirred for 1 h to produce spontaneously a thermodynamically sTable Amicroemulsion.

iv) Microcapsules (CS)

An oil phase comprising 5-50 wt % of an inventive mixture, 0-40 wt % water insoluble organic solvent (e.g. aromatic hydrocarbon), 2-15 wt % acrylic monomers (e.g. methyl-methacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of an inventive mixture according to the invention, 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of polyurea microcapsules. The monomers amount to 1-10 wt %. The wt % relate to the total CS composition.

ix) Dustable powders (DP, DS)

1-10 wt % of an inventive mixture are ground finely and mixed intimately with solid carrier (e.g. finely divided kaolin) ad 100 wt %.

x) Granules (GR, FG)

0.5-30 wt % of an inventive mixture is ground finely and associated with solid carrier (e.g. silicate) ad 100 wt %. Granulation is achieved by extrusion, spray-drying or fluidized bed.

xi) Ultra-low volume liquids (UL)

1-50 wt % of an inventive mixture are dissolved in organic solvent (e.g. aromatic hydrocarbon) ad 100 wt %.

The compositions types i) to xi) may optionally comprise further auxiliaries, such as 0.1-1 wt % bactericides, 5-15 wt % anti-freezing agents, 0.1-1 wt % anti-foaming agents, and 0.1-1 wt % colorants.

The resulting agrochemical compositions generally comprise between 0.01 and 95%, preferably between 0.1 and 90%, and in particular between 0.5 and 75%, by weight of active substance. The active substances are employed in a purity of from 90% to 100%, preferably from 95% to 100% (according to NMR spectrum).

Solutions for seed treatment (LS), Suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds. The compositions in question give, after two-to-tenfold dilution, active substance concentrations of from 0.01 to 60% by weight, preferably from 0.1 to 40%, in the ready-to-use preparations. Application can be carried out before or during sowing. Methods for applying the inventive mixtures and compositions thereof, respectively, on to plant propagation material, especially seeds include dressing, coating, pelleting, dusting, soaking and in-furrow application methods of the propagation material. Preferably, the inventive mixtures or the compositions thereof, respectively, are applied on to the plant propagation material by a method such that germination is not induced, e. g. by seed dressing, pelleting, coating and dusting.

When employed in plant protection, the amounts of active substances applied are, depending on the kind of effect desired, from 0.001 to 2 kg per ha, preferably from 0.005 to 2 kg per ha, more preferably from 0.01 to 1.0 kg per ha, and in particular from 0.05 to 0.75 kg per ha.

In treatment of plant propagation materials such as seeds, e. g. by dusting, coating or drenching seed, amounts of active substance of from 0.01-10 kg, preferably from 0.1-1000 g, more preferably from I-100 g per 100 kilogram of plant propagation material (preferably seeds) are generally required.

When used in the protection of materials or stored products, the amount of active substance applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizer, or micronutrients, and further pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage device, a knapsack sprayer, a spray tank, a spray plane, or an irrigation systeM.A. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary or ternary mixture may be mixed by the user himself in a spray tank or any other kind of vessel used for applications (e. g. seed treater drums, seed pelleting machinery, knapsack sprayer) and further auxiliaries may be added, if appropriate.

Consequently, one embodiment of the invention is a kit for preparing a usable pesticidal composition, the kit comprising a) a composition comprising component 1) as defined herein and at least one auxiliary; and b) a composition comprising component 2) as defined herein and at least one auxiliary; and optionally c) a composition comprising at least one auxiliary and optionally a further active component 3) as defined herein. As said above, the present invention comprises a method for controlling harmful fungi, wherein the pest, their habitat, breeding grounds, their locus or the plants to be protected against pest attack, the soil or plant propagation material (preferably seed) are treated with an pesticidally effective amount of a inventive mixture. Advantageously, the inventive mixtures are suitable for controlling the following fungal plant diseases:

Albugo spp. (white rust) on ornamentals, vegetables (e. g. A. candida) and sunflowers (e. g. A. tragopogonis); Alternaria spp. (Alternaria leaf spot) on vegetables, rape (A. brassicola or brassicae), sugar beets (A. tenuis), fruits, rice, soybeans, potatoes (e. g. A. solani or A. alternata), tomatoes (e. g. A. solani or A. alternata) and wheat; Aphanomyces spp. on sugar beets and vegetables; Ascochyta spp. on cereals and vegetables, e. g. A. tritici (anthracnose) on wheat and A. hordei on barley; Bipolaris and Drechslera spp. (teleomorph: Cochliobolus spp.), e. g. Southern leaf blight (D. maydis) or Northern leaf blight (B. zeicola) on corn, e. g. spot blotch (B. sorokiniana) on cereals and e. g. B. oryzae on rice and turfs; Blumeria (formerly Erysiphe) graminis (powdery mildew) on cereals (e. g. on wheat or barley); Botrytis cinerea (teleomorph: Botryotinia fuckeliana: grey mold) on fruits and berries (e. g. strawberries), vegetables (e. g. lettuce, carrots, celery and cabbages), rape, flowers, vines, forestry plants and wheat; Bremia lactucae (downy mildew) on lettuce; Ceratocystis (syn. Ophiostoma) spp. (rot or wilt) on broad-leaved trees and evergreens, e. g. C. ulmi(Dutch elm disease) on elms; Cercospora spp. (Cercospora leaf spots) on corn (e. g. Gray leaf spot: C zeae-maydis), rice, sugar beets (e. g. C. beticola), sugar cane, vegetables, coffee, soybeans (e. g. C. sojina or C. kikuchii) and rice; Cladosporium spp. on tomatoes (e. g. C. fulvum: leaf mold) and cereals, e. g. C. herbarum (black ear) on wheat; Claviceps purpurea (ergot) on cereals; Cochliobolus (anamorph: Helminthosporium of Bipolaris) spp. (leaf spots) on corn (C. carbonum), cereals (e. g. C. sativus, anamorph: B. sorokiniana) and rice (e. g. C. miyabeanus, anamorph: H. oryzae); Colletotrichum (teleomorph: Glomerella) spp. (anthracnose) on cotton (e. g. C. gossypii), corn (e. g. C. graminicola: Anthracnose stalk rot), soft fruits, potatoes (e. g. C. coccodes: black dot), beans (e. g. C. lindemuthianum) and soybeans (e. g. C. truncatum or C. gloeosponbides); Corticium spp., e. g. C. sasakii (sheath blight) on rice; Coynespora cassiicola (leaf spots) on soybeans and ornamentals; Cycloconium spp., e. g. C. oleaginum on olive trees; Cylindrocarpon spp. (e. g. fruit tree canker or young vine decline, teleomorph: Nectria or Neonectria spp.) on fruit trees, vines (e. g. C. liriodendri, teleomorph: Neonectria liriodendri: Black Foot Disease) and ornamentals; Dematophora (teleomorph: Rosellinia) necatrix(root and stem rot) on soybeans; Diaporthespp., e. g. D. phaseolorum (damping off) on soybeans; Drechslera (syn. Helminthosporium, teleomorph: Pyrenophora) spp. on corn, cereals, such as barley (e. g. D. teres, net blotch) and wheat (e. g. D. tritici-repentis: tan spot), rice and turf; Esca (dieback, apoplexy) on vines, caused by Formitiporia (syn. Phellinus) punctata, F. mediterranea, Phaeomoniella chlamydospora (earlier Phaeoacremonium chlamydosporum), Phaeoacremonium aleophilum and/or Bonyosphaeria obtusa; Elsinoe spp. on pome fruits (E. pyri), soft fruits (E. veneta: anthracnose) and vines (E. ampelina: anthracnose); Entyloma oryzae (leaf smut) on rice; Epicoccumspp. (black mold) on wheat; Erysiphespp. (powdery mildew) on sugar beets (E. betae), vegetables (e. g. E. pis), such as cucurbits (e. g. E. cichoracearum), cabbages, rape (e. g. E. cruciferarum); Eutypa lata (Eutypa canker or dieback, anamorph: Cytosporina lata, syn. Libertella blepharis) on fruit trees, vines and ornamental woods; Exserohilum (syn. Helminthosporium) spp. on corn (e. g. E. turcicum); Fusarium (teleomorph: Gibberella) spp. (wilt, root or stem rot) on various plants, such as F. graminearum or F. culmorum (root rot, scab or head blight) on cereals (e. g. wheat or barley), F oxysporum on tomatoes, F. solani(f. sp. glycines now syn. F. virguliforme) and F. tucumaniae and F. brasiiiense each causing sudden death syndrome on soybeans, and F. verticillioides on corn; Gaeumannomyces graminis (take-all) on cereals (e. g. wheat or barley) and corn; Gibberella spp. on cereals (e. g. G. zeae) and rice (e. g. G. fujikuroi: Bakanae disease); Glomerella cingulata on vines, pome fruits and other plants and G gossypiion cotton; Grainstaining complex on rice; Guignardia bidwelli(black rot) on vines; Gymnosporangium spp on rosaceous plants and junipers, e. g. G. sabinae (rust) on pears; Helminthosporium spp. (syn. Drechslera, teleomorph: Cochliobolus) on corn, cereals and rice; Hemileia spp., e. g. H vastatrix (coffee leaf rust) on coffee; Isariopsis clavispora (syn. Cladosporium vitis) on vines; Macrophomina phaseolina (syn. phaseoli) (root and stem rot) on soybeans and cotton; Microdochium (syn. Fusarium) nivale (pink snow mold) on cereals (e. g. wheat or barley); Microsphaera diffusa (powdery mildew) on soybeans; Monilinia spp., e. g. M.A. taxa, M.A. fructicola and M.A. fructigena (bloom and twig blight, brown rot) on stone fruits and other rosaceous plants; Mycosphaerella spp. on cereals, bananas, soft fruits and ground nuts, such as e. g. M.A. graminicola (anamorph: Septoria Septoria blotch) on wheat or M.A. qiensis (black Sigatoka disease) on bananas; Peronospora spp. (downy mildew) on cabbage (e. g. P brassicae), rape (e. g. P. parasitica), onions (e. g. P. destructor), tobacco (P. tabacina) and soybeans (e. g. P manshurica); Phakopsora pachyrhizi and P meibomiae (soybean rust) on soybeans; Phialophora spp. e. g. on vines (e. g. P. tracheiphila and P tetraspora) and soybeans (e. g. P. gregata: stem rot); Phoma lingam (root and stem rot) on rape and cabbage and P betae (root rot, leaf spot and damping-off) on sugar beets; Phomopsisspp. on sunflowers, vines (e. g. P viticola: can and leaf spot) and soybeans (e. g. stem rot: P phaseoli, teleomorph: Diaporthe phaseolorum); Physoderma maydis (brown spots) on corn; Phytophthoraspp. (wilt, root, leaf, fruit and stem rot) on various plants, such as paprika and cucurbits (e. g. P. capsid, soybeans (e. g. P. megasperma, syn. P sojae), potatoes and tomatoes (e. g. P. infestans late blight) and broad-leaved trees (e. g. P. ramorum: sudden oak death); Plasmodiophora brassicae (club root) on cabbage, rape, radish and other plants; Plasmopara spp., e. g. P. viticola (grapevine downy mildew) on vines and P. halstedii on sunflowers; Podosphaeraspp. (powdery mildew) on rosaceous plants, hop, pome and soft fruits, e. g. P. leucotr/cha on apples; Polymyxa spp., e. g. on cereals, such as barley and wheat (P. graminis) and sugar beets (P. betae) and thereby transmitted viral diseases; Pseudocercosporella herpotrichoides (eyespot, teleomorph: Tapesia yallundae) on cereals, e. g. wheat or barley; Pseudoperonospora (downy mildew) on various plants, e. g. P. cubensis on cucurbits or P. humili on hop; Pseudopeziculatracheiphila (red fire disease or,rotbrenner', anamorph: Phialophora) on vines; Puccinia spp. (rusts) on various plants, e. g. P triticina (brown or leaf rust), P. striiformis (stripe or yellow rust), P. hordei (dwarf rust), P graminis (stem or black rust) or P. recondita (brown or leaf rust) on cereals, such as e. g. wheat, barley or rye, P. kuehnii (orange rust) on sugar cane and P. asparagi on asparagus; Pyrenophora (anamorph: Drechslera) tritici-repentis (tan spot) on wheat or P. teres (net blotch) on barley; Pyriculariaspp., e. g. P. oryzae (teleomorph: Magnaporthe grisea, rice blast) on rice and P. grisea on turf and cereals; Pythium spp. (damping-off) on turf, rice, corn, wheat, cotton, rape, sunflowers, soybeans, sugar beets, vegetables and various other plants (e. g. P. ultimum or P. aphanidermatum); Ramularia spp., e. g. R. collo-cygni(Ramularia leaf spots, Physiological leaf spots) on barley and R. beticola on sugar beets; Rhizoctonia spp. on cotton, rice, potatoes, turf, corn, rape, potatoes, sugar beets, vegetables and various other plants, e. g. R. solani (root and stem rot) on soybeans, R. solani (sheath blight) on rice or R. cerealis (Rhizoctonia spring blight) on wheat or barley; Rhizopus stolonifer (black mold, soft rot) on strawberries, carrots, cabbage, vines and tomatoes; Rhynchosporium secalis (scald) on barley, rye and triticale; Sarocladium oryzae and S. attenuatum (sheath rot) on rice; Sclerotinia spp. (stem rot or white mold) on vegetables and field crops, such as rape, sunflowers (e. g. S. sclerotiorum) and soybeans (e. g. S. rolfsiior S. sclerotiorum); Septoriaspp. on various plants, e. g. S. glycines (brown spot) on soybeans, S. tritici (Septoria blotch) on wheat and S. (syn. Stagonospora) nodorum (Stagonospora blotch) on cereals; Uncinula (syn. Erysiphe) necator (powdery mildew, anamorph: Oidium tuckers) on vines; Setospaeria spp. (leaf blight) on corn (e. g. S. turcicum, syn. Helminthosporium turcicum) and turf; Sphacelotheca spp. (smut) on corn, (e. g. S. rediana: head smut), sorghum and sugar cane; Sphaerotheca fuliginea (powdery mildew) on cucurbits; Spongospora subterranea (powdery scab) on potatoes and thereby transmitted viral diseases; Stagonospora spp. on cereals, e. g. S. nodorum (Stagonospora blotch, teleomorph: Leptosphaeria [syn. Phaeosphaeria]nodorum) on wheat; Synchytrium endobioticum on potatoes (potato wart disease); Taphrina spp., e. g. T. deformans (leaf curl disease) on peaches and T. pruni (plum pocket) on plums; Thielaviopsis spp. (black root rot) on tobacco, pome fruits, vegetables, soybeans and cotton, e. g. T. basicola (syn. Chalara elegans); Tilletia spp. (common bunt or stinking smut) on cereals, such as e. g. T. tritici (syn. T. caries, wheat bunt) and T. controversa (dwarf bunt) on wheat; Typhula incarnata (grey snow mold) on barley or wheat; Urocystis spp., e. g. U. occulta (stem smut) on rye; Uromyces spp. (rust) on vegetables, such as beans (e. g. U. appendiculatus, syn. U phaseoli) and sugar beets (e. g. U. betae); Ustilago spp. (loose smut) on cereals (e. g. U. nuda and U. avaenae), corn (e. g. U. maydis: corn smut) and sugar cane; Venturia spp. (scab) on apples (e. g. V. inaequalis) and pears; and Verticillium spp. (wilt) on various plants, such as fruits and ornamentals, vines, soft fruits, vegetables and field crops, e. g. V dahliae on strawberries, rape, potatoes and tomatoes.

The mixtures according to the present invention, respectively, are also suitable Afor controlling harmful fungi in the protection of stored products or harvest and in the protection of materials.

The term "protection of materials" is to be understood to denote the protection of technical and non-living materials, such as adhesives, glues, wood, paper and paperboard, textiles, leather, paint dispersions, plastics, cooling lubricants, fiber or fabrics, against the infestation and destruction by harmful microorganisms, such as fungi and bacteria. As to the protection of wood and other materials, the particular attention is paid to the following harmful fungi: Ascomycetes such as Ophiostoma spp., Ceratocystis spp., Aureobasidium pullulans, Sclerophoma spp., Chaetomium spp., Humicola spp., Petriella spp., Trichurusspp.; Basidiomycetes such as Coniophoraspp., Coriolusspp., Gloeophyllum spp., Lentinus spp., Pleurotus spp., Poria spp., Serpula spp. and Tyromyces spp., Deuteromycetes such as Aspergillus spp., Cladosporium spp., Penicillium spp., Trichodermaspp., Alternaria spp., Paecilomyces spp. and Zygomycetes such as Mucor spp., and in addition in the protection of stored products and harvest the following yeast fungi are worthy of note: Candida spp. and Saccharomyces cerevisae.

They are particularly important for controlling a multitude of fungi on various cultivated plants, such as bananas, cotton, vegetable species (for example cucumbers, beans and cucurbits), cereals such as wheat, rye, barley, rice, oats; grass coffee, potatoes, corn, fruit species, soya, tomatoes, grapevines, ornamental plants, sugar cane and also on a large number of seeds. In a preferred embodiment, the inventive mixtures are used in soya (soybean), cereals and corn.

The inventive mixture can be applied to any and all developmental stages of pests, such as egg, larva, pupa, and adult. The pests may be controlled by contacting the target pest, its food supply, habitat, breeding ground or its locus with a pesticidally effective amount of the inventive mixtures or of compositions comprising the mixtures.

"Locus" means a plant, plant propagation material (preferably seed), soil, area, material or environment in which a pest is growing or may grow.

In general, "pesticidally effective amount" means the amount of the inventive mixtures or of compositions comprising the mixtures needed to achieve an observable effect on growth, including the effects of necrosis, death, retardation, prevention, and removal, destruction, or otherwise diminishing the occurrence and activity of the target organisM.A. The pesticidally effective amount can vary for the various mixtures/compositions used in the invention. A pesticidally effective amount of the mixtures/compositions will also vary according to the prevailing conditions such as desired pesticidal effect and duration, weather, target species, locus, mode of application, and the like.

As said above, the present invention comprises a method for improving the health of plants, wherein the plant, the locus where the plant is growing or is expected to grow or plant propagation material, from which the plant grows, is treated with an plant health effective amount of an inventive mixture.

The term "plant effective amount" denotes an amount of the inventive mixtures, which is sufficient for achieving plant health effects as defined herein below. More exemplary information about amounts, ways of application and suitable Aratios to be used is given below. Anyway, the skilled artisan is well aware of the fact that such an amount can vary in a broad range and is dependent on various factors, e.g. the treated cultivated plant or material and the climatic conditions.

When preparing the mixtures, it is preferred to employ the pure active compounds, to which further active compounds against pests, such as insecticides, herbicides, fungicides or else herbicidal or growth-regulating active compounds or fertilizers can be added as further active components according to need.

The inventive mixtures are employed by treating the fungi or the plants, plant propagation materials (preferably seeds), materials or soil to be protected from fungal attack with a pesticidally effective amount of the active compounds. The application can be carried out both before and after the infection of the materials, plants or plant propagation materials (preferably seeds) by the pests.

In the context of the present invention, the term plant refers to an entire plant, a part of the plant or the propagation material of the plant.

The inventive mixtures and compositions thereof are particularly important in the control of a multitude of phytopathogenic fungi on various cultivated plants, such as cereals, e. g. wheat, rye, barley, triticale, oats or rice; beet, e. g. sugar beet or fodder beet; fruits, such as pomes, stone fruits or soft fruits, e. g. apples, pears, plums, peaches, almonds, cherries, strawberries, raspberries, blackberries or gooseberries; leguminous plants, such as lentils, peas, alfalfa or soybeans; oil plants, such as rape, mustard, olives, sunflowers, coconut, cocoa beans, castor oil plants, oil palms, ground nuts or soybeans; cucurbits, such as squashes, cucumber or melons; fiber plants, such as cotton, flax, hemp or jute; citrus fruit, such as oranges, lemons, grapefruits or mandarins; vegetables, such as spinach, lettuce, asparagus, cabbages, carrots, onions, tomatoes, potatoes, cucurbits or paprika; lauraceous plants, such as avocados, cinnamon or camphor; energy and raw material plants, such as corn, soybean, rape, sugar cane or oil palm; corn; tobacco; nuts; coffee; tea; bananas; vines (Table Agrapes and grape juice grape vines); hop; turf; sweet leaf (also called Stevia); natural rubber plants or ornamental and forestry plants, such as flowers, shrubs, broad-leaved trees or evergreens, e. g. conifers; and on the plant propagation material, such as seeds, and the crop material of these plants.

Preferably, the inventive mixturs and compositions thereof, respectively are used for controlling a multitude of fungi on field crops, such as potatoes, sugar beets, tobacco, wheat, rye, barley, oats, rice, corn, cotton, soybeans, rape, legumes, sunflowers, coffee or sugar cane; fruits; vines; ornamentals; or vegetables, such as cucumbers, tomatoes, beans or squashes.

Preferably, treatment of plant propagation materials with the inventive mixtures and compositions thereof, respectively, is used for controlling a multitude of fungi on cereals, such as wheat, rye, barley and oats; potatoes, tomatoes, vines, rice, corn, cotton and soybeans.

The term "cultivated plants" is to be understood as including plants which have been modified by breeding, mutagenesis or genetic engineering including but not limiting to agricultural biotech products on the market or in development (cf. cera-gmc.org/, see GM crop database therein). Genetically modified plants are plants, which genetic material has been so modified by the use of recombinant DNA techniques that under natural circumstances cannot readily be obtained by cross breeding, mutations or natural recombination. Typically, one or more genes have been integrated into the genetic material of a genetically modified plant in order to improve certain properties of the plant.

Such genetic modifications also include but are not limited to targeted post-translational modification of protein(s), oligo- or polypeptides e. g. by glycosylation or polymer additions such as prenylated, acetylated or farnesylated moieties or PEG moieties.

Plants that have been modified by breeding, mutagenesis or genetic engineering, e. g. have been rendered tolerant to applications of specific classes of herbicides, such as auxin herbicides such as dicamba or 2,4-D; bleacher herbicides such as hydroxylphenylpyruvate dioxygenase (HPPD) inhibitors or phytoene desaturase (PDS) inhibittors; acetolactate synthase (ALS) inhibitors such as sulfonyl ureas or imidazolinones; enolpyruvylshikimate-3-phosphate synthase (EPSPS) inhibitors, such as glyphosate; glutamine synthetase (GS) inhibitors such as glufosinate; protoporphyrinogen-IX oxidase inhibitors;

lipid biosynthesis inhibitors such as acetyl CoA carboxylase (ACCase) inhibitors; or oxynil (i. e. bromoxynil or ioxynil) herbicides as a result of conventional methods of breeding or genetic engineering. Furthermore, plants have been made resistant to multiple classes of herbicides through multiple genetic modifications, such as resistance to both glyphosate and glufosinate or to both glyphosate and a herbicide from another class such as ALS inhibitors, HPPD inhibitors, auxin herbicides, or ACCase inhibitors. These herbicide resistance technologies are e.g. described in Pest Manage M.A. Sci. 61, 2005, 246; 61, 2005, 258; 61, 2005, 277; 61, 2005, 269; 61, 2005, 286; 64, 2008, 326; 64, 2008, 332; Weed Sci. 57, 2009, 108; Austral. J. Agricult. Res. 58, 2007, 708; Science 316, 2007, 1185; and references quoted therein. Several cultivated plants have been rendered tolerant to herbicides by conventional methods of breeding (mutagenesis), e. g. Clearfield® summer rape (Canola, BASF SE, Germany) being tolerant to imidazolinones, e. g. imazamox, or ExpressSun® sunflowers (DuPont, USA) being tolerant to sulfonyl ureas, e. g. tribenuron. Genetic engineering methods have been used to render cultivated plants such as soybean, cotton, corn, beets and rape, tolerant to herbicides such as glyphosate and glufosinate, some of which are commercially available under the trade names RoundupReady® (glyphosate-tolerant, Monsanto, U.S.A.), Cultivance® (imidazolinone tolerant, BASF SE, Germany) and LibertyLink® (glufosinate-tolerant, Bayer CropScience, Germany).

Furthermore, plants are also covered that are by the use of recombinant DNA techniques capable to synthesize one or more insecticidal proteins, especially those known from the bacterial genus Bacillus, particularly from Bacillus thuringiensis, such as δ-endotoxins, e. g. CryIA(b), CryIA(c), CryIF, CryIF(a2), CryIIA(b), CryIIIA, CryIIIIB(b1) or Cry9c; vegetative insecticidal proteins (VIP), e. g. VIP1, VIP2, VIP3 or VIP3A; insecticidal proteins of bacteria colonizing nematodes, e. g. Photorhabdus spp. or Xenorhabdus spp.; toxins produced by animals, such as scorpion toxins, arachnid toxins, wasp toxins, or other insect-specific neurotoxins; toxins produced by fungi, such Streptomycetes toxins, plant lectins, such as pea or barley lectins; agglutinins; proteinase inhibitors, such as trypsin inhibitors, serine protease inhibitors, patatin, cystatin or papain inhibitors; ribosome-inactivating proteins (RIP), such as ricin, maize-RIP, abrin, luffin, saporin or bryodin; steroid metabolism enzymes, such as 3-hydroxysteroid oxidase, ecdysteroid-IDP-glycosyl-transferase, cholesterol oxidases, ecdysone inhibitors or HMG-CoA-reductase; ion channel blockers, such as blockers of sodium or calcium channels; juvenile hormone esterase; di-uretic hormone receptors (helicokinin receptors); stilben synthase, bibenzyl synthase, chitinases or glucanases. In the context of the present invention these insecticidal proteins or toxins are to be understood expressly also as pre-toxins, hybrid proteins, truncated or otherwise modified proteins. Hybrid proteins are characterized by a new combination of protein domains, (see, e. g. WO 02/015701). Further examples of such toxins or genetically modified plants capable of synthesizing such toxins are disclosed, e. g., in EP-A 374 753, WO 93/007278, WO 95/34656, EP-A 427 529, EP-A 451 878, WO 03/18810 and WO 03/52073. The methods for producing such genetically modified plants are generally known to the person skilled in the art and are described, e. g. in the publications mentioned above. These insecticidal proteins contained in the genetically modified plants impart to the plants producing these proteins tolerance to harmful pests from all taxonomic groups of athropods, especially to beetles (Coeloptera), two-winged insects (Diptera), and moths (Lepidoptera) and to nematodes (Nematoda). Genetically modified plants capable to synthesize one or more insecticidal proteins are, e. g., described in the publications mentioned above, and some of which are commercially available such as YieldGard® (corn cultivars producing the Cry1Ab toxin), YieldGard® Plus (corn cultivars producing Cry1Ab and Cry3Bb1 toxins), Starlink® (corn cultivars producing the Cry9c toxin), Herculex® RW (corn cultivars producing Cry34Ab1, Cry35Ab1 and the enzyme Phosphinothricin-N-Acetyltransferase [PAT]); NuCOTN® 33B (cotton cultivars producing the Cry1Ac toxin), Bollgard® I (cotton cultivars producing the Cry1Ac toxin), Bollgard® II (cotton cultivars producing Cry1Ac and Cry2Ab2 toxins); VIPCOT® (cotton cultivars producing a VIP-toxin); NewLeaf® (potato cultivars producing the Cry3A toxin); Bt-Xtra®, NatureGard®, KnockOut®, BiteGard®, Protecta®, Bt11 (e. g. Agrisure® CB) and Bt176 from Syngenta Seeds SAS, France, (corn cultivars producing the Cry1Ab toxin and PAT enyzme), MIR604 from Syngenta Seeds SAS, France (corn cultivars producing a modified version of the Cry3A toxin, c.f. WO 03/018810), MON 863 from Monsanto Europe S.A., Belgium (corn cultivars producing the Cry3Bb1 toxin), IPC 531 from Monsanto Europe S.A., Belgium (cotton cultivars producing a modified version of the Cry1Ac toxin) and 1507 from Pioneer Overseas Corporation, Belgium (corn cultivars producing the Cry1F toxin and PAT enzyme).

Furthermore, plants are also covered that are by the use of recombinant DNA techniques capable to synthesize one or more proteins to increase the resistance or tolerance of those plants to bacterial, viral or fungal pathogens. Examples of such proteins are the so-called "pathogenesis-related proteins" (PR proteins, see, e. g. EP-A 392 225), plant disease resistance genes (e. g. potato cultivars, which express resistance genes acting against Phytophthora infestans derived from the mexican wild potato Solanum bu/bocastanum) or T4-lysozym (e. g. potato cultivars capable of synthesizing these proteins with increased resistance against bacteria such as Erwinia amylvora). The methods for producing such genetically modified plants are generally known to the person skilled in the art and are described, e. g. in the publications mentioned above.

Furthermore, plants are also covered that are by the use of recombinant DNA techniques capable to synthesize one or more proteins to increase the productivity (e. g. bio mass production, grain yield, starch content, oil content or protein content), tolerance to drought, salinity or other growth-limiting environmental factors or tolerance to pests and fungal, bacterial or viral pathogens of those plants.

Furthermore, plants are also covered that contain by the use of recombinant DNA techniques a modified amount of substances of content or new substances of content, specifically to improve human or animal nutrition, e. g. oil crops that produce healthpromoting long-chain omega-3 fatty acids or unsaturated omega-9 fatty acids (e. g. Nexera® rape, DOW Agro Sciences, Canada).

Furthermore, plants are also covered that contain by the use of recombinant DNA techniques a modified amount of substances of content or new substances of content, specifically to improve raw material production, e. g. potatoes that produce increased amounts of amylopectin (e. g. Amflora® potato, BASF SE, Germany).

The separate or joint application of the compounds of the inventive mixtures is carried out by spraying or dusting the seeds, the seedlings, the plants or the soils before or after sowing of the plants or before or after emergence of the plants.

The inventive mixtures and the compositions comprising them can be used for protecting wooden materials such as trees, board fences, sleepers, etc. and buildings such as houses, outhouses, factories, but also construction materials, furniture, leathers, fibers, vinyl articles, electric wires and cables etc. from ants and/or termites, and for controlling ants and termites from doing harm to crops or human being (e.g. when the pests invade into houses and public facilities).

Customary application rates in the protection of materials are, for example, from 0.01 g to 1000 g of active compound per m² treated material, desirably from 0.1 g to 50 g per m².

For use in spray compositions, the content of the mixture of the active ingredients is from 0.001 to 80 weights %, preferably from 0.01 to 50 weight % and most preferably from 0.01 to 15 weight %.

The invention claimed is:
1. A ternary fungicidal mixture comprising
   a) 1-[2-[[1-(4-chlorophenyl)pyrazol-3-yl]oxymethyl]-3-methyl-phenyl]-4-methyl-tetrazol-5-one (I-3);
   b) fluxapyroxad as first compound II; and
   c) a second compound II selected from the group consisting of azoxystrobin and pyraclostrobin;
   wherein the ratio by weight of compound I-3, first compound II and second compound II in each combination of two ingredients in the mixture of three ingredients is from 1:50 to 50:1.
2. A pesticidal composition comprising a liquid or solid carrier and the mixture of claim 1.
3. A method for controlling phytopathogenic fungi, wherein the fungi, their habitat, breeding grounds, their locus or plants to be protected against fungal attack, soil or plant propagation material are treated with an effective amount of the mixture of claim 1.
4. A method for improving the health of plants, wherein the plant, locus where the plant is growing or is expected to grow or plant propagation material from which the plant grows are treated with an effective amount of the mixture of claim 1.
5. A method for protection of plant propagation material from phytopathogenic fungi comprising contacting the plant propagation material with the mixture of claim 1 in pesticidally effective amounts.
6. The method of claim 5, wherein the mixture is applied in an amount of from 0.01 g to 10 kg per 100 kg of plant propagation materials.
7. A method for controlling phytopathogenic fungi, wherein the fungi, their habitat, breeding grounds, their locus or the plants to be protected against fungal attack, the soil or plant propagation material are treated with an effective amount of active components a) 1-[2-[[1-(4-chlorophenyl)pyrazol-3-yl]oxymethyl]-3-methyl-phenyl]-4-methyl-tetrazol-5-one (I-3); b) fluxapyroxad as first compound II; and c) a second compound II selected from the group consisting of azoxystrobin and pyraclostrobin; wherein the ratio by weight of compound I-3, first compound II and second compound II in each combination of two of the active components is from 1:50 to 50:1;
   wherein the active components are applied simultaneously, jointly or separately or in succession.
8. A plant propagation material treated with the mixture of claim 1 in an amount of from 0.01 g to 10 kg per 100 kg of plant propagation material.
9. The ternary fungicidal mixture of claim 1, wherein the ratio by weight of compound I-3, first compound II and second compound II in each combination of two ingredients in the mixture of three ingredients is from 1:20 to 20:1.
10. The ternary fungicidal mixture of claim 1, wherein the ratio by weight of compound I-3, first compound II and second compound II in each combination of two ingredients in the mixture of three ingredients is from 1:10 to 10:1.
11. The ternary fungicidal mixture of claim 1, wherein the ratio by weight of compound I-3, first compound II and second compound II in each combination of two ingredients in the mixture of three ingredients is from 1:5 to 5:1.
12. The method of claim 5, wherein the ratio by weight of compound I-3, first compound II and second compound II in each combination of two of the active components is from 1:20 to 20:1.
13. The method of claim 5, wherein the ratio by weight of compound I-3, first compound II and second compound II in each combination of two of the active components is from 1:10 to 10:1.
14. The method of claim 5, wherein the ratio by weight of compound I-3, first compound II and second compound II in each combination of two of the active components is from 1:5 to 5:1.

15. The method of claim 7, wherein the ratio by weight of compound I-3, first compound II and second compound II in each combination of two of the active components is from 1:20 to 20:1.

16. The method of claim 7, wherein the ratio by weight of compound I-3, first compound II and second compound II in each combination of two of the active components is from 1:10 to 10:1.

17. The method of claim 7, wherein the ratio by weight of compound I-3, first compound II and second compound II in each combination of two of the active components is from 1:5 to 5:1.

\* \* \* \* \*